(12) United States Patent
Anderson et al.

(10) Patent No.: US 9,804,672 B2
(45) Date of Patent: Oct. 31, 2017

(54) HUMAN-COMPUTER USER INTERACTION

(75) Inventors: Thomas G. Anderson, Albuquerque, NM (US); Bill Anderson, Albuquerque, NM (US); Walter Aviles, San Diego, CA (US); Richard Aviles, Kailua, HI (US); Jake Jones, Albuquerque, NM (US); V. Gerald Grafe, Corrales, NM (US)

(73) Assignee: Facebook, Inc., Menlo Park, CA (US)

( * ) Notice: Subject to any disclaimer, the term of this patent is extended or adjusted under 35 U.S.C. 154(b) by 613 days.

(21) Appl. No.: 12/783,386

(22) Filed: May 19, 2010

(65) Prior Publication Data

US 2010/0261526 A1 Oct. 14, 2010

Related U.S. Application Data

(63) Continuation of application No. 11/433,173, filed on May 13, 2006, now abandoned.

(60) Provisional application No. 60/681,007, filed on May 13, 2005.

(51) Int. Cl.
| | |
|---|---|
| *G06F 3/038* | (2013.01) |
| *G06F 3/0481* | (2013.01) |
| *G06F 3/0482* | (2013.01) |
| *G06F 3/0483* | (2013.01) |
| *G06F 3/01* | (2006.01) |

(52) U.S. Cl.
CPC ............. *G06F 3/016* (2013.01); *G06F 3/017* (2013.01)

(58) Field of Classification Search
CPC .... G06F 3/0481; G06F 3/0482; G06F 3/0483; G06F 17/243; G06F 17/276; G06F 3/0237

USPC .......................................... 715/810, 764, 761
See application file for complete search history.

(56) References Cited

U.S. PATENT DOCUMENTS

| | | | | |
|---|---|---|---|---|
| 4,302,190 | A | * | 11/1981 | Shaw et al. ..................... 434/18 |
| 4,380,437 | A | * | 4/1983 | Yarborough, Jr. .... F41G 3/2655 42/106 |
| 4,909,260 | A | * | 3/1990 | Salem et al. .................. 600/534 |
| 5,232,223 | A | * | 8/1993 | Dornbusch ...................... 463/37 |
| 5,403,192 | A | * | 4/1995 | Kleinwaks ............. G09B 23/28 434/272 |
| 5,730,655 | A | | 3/1998 | Meredith |
| 5,734,373 | A | * | 3/1998 | Rosenberg .............. A63F 13/06 345/161 |
| 5,857,854 | A | * | 1/1999 | Kwalwasser ........... F41A 33/06 434/18 |
| 5,921,780 | A | * | 7/1999 | Myers ............................ 434/69 |
| 6,147,674 | A | * | 11/2000 | Rosenberg et al. ........... 345/157 |
| 6,331,146 | B1 | * | 12/2001 | Miyamoto et al. ............. 463/32 |
| 6,366,272 | B1 | * | 4/2002 | Rosenberg .............. A63F 13/10 345/156 |
| 6,592,461 | B1 | * | 7/2003 | Raviv et al. .................... 463/37 |
| 6,695,770 | B1 | * | 2/2004 | Choy et al. .................... 600/38 |

(Continued)

OTHER PUBLICATIONS

U.S. Appl. No. 60/202,448, filed May 6, 2000, Inventor Anderson [copy not enclosed].

(Continued)

*Primary Examiner* — Kevin L Young
*Assistant Examiner* — Erik Stitt
(74) *Attorney, Agent, or Firm* — Fenwick & West LLP

(57) ABSTRACT

Methods of and apparatuses for providing human interaction with a computer, including human control of three dimensional input devices, force feedback, and force input.

4 Claims, 19 Drawing Sheets

(56) References Cited

U.S. PATENT DOCUMENTS

| | | | | |
|---|---|---|---|---|
| 7,199,790 B2* | 4/2007 | Rosenberg et al. | | 345/175 |
| 7,307,619 B2* | 12/2007 | Cunningham | | G06F 3/016 |
| | | | | 345/158 |
| 7,542,040 B2* | 6/2009 | Templeman | | G06F 3/011 |
| | | | | 345/474 |
| 7,850,527 B2* | 12/2010 | Barney et al. | | 463/37 |
| 8,184,097 B1* | 5/2012 | Barney et al. | | 345/158 |
| 8,992,322 B2* | 3/2015 | Endo | | 463/37 |
| 2001/0021665 A1* | 9/2001 | Gouji et al. | | 463/7 |
| 2002/0010021 A1* | 1/2002 | McCauley | | 463/37 |
| 2002/0019258 A1* | 2/2002 | Kim | | A63F 13/10 |
| | | | | 463/36 |
| 2002/0021283 A1* | 2/2002 | Rosenberg et al. | | 345/156 |
| 2002/0119822 A1* | 8/2002 | Kunzle et al. | | 463/42 |
| 2003/0032466 A1* | 2/2003 | Watashiba | | 463/2 |
| 2003/0195041 A1* | 10/2003 | McCauley | | 463/37 |
| 2004/0064298 A1* | 4/2004 | Levine | | G09B 23/28 |
| | | | | 703/11 |
| 2004/0211104 A1* | 10/2004 | Eberle | | 42/71.02 |
| 2004/0259644 A1* | 12/2004 | McCauley | | 463/51 |
| 2005/0017454 A1* | 1/2005 | Endo et al. | | 273/317.1 |
| 2005/0101845 A1* | 5/2005 | Nihtila | | A61B 5/0002 |
| | | | | 600/300 |
| 2005/0130742 A1* | 6/2005 | Feldman et al. | | 463/39 |
| 2005/0191601 A1* | 9/2005 | Dvorak | | G09B 19/0038 |
| | | | | 434/16 |
| 2005/0255914 A1* | 11/2005 | McHale et al. | | 463/31 |
| 2006/0190823 A1 | 8/2006 | Cunningham et al. | | |
| 2006/0217598 A1* | 9/2006 | Miyajima et al. | | 600/300 |

OTHER PUBLICATIONS

U.S. Appl. No. 60/431,060, filed Dec. 5, 202, Inventor Anderson et al. [copy not enclosed].

* cited by examiner

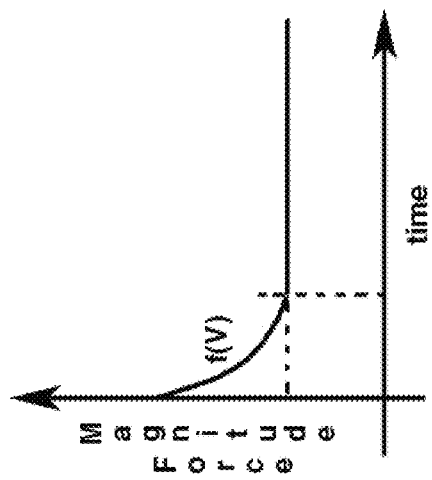
Fig. 3
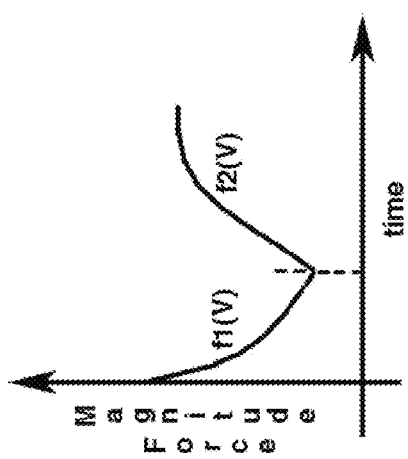
Fig. 4
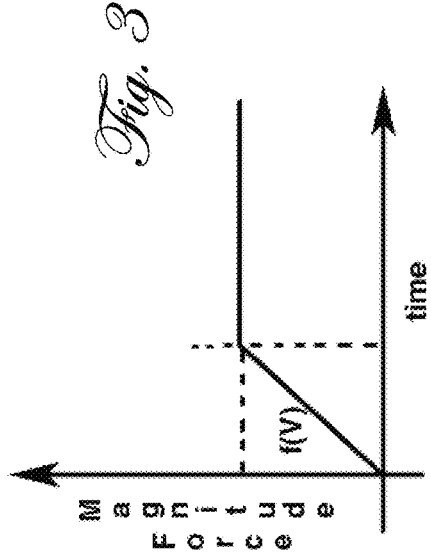
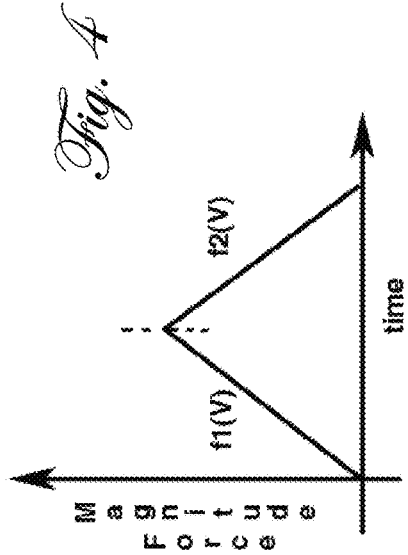

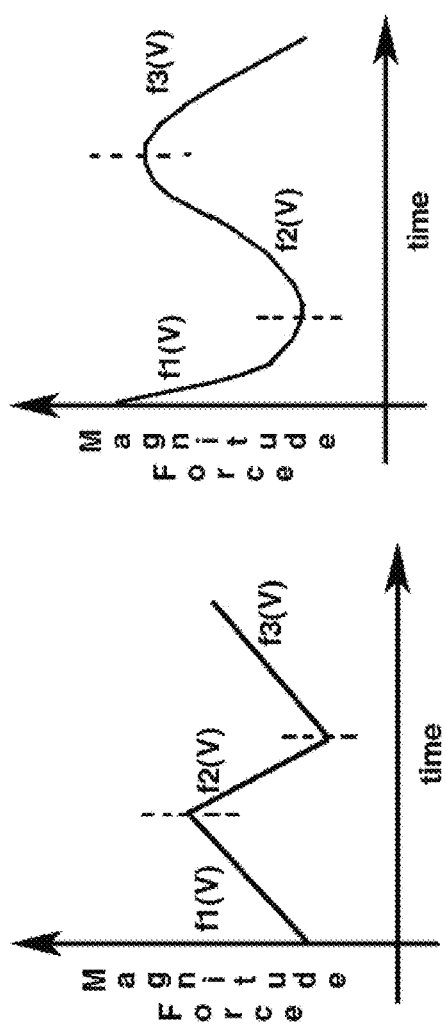
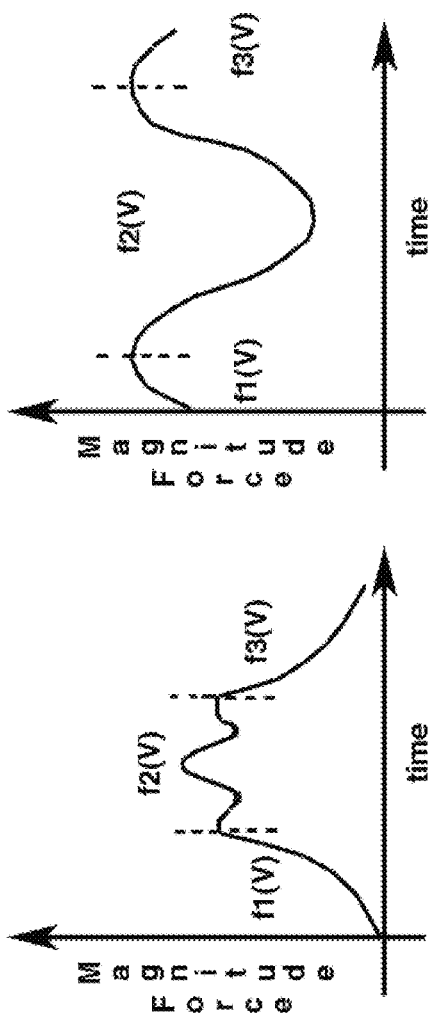
Fig. 5
Fig. 6

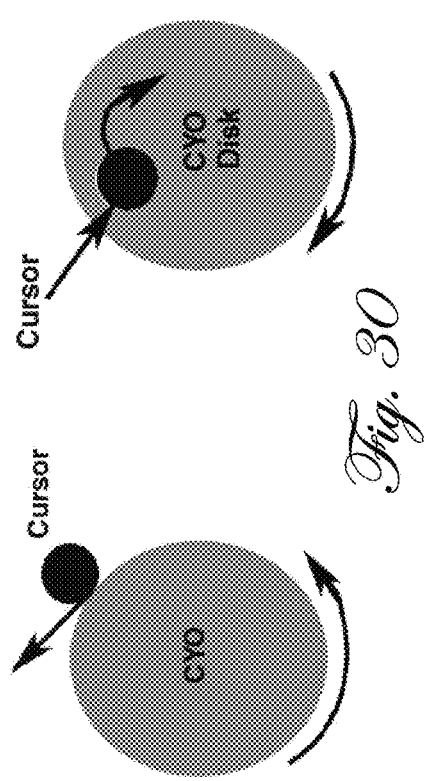
Fig. 30
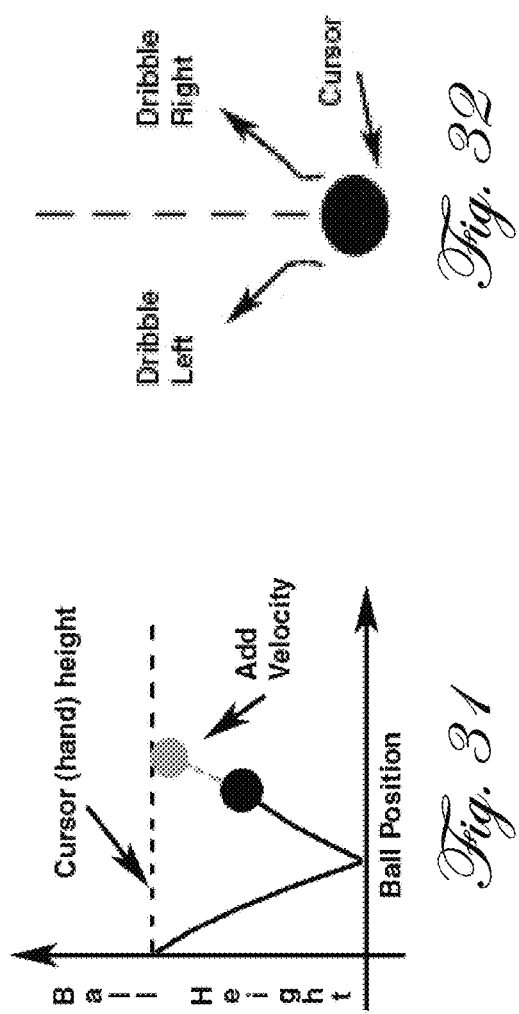
Fig. 32
Fig. 31

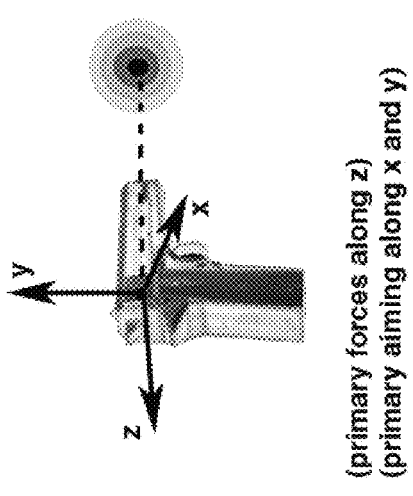
Fig. 33
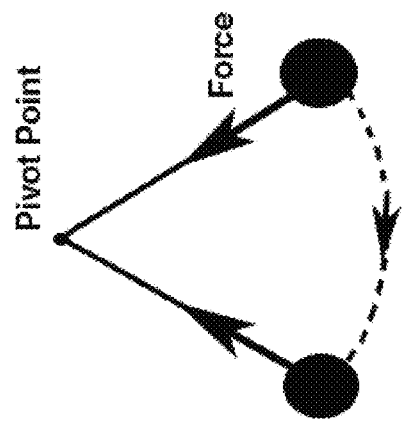
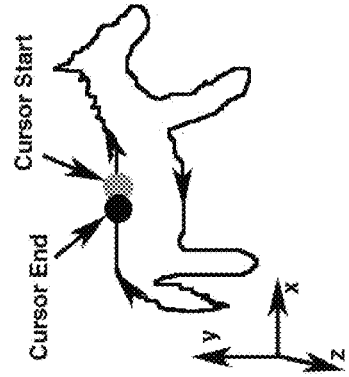
(primary forces along z)
(primary aiming along x and y)
Fig. 34
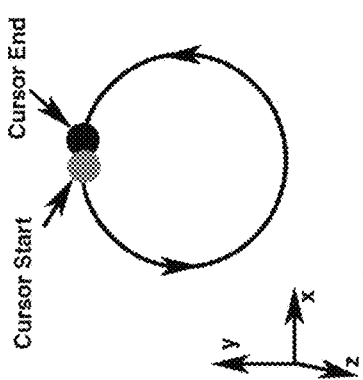
Fig. 35
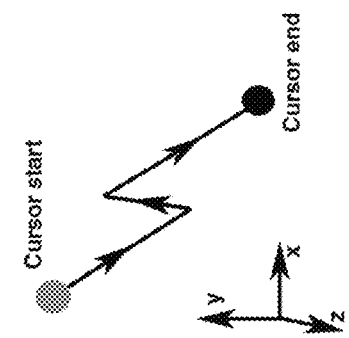

HUMAN-COMPUTER USER INTERACTION

CROSS REFERENCE TO RELATED APPLICATIONS

This application claims the benefit of U.S. provisional application 60/681,007, "Computer Interface Methods and Apparatuses," filed May 13, 2005, incorporated herein by reference. This application claims priority as a continuation in part of U.S. application Ser. No. 11/433,173, filed May 13, 2006, incorporated herein by reference.

BACKGROUND

The present invention relates to methods and apparatuses related to user interaction with computer-simulated objects.

Computing technology has seen a many-fold increase in capability in recent years. Processors work at ever higher rates; memories are ever larger and always faster; mass storage is larger and cheaper every year. Computers now are essential elements in many aspects of life, and are often used to present three-dimensional worlds to users, in everything from games to scientific visualization.

The interface between the user and the computer has not seen the same rate of change. Screen windows, keyboard, monitor, and mouse are the standard, and have seen little change since their introduction. Many computers are purchased with great study as to processor speed, memory size, and disk space. Often, little thought is given to the human-computer interface, although most of the user's experience with the computer will be dominated by the interface (rarely does a user spend significant time waiting for a computer to calculate, while every interaction must use the human-computer interface).

As computers continue to increase in capability, the human-computer interface becomes increasingly important. The effective bandwidth of communication with the user will not be sufficient using only the traditional mouse and keyboard for input and monitor and speakers for output. More capable interface support will be desired to accommodate more complex and demanding applications. For example, six degree of freedom input devices, force and tactile feedback devices, three dimensional sound, and stereo or holographic displays can improve the human-computer interface.

As these new interface capabilities become available, new interface methods are needed to fully utilize new modes of human-computer communication enabled. Specifically, new methods of interaction can use the additional human-computer communication paths to supplement or supplant conventional communication paths, freeing up traditional keyboard input and visual feedback bandwidth. The use of force feedback, or haptics, can be especially useful in allowing a user to feel parts of the interface, reducing the need for a user to visually manage interface characteristics that can be managed by feel. Users interfacing with non-computer tasks routinely exploit the combination of visual and haptic feedback (seeing one side of a task while feeling the other); bringing this sensory combination into human-computer interfaces can make such interfaces more efficient and more intuitive for the user. Accordingly, there is a need for new methods of human-computer interfacing that make appropriate use of haptic and visual feedback.

As a specific example, many contemporary computer games require the user to throw or otherwise propel an object. The games typically allow the user to specify a throw by pressing a button or combination of buttons. The timing of the button press, often relative to the timing of other actions occurring in the game, controls the affect of the throw (e.g., the accuracy or distance of the throw). Some games display a slider or power bar that indicates direction or force of a throw; the user must press the appropriate button when the slider or bar is at the right value for the desired throw. The user can thereby control aspects of the throw, but not with any of the skills learned in real world throwing. Specifically, the direction of the user's hand motion and the force applied by the user near the release of the throw generally are not significant to the throwing action in the game. Also, the object being thrown is generally represented within the game independent of whether it is being held or has been released, forcing the user to adjust the control of the object to the constraints of the simulations in the game. These limitations in current approaches can produce unrealistic and difficult to learn game interaction.

The present invention comprises various techniques, applicable to many and varied computer interaction situations.

SUMMARY OF THE INVENTION

Embodiments of the present invention provide a method of providing interaction between a human and a computer, comprising causing the computer to perform an action responsive to manipulation by the human of an input device, wherein manipulation comprises motion of the input device in at least two dimensions, or application of force to the input device in at least two dimensions, or a combination thereof.

The advantages and features of novelty that characterize the present invention are pointed out with particularity in the claims annexed hereto and forming a part hereof. However, for a thorough understanding of the invention and the methods of its making and using, reference should be made to the drawings which form a further part hereof, and to the accompanying descriptive matter in which there are illustrated and described preferred embodiments of the present invention. The description below involves specific examples; those skilled in the art will appreciate other examples from the teachings herein, and combinations of the teachings of the examples.

BRIEF DESCRIPTION OF THE DRAWINGS

The accompanying drawings, which are incorporated in and form part of the specification, illustrate the present invention and, together with the description, describe the invention by way of various example embodiments.

FIG. 3 is a schematic illustration of force magnitudes decreasing over time.

FIG. 4 is a schematic illustration of force magnitudes that increase or decrease to a threshold, then decrease/increase.

FIG. 5 is a schematic illustration of force magnitudes that vary with time.

FIG. 6 is a schematic illustration of force magnitudes comprising three stages.

FIG. 30 is a schematic illustration of an implementation of a cycling interaction.

FIG. 31 is a schematic illustration of an implementation of a dribbling interaction.

FIG. 32 is a schematic illustration of an implementation of a dribbling interaction.

FIG. 33 is a schematic illustration of an implementation of a swinging interaction.

FIG. 34 is a schematic illustration of an implementation of a gun aiming interaction.

FIG. 35 is a schematic illustration of an implementation of a spell-casting interaction.

DESCRIPTION OF THE INVENTION

Figure 1:
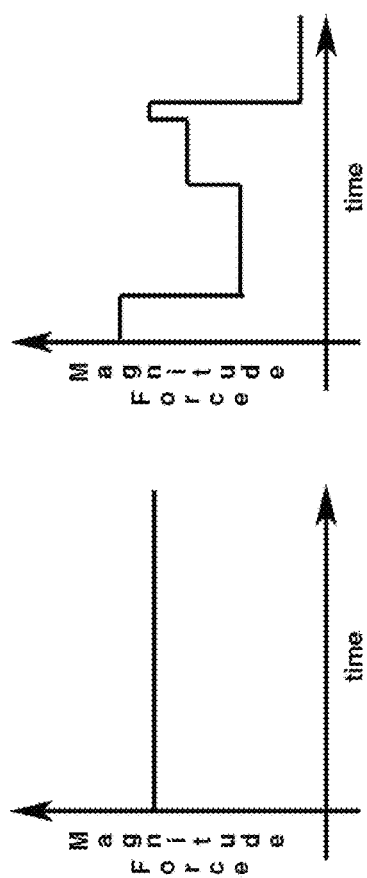
FIG. 1 is a schematic illustration of force magnitudes as a function of time.

The present description encompasses various concepts. Generally, any of the concepts herein can be used in connection with any of the other concepts. The present invention can be implemented using computer programming techniques known to those skilled in the art. As an example, eTouch3D.org's website (visited 2004) provided source code and documentation relating to suitable computer programming tools and techniques. *A Programmer's Guide*, in which Novint Technologies, Inc. owns copyright, from that website provides an example of programming tools and techniques known in the art, and is incorporated herein by reference. Also, U.S. provisional patent application 60/202,448 included computer program source code examples of suitable computer programming techniques. Example implementations of some of the concepts described herein can be found in the Game Example Listings included herewith, which listings include software routines in which Novint Technologies, Inc., owns copyright, as examples of programming techniques compatible with the present invention, and which Listings are incorporated herein by reference. Similar concepts are described in U.S. provisional application 60/431,060. Each of the above documents is incorporated herein by reference.

Many of the techniques (which can also be described herein as algorithms or methods) and concepts in one area can be applied in another area. For example, algorithms described in balancing can be utilized either directly or in a modified way in other actions such as running or jumping. An algorithm can be applied to multiple concepts that are not generally related such as cycling or flipping. Also, the separation of the description into sections and subsections is for editing convenience; the concepts described can be moved to different sections or organized in different manners. For example, dribbling a soccer ball (i.e. kicking it) can be described in connection with the kicking section or the dribbling section. Any hierarchical arrangement is for reference purposes only, and no limitations should be inferred from any such arrangement.

The coordinate systems in the algorithms, whether they are relative to a Haptic Device, a User, a Character, a virtual world, or a virtual object, can be modified through scaling, rotating, skewing, or any other type of transform to give a desired effect. Algorithms can be implemented in differing coordinate systems to give different effects. Often the Y axis is in the up-down direction (+Y up), the X axis is in the right-left direction (+X right), and the Z axis is in the forwards-backwards direction (+Z backwards).

The concepts, equations, or algorithms described in the document are not bound to obey the laws of real world physics or mathematics. For example, if two objects come in contact with one another, the force between the two objects is not required to be equal and opposite. Equations commonly used in determining real world statics, dynamics, forces, motion, thermodynamics, and other mathematically based equations can be altered. Constants and variables can be added or removed from equations to achieve different mathematical effects. For example, rather than using Newton's first equation as F=ma, the equation F=ma+t, where t refers to time can be used.

Any of the forces described in herein to be presented to a User through a Device can be generated by a local computer, game or application, from another computer through the Internet or other network. Forces can be created from a remote User with or without the use of Haptic Device, from a haptics, physics, graphics, or any other type of external card or hardware, from another robot or Device with sensors, from another Haptic Device, through wireless communication, or through any other type of hardware or software that can ultimately result in getting information to a Device controlled by a User in order to generate force feedback to the User.

Generally, when a concept is described through movement of a virtual object (including Characters) relative to a Character, User, another object, or Device, the concept can be similarly implemented by moving the Character, User, another object, or Device (or their coordinate systems) in a corresponding way relative to the object. In other words, if some part of a concept depends on the relative positions of two objects (including Characters, Users, and Devices), then it often does not matter which object moves or which stays still (or if they both move). For example, the rotation of an object in space at a fixed point can be similarly accomplished from a User's point of view by rotation of the User's viewpoint around that object. To rotate a lone object in an empty environment and see it from the side while the User remains at a fixed position looks the same on the screen as when the User spins around the object until the User's viewpoint is looking at the side of the object (where the object remained stationary). Alternatively, the User and object can each accomplish a portion of the movement.

Effects of algorithms, or the implementation of algorithms can be componentized (i.e. used based on the movements of a Cursor in a single direction), and can be scaled or modified by some type of function along any direction. The forces and effects created by any action or algorithm can be combined with any of the other forces or effects. For example, in a football game, the forces displayed to a User controlling a Character that is running can be added to the forces displayed to a User as the Character is hit. The joining of forces and effects can be a simple addition of vector forces, or it can be a more complicated combination of forces and effects to assure both stability and the intended perception by a User. A simulation of movement or a dynamics simulation can be accomplished by modifying the positions (or determining if they are motionless) of objects in each cycle of a haptic loop (or in a graphics or simulation loop). Objects can be moved like weights, as described below, and can be moved based on forces from the world, from the simulation, from the Character, from the Cursor, or from any other object in the simulation.

An object can be anything that a Cursor touches, anything that interacts with another object in a virtual world, or anything that creates a visual representation, a haptic representation, a sound representation, or another sensory representation. An object can be, or can be represented as, a point, a sphere, any other geometric shape, a polygonal surface, a volumetric representation, a solids model, a spline based model, a force field, a force, a vector, or can be described in any other mathematical way. Objects can have different representations for graphics, haptics, sound, smell, and taste. Objects can also have different representations for such things as physics simulations. The effects of an object on a Cursor often can be implemented with another object that has a different mathematical description, so when an object is described in its interactions with a Cursor or a User, it is generically used as the method to create forces or interactions with the Cursor or on other objects. Separate mathematical representations, therefore, can be used to implement the same algorithm. If an object interacts with the Cursor to create an effect or to control some aspect of a computer application or game, various properties of the object can be compared to properties of the Cursor. For example, their relative positions can be used to create an effect or control a Character. The specific properties that are described in an algorithm can be replaced with other properties of the object and Cursor. For example, in any algorithm where relative positions control a Character, relative velocities and accelerations can be used to control the Character as well. Objects and their information can be described and contained on a single computer, on multiple computers, or in online environments. Objects can interact with other objects both on a computer or online. A Character not controlled by the User can be an object, controlled by the computer through AI or some other type of control. An object can be a Cursor or a Character, or a part of a Cursor or Character.

The parameters of any algorithm can be modified to make a task or action more or less difficult based upon a difficulty level for the game or application, the current static or dynamic conditions of the virtual environment (for example weather), or the current state of a Character, or other independent influences (examples are described in the detailed description of modifiers below).

Forces that a User feels can be applied in a way to give the User the best perception of the simulation, game, or application. This is not always the most accurate or most consistent way to apply forces. An example of the concept comes from Foley artists who add sounds into movies. Often the sounds are exaggerated for effect, and audiences have come to accept the exaggerated sounds as what they should sound like in a movie (like the loud sound one hears when one Character punches another). An analogous principle can be used in haptics. A virtual object that weighs twice as much as another virtual object in a simulation can be presented to a User as weighing more than twice as much to accentuate the difference. The force of a weapon shooting can be much more than a real life weapon to give a greater effect. Similarly, the force of a weapon shooting can be much less than real life to account for the maximum force range for a Device. Generally, forces can be scaled proportionally to the range of forces that a Device can accomplish, with variations on the weighting implemented to give different emphasis and perception. The sense of touch can also be increased through multimodal sensory interactions, and even discrepancies between our senses. For example, when moving a button, adding a corresponding sound like an old rusty squeaky movement can make the button feel stiffer than the same button with no such sound. An object can feel harder based on the visual representation of an object, where the Cursor looks like it is touching a harder object. A User can feel like he or she is moving a Device more or less based on the amount of scaling that those movements have to a visual Cursor.

The interactions described herein can apply to any type of computer interaction, whether it is a game, a simulation, an application, a program, a test, or any other type of human-computer interaction. The human-computer interaction does not only apply to personal computers—it includes interactions with consoles, portable gaming systems, or any other type of electronic or mechanical interactions. Any reference herein to any specific type of interaction refers to any of the types of interactions. The term "dynamics" in the discussion of an algorithm refers to any change of state of any property or properties of an object as an application runs. This can include changes in position, size, scale, orientation, surface description, visual description, haptic description, algorithm state, or anything controlling how an object is perceived by our senses. The terms "real-life" and "real world" refer to what the names imply—something that happens in real (not in a computer) life or world.

The following items are a list of example actions, states, and effects that can be implemented utilizing techniques described in connection with the present invention: Acceleration, balancing, being hit, being injured, being pulled, being spun around, being stabbed, being tackled, biting, breathing, building, buttoning, carrying, carving, catching, chewing, chopping, climbing, crashing, crawling, cutting, cycling, digging, dragging, dribbling, driving, drumming, falling, flipping, floating, flying, holding object with weight, holding object with characteristics (gyroscope, firehose, popcorn popper, magic wand, matador cape, etc), hooking (fish hook, grappling hook), jogging, jumping, kicking (roundhouse, high kick, etc), kicking a ball, kneeing, kneeling, landing, moving head, navigating, opening/closing, painting, peeling, petting, positioning, pouring, prying, punching, pushing/pulling, riding a horse, riding a rollercoaster, riding in a vehicle, rocking, rolling, rolling an object, running, sawing, seeing and viewing, sculpting, shaking, shooting, skating, skiing, skipping, sledding, slicing, sliding, smashing, smelling, snapping a button, spellcasting, spinning a heavy disc, sprinting, squishing, stabbing, steering, stirring, swimming, swinging (on rope), swinging an object, swinging an object into another where it sticks (sword, ice pick, axe, etc), tasting, throwing, tossing, touching, tripping, twisting/turning/rotating an object, using tools (wrench, hammer, etc), whipping, whirling, writing, being in the zone, blindness, composure, dizziness, drowsiness, excitement, exhaustion, fear, frustration, hunger, love, nausea, sensuality, vibrations, magnetic points, weights, spinning discs, textures, surfaces, viscosity, gravity, deformations.

The following items are examples of games or parts of games that can be created utilizing techniques described in this document: Massively Multiplayer Online Games (including games with actions such as archery, swordfighting, jousting, spellcasting, using super powers, using martial arts), golf, archery, snowboarding, car racing or motorcycle racing, 1st person shooters (including shooting with a pistol, rifle, machine gun, gattling gun, bazooka, crossbow; movement while shooting; aiming while moving and standing still; and special weapons like in ratchet and clank, flame throwers, lasers, magnet beams, morphing guns, throwing grenades, etc), medical applications and training simulations/games (cutting instruments, arthroscopic instruments, needles, drills, probes, cameras, etc), sword and sorcery games, marble games (like super monkey ball), wwordfighting, flying sports games like Quidditch, racing games (cars, motorcycles, ATV's, or any other type of vehicle), baseball, skiing, snowboarding, skateboarding, water skiing, surfing, travel and exploration games, running, walking, horseriding, jousting, spellcasting, swinging, Mr. Potato Head, rhythm games (drumming, dancing, etc), adventure games (have Character go through a series of actions, opening a chest, grabbing a key and putting it in a lock, opening a door, grabbing something out of the mud, chopping a tree down, opening latches—like a gate latch, mortar and pestle/stirring, digging in sand or dirt), fishing (feel of casting, feel of nibbles then grab, feel of hooking fish, feel of reeling in, feel of fish swimming back and forth in water while reeling, feel of holding the squirming fish), touching photoreal images, Super Monkey Ball fighting mini-game (monkey's in balls with gloves that pop out from ball), bumper car implementation, Magneto Blocks/legos/building blocks, balancing games, walking on a balance beam, diving, Log rolling (standing on a log in water), catching and balancing stacked plates that fall, boxing, baseball, martial arts, baseball pitching, collaborative shaking hands and other User-to-User or Character-to-Character games, swimming/scuba, 3D flying, Star Wars and space craft flying, moving cross hairs, feeling lasers shooting, Superman type of flying, moto cross, boating game, Roller coaster (Feel of moving on it, design and layout of a coaster), trampoline, parachuting, "chicken" driving game (cars race at each other), collaborative games, miniature golf, baseball (pitching, hitting, catching), bowling, Olympic events, hammer throw, javelin, sprinting, pole vault, shot put, discus, high jump, long jump, weightlifting, tennis, running and jumping game, 3rd person fighting/wrestling (can have movement combos, gesture recognition, object interaction such as with a box—then when move is completed can feel it and make it happen—like a roundhouse kick), bar room brawl, hunting, hockey, soccer, kicking a ball, heading a ball, dribbling a soccer ball, running and kicking, goalie catching, goalie kicking and throwing, throwing in bounds from sideline, croquet, sling shot, rugby, tossing underhand, relay hand off, badminton, lacrosse, water polo, basketball, ducking under something that will hit you, football, stiff arming someone trying to tackle you, tackling others, gymnastics, floor exercise, beam, parallel bars, rings, vault, single bar, balance beam, rhythm gymnastics, pommel horse, baton twirling, iceskating, volleyball (including positioning of hands for bumping, setting, and spiking), frisbee golf, dodgeball, tether ball, spherical 3D Tetris kind of game, blocks falling from any spherical direction, game with removing layers or shells from sphere (rather than 2d layers in standard Tetris), catapult game, atlatl demo, 3D version of standard tetris, building layout (like for The Sims), virtual pets, petting fur, feeding pets and taking care of them, a heavy spinning disc, a turntable, a house game, turning on a faucet and feeling the water, opening a fridge, Super Mario world type of game/Sonic the hedgehog type of game (3rd person, fast paced, cartoony, small monsters, lots of jumping and running), circus themed games, unicycle riding, knife throwing, trapeze, tight rope walking, juggling, flipping, snake handling (simulating the feel of a snake moving around a virtual hand), arcade/fair games, skeetball, hooptoss, alligator hammer hitter, chainsaw, strategy games (place armies—hand of god type of demo), putting out a fire with a firehose (can also throw water from buckets), cops game, shooting pop up targets, putting on handcuffs, driving, frisbee, Ultimate Frisbee game, fish toss (like pike place market), 2D pac man game, 3D operation (have to have steady hand), 2 ball clacker, paddleball demo, model car/plane building, soldering demo, whittling wood, blind person demo (feel a stick move back and forth to walk around as if you were blind), illusion effects (ball falling down levels graphically, but only moves on a haptic plane, buttons with varying sounds to make the buttons feel stiffer—but haptics is the same, create bumps with force changing direction, but height stays the same, 2D jpeg texture demo), paper folding, cooking, chopping celery, peeling a banana, pouring a pitcher or a glass, scooping ice cream, stirring (stir a pot, a drink, etc), training simulators, kneading dough, holding a popcorn popper, cooking a hotdog or marshmallow on a fire, writing text, opening a button or snap on a shirt, rubik's cube, slot machine lever, shuffling cards, flipping a coin, Jenga, playing instruments (Guitar, violin, piano, etc.), sanding wood, drilling a hole in wood/metal, pushing a water bed, crushing a tin can, mowing, cleaning a messy house (go through a house and pick up stuff and put it away), smashing dishes in a china shop, throwing china or other breakable things on the ground, using a baseball bat, implementing a standard real-life or virtual joystick or other type of game controller, pushing buttons on a game controller or phone, opening a pop can, unscrewing a lid, pulling up a cork, frog/worm dissection, playing with toys (jack in the box, walking popper, varying size rings on cone, dump truck, lite brite, punch clown, stuffed animals, Barbie dream house), cutting a doll's hair, cutting hair, Silly putty/Plado, markers, crayons, train set, play tool set (hammer, wrench, screwdriver) or play cooking, piñata, pushing push pins into corkboard, grappling hook, a bunch of people heaving someone on a blanket, Pokemon battle-type game, cowboy games, rodeo games, lasso—swing around and pull it tight on a calf, bull riding or bucking bronco riding, diffusing a bomb, unscrewing a screw, cutting a wire, explosions in disarming a bomb if unsuccessful, building a carburetor, making logos touchable, leather whip (like in Indiana Jones), massage, barber demo, scissors, electric razor, ninja games, nunchucks, throwing stars, sais, ninja sword, grappling hook, claws, safecracking, turning knobs and listening for clicks, climbing, ice-climbing with a pick, ninja claw climbing, rock climbing, being a matador, digging in dirt with a shovel, archeology demo (digging, brushing), skydiving, lumberjack games, log rolling, wood chopping, chainsaw cutting, log throwing, Celtic games, parlor games, chess, checkers, air hockey, darts, foozball, horseshoes, hopscotch, marbles, jacks, jump rope, monkey bars, swinging, teeter totter, dancing, tattooing simulator/trainer, water balloon throwing, opening a box with a crowbar, opening a chest drawer, using a chain or whip to swing on something or swing around a corner, skipping stones, kayaking (moving kayak through gates in the water, like in Olympics), rowing game, The Sims 3D touch game, myst-type of game (a game of exploring objects and solving puzzles), squishing bugs/cockroaches, simulating feeling of throwing up, fire breathing, booger picking (and other monkey functions), torture game (pulling teeth, cutting, whipping etc), alien autopsy, feeling a bee in a milk carton, chicken plucking, Snapping a bra or suspenders, virtual sex and touching of virtual characters sexually, game implementations of Fear Factor, sculpting, lathing, painting, playing with army men, simulating battlefields (real or imaginary), oil/gas interpretation and reservoir modeling, dental simulations (endodontics, periodontics, crown design and prep, anesthesia), epidural and spinal injection simulations, touching virtual objects, creating haptic textures and surfaces, implementing dynamic feelings with objects (movement, deformation, etc), CAD/CAM applications, architectural layout, engineering layout, engineering design, simulation of a kick of a weapon, stabbing a character, hand to hand combat simulations, driving a tank, flying a plane or jet, checking the pulse on an injured soldier in a battle simulation, reloading a gun more realistically, simulating battlefield medical procedures, opening a door with a battering ram, throwing a bolo, swinging a weight around on a string or rubber band, touching and manipulating Cat scan images, touching and manipulating MRI images, touching and manipulating 3D ultrasound images, and user interfaces for the blind.

Definitions: Various terms are used in connection with the description of the present invention, and the following definition of such terms can facilitate understanding of the invention. Haptics: Haptics is the field that studies the sense of touch. In computing, haptics refers to giving a User a sense of touch through a Haptic Device. Haptic Device or Device: A Haptic Device (or Device) is the mechanism that allows a User to feel virtual objects and sensations. The forces created from a Haptic Device can be controlled through motors or any other way of transferring sensations to a User. The "position of a Device" typically refers to the position of a handle on the Device that is held by User. Any of the algorithms described can vary depending on where the handle of the Device is within its workspace. Haptic Devices can have any number of Degrees of Freedom (DOF), and can have a different number of DOF for tracking than for forces. For example a Haptic Device can track 3 DOF (x, y, and z), and output forces in 3 DOF (x, y, and z), in which case the tracked DOF are the same as the forces DOF. As another example, a Haptic Device can track 6 DOF (x, y, and z, and rotation about x, y, and z), but only have 3 DOF (x, y, and z), in which case the tracked DOF are a superset of the forces DOF. Additionally, any of a Device's DOF can be controlled by direct movements not relative to a fixed point in space (like a standard computer mouse), controlled by direct movements relative to a fixed point in space (like a mechanical tracker, mechanically grounded to a table it is resting on, where it can only move within a limited workspace), or controlled by forces against springs, movements around pivot points, twisting or turning a handle, or another type of limited movements (joystick, spaceball, etc).

User: A User is a person utilizing a Haptic Device to play a game or utilize some other type of application that gives a sense of touch. The User can experience a simulation or game in ways that are consistent with a Character (described below) such that the User feels, sees, and does what the Character does. The User can also have any portion or all of the interactions with the simulation be separate from the Character. For example, the User's view (i.e. what is seen on the monitor) does not have to be lined up with a Character's view (i.e. what a Character would see given the environment and the location of the Character's eyes), whether the Character is currently being controlled or not. The User can directly feel what a Character feels, through the Haptic Device (for example, the weight of picking up an object), or the User can feel a representation of what the Character feels to varying degrees (for example a haptic representation of the Character spinning in the air).

Character: A Character is a person or object controlled by a User in a video game or application. A Character can also be a first person view and representation of the User. Characters can be simple representations described only by graphics, or they can have complex characteristics such as Inverse Kinematic equations, body mass, muscles, energy, damage levels, artificial intelligence, or can represent any type of person, animal, or object in real life in varying degrees of realism. A Character can be a complex system like a human, or it can simply be a simple geometric object like a marble in a marble controlling game. Characters and their information can be described and contained on a single computer, on multiple computers, and in online environments. Characters can interact with other Characters. A Character can be controlled by the position of a Device or a Cursor, and a Character can be any Cursor or any object.

Cursor: A Cursor is a virtual object controlled by a User controlling a Haptic Device. As the User moves the Haptic Device, the Cursor moves in some relationship to the movement of the Device. Typically, though not always, the Cursor moves proportionally to the movement of the Haptic Device along each axis (x,y,z). Those movements, however, can be scaled, rotated, or skewed or modified by any other function, and can be modified in these ways differently along different axes. For example, a Cursor can be controlled through a pivot point, where a movement of the Haptic Device to the right would move the Cursor to the left (the amount of movement can depend on a simulation of where the pivot point is located with respect to the Cursor). A Cursor can be a point, a sphere, any other geometric shape, a polygonal surface, a volumetric representation, a solids model, a spline based object, or can be described in any other mathematical way. A Cursor can also be a combination of any number of those objects. The graphical, haptic, and sound representations of a Cursor can be different from each other. For example, a Cursor can be a perfect haptic sphere, but a polygonal graphical sphere. A Cursor can be controlled directly, or can be controlled through the interactions of one or more virtual objects that interact with another virtual object or other virtual objects. For example, a Haptic Device can control a point that is connected to a sphere with a spring, where the sphere is used as the Cursor. A Cursor's movements can be constrained in the visual, haptic, audio, or other sensory domain, preventing the Cursor, or its use, from moving into a specified area. Cursor movements can be constrained by objects, algorithms, or physical stops on a Device as examples. The position of a Cursor and the forces created can be modified with any type of linear or non-linear transformation (for example, scaling in the x direction). Position can be modified through transformations, and the forces created can be modified through an inverse function to modify the perception of Cursor movements, to modify objects (such as scale, rotation, etc), or to give interesting effects to the User. A Cursor can have visual, haptic, and sound representations, and any properties of any of those three Cursor modalities can be different. For example, a Cursor can have different sound, graphic, and haptic representations. A Cursor does not need to be shown visually. Also, a Cursor can vary in any of the ways described above differently at different times. For example, a Cursor can have a consistent haptic and graphic position when not touching objects, but a different haptic and graphic position when objects are touched. A Cursor can be shown graphically when preparing to perform an action (like beginning a snowboard run, beginning a golf swing, or selecting an object), and then not shown graphically when performing the action (snowboarding, swinging a golf club, or holding an object, respectively). A Cursor can also be a representation of a User's interaction with a Character or an action, rather than a specific object used to touch other objects. For example, a Cursor can be the object used to implement a golf swing, and control the weight and feel of the club, even though the User never actually sees the Cursor directly. A Cursor can change haptic and graphic characteristics as a function of time, or as a function of another variable. A Cursor can be any object, any Character, or control any part of a Character or object. A Cursor can be in the shape of a human hand, foot, or any other part or whole of a human, animal, or cartoon. The shape, function, and motion of a Cursor can be related to that of an equivalent or similar object in the real world. For example, a Cursor shaped like a human hand can change wrist, hand and finger positioning in order to gesture, grasp objects, or otherwise interact with object similar to how hands interact with real objects.

Tools.

Some of the example embodiments make use of similar concepts and implementations of human/computer interaction, referred to herein as Tools. Some of the Tools used include the following. Input. An input can be any type of human computer interaction that allows a User to input information into the computer. Input devices include any DOF Haptic Devices, keyboards, a mouse, voice recognition, head mounted tracking units, gyroscopes, gamepads, buttons, switches, triggers, joysticks, knobs, wheels, camera units, electromagnetic signals, radio frequency, acoustic inputs, light inputs, video game peripherals, microphones, or any other type of device that can input a signal into a computer. Any of these inputs can be used to signal an event in an algorithm, or control any aspect of an algorithm including Cursors, objects, and Characters.

Vibrations. A vibration is a vibration felt by the User when the Haptic Device vibrates. One way to implement a vibration is to create small forces that are quickly turned on and off, or ramped up quickly and ramped down quickly. The forces can be in randomized or determined directions, and comprise parameters such as force duration, time between forces, and force direction. Springs. A spring can pull a Cursor towards a point, or pull an object towards another object. Springs can be linear and can create a force based on the relative positions of two objects, such that $F=kX$, where F is the force created on the objects, k is a spring constant, and X is the distance between the objects. Springs can be much more complicated, and can be any type of function based on any characteristics of the objects and can vary with time. For example, a spring force can be defined as $F=f(x)*f(t)*X$, where F is the force created on the objects, $f(x)$ is a function that varies based on X, $f(t)$ is a function that varies based on time, and X is the distance between the objects. The objects can be a Cursor and an anchor point, a Cursor and an object, or two objects as examples.

Magnetic points and magnetic surfaces. A magnetic point pulls the Cursor towards a point like a spring. A surface can also be magnetic, so that the Cursor is attracted to the surface, and has to pull away with a minimum force to stop touching the surface. A magnetic surface can be implemented with a force that pulls toward the surface with a magnitude as a function of the distance from the surface. A function might be zero at the surface, ramp up to a max force over a distance, and ramp back down to zero over another distance. Spinning disc. A spinning disc, or any other type of spinning object, is similar to a weight, in that it is an object that moves. Rather than changing position, however, it changes orientation, and rather than determining its change from mass, acceleration, velocity, and position, changes in its orientation come from inertia, angular acceleration, angular velocity, and angular position (orientation).

Weights. Weights can be used in a variety of applications where dynamic motion is felt by a User. A weight moves during each cycle of a graphics, haptics, or simulation loop, based on the weight's properties. The movement of a weight can be based on properties such as mass, Forces applied to it, acceleration, gravity, velocity, and direct positional changes. A weight's movement can be implemented by determining forces acting on the weight and determining a vector acceleration based on the forces. Given a mass of the object, the overall acceleration can be determined by adding individual accelerations created by each force, $A=F/m$, where F=the vector force applied to the object, m is the weight's mass, and A is the acceleration created by that force. Velocity can be determined by $V=V0+At$, where V is the velocity of the weight, V0 is the previous velocity of the weight, A is the acceleration of the weight, and t is a constant that represents time. Position can be determined each cycle of the loop that controls movement with $P=P0+V*t+0.5 A*t*t$, where P0 is the previous position, V is the velocity, A is the acceleration, and t is a constant that represents time. Changing the time variable can create User effects so that the weight moves at different rates relative to the User's movements. The speed of the loop that controls movement (i.e. the Hz rate) can be modified as well for a similar effect. A weight's movements can be constrained in a direction of movement (along an axis, along a surface, etc). The weight's characteristics can be modified based on the state relative to a User's inputs as well. For example, a weight's properties when held by a User can be different than its properties after it is thrown into the air. A weight's movements can be modified by an environment. The environment can be shared with a Cursor, Character, etc., or it can be used solely in the simulation of the weight's movements. For example, there can be specific areas where the weight cannot move as freely because its movement is damped. There can be areas that the weight cannot move past, or areas that change its direction. For example, a weight can hit a wall, at which point its velocity changes direction, and the weight can lose some energy. Many of the variations on how a weight can be implemented are described herein as specific objects (Balance Objects, Climbing Objects, etc. can be implemented as weights). Generally, anything described for one type of weight object can be implemented in any other type of weight object.

Textures. Textures can be created by haptic effects applied to a surface, a volume, and any object or collection of objects. For example, a texture can be applied to a two dimensional plane, a sphere, an electromagnetic field, or to acoustic waves to name a few. Friction (coulomb, static, kinetic, etc), viscosity, stick points, oscillations, vibrations, and force functions are possible ways of applying textures to objects, Characters, or any other surface or volume. Textures can mathematically represent textures of real world objects, or can represent any mathematical variation of real world objects to deliver a desired sensation to the User. Several implementations of Textures are described in the Touching Objects section.

Viscosity. Viscosity is a force opposite the direction of movement, proportional to velocity. Viscosity can be generated by pulling an object attached to a spring with a Cursor, or by similar means resulting in similar force characteristics. Viscosity can be applied to any volume, object, or space, and can vary as a function of depth, temperature, time, acceleration, or any other variable. Gravity. Gravity is an acceleration on an object or a weight. As an example, gravity can be represented the by gravitation acceleration relative to the Earth defined to be −9.8 m/s^2. Gravity can also be scaled, rotated, skewed, or otherwise manipulated to achieve a desired effect of the intended acceleration. Deformation. Deformations can occur on a surface, when the Cursor touches that surface and it changes its shape. Stick points. A stick point can be created by placing a mass on a spring attached to a Cursor. When a Cursor contacts an object, a stick point can resist motion of the Cursor both normal and tangential to the contact surface. The force characteristics of a stick point can vary along different axes, and can change as a function of depth of the Cursor into a textured object or as a function of any variable.

Force Functions.

A collision or contact force between Cursors, objects, and Characters can be represented by a single force function or any combination of multiple force functions. A force function or a section of a force function can be represented by a linear, exponential, hyperbolic, quadratic, sinusoidal, or other non-linear trend for a period of time. In the graphical representations herein, the linear and non-linear trend representations are denoted with f(V), where f(V) indicates a function of some variable.

Forces presented to a User through a Haptic Device can utilize force functions to implement the force in order to give an effect, when touching or interacting with an object, to create textured effects, when in a specified area for a period of time, as indicators, when representing any of the objects described below such as a Balance Object, Climbing Object, etc., or to present other forms of force feedback to a User.

While forces can be evaluated in terms of the force magnitude, the actual force can vary in terms of any of the vector components of the force in any direction in 3D space. A force presented to a User can be any type or combination of types of force functions in any direction. When a force magnitude is referred to as changing over time, there can be an equivalent negative representation. For example, if a magnitude is said to increase then decrease, it can also be assumed that it can decrease then increase. Any portion, section, or part of a force function curve can be negative, or can be an inverse or mirror image of another curve. Both time and magnitude relative to a force function can be negative. Any axis, function, curve, or portion of a force function can be scaled, rotated, skewed, transformed, mapped, or otherwise altered or modified. A force can be applied at a constant magnitude for a period of time. This type of force response can be repeated at different magnitudes for varying amounts of time, as illustrated in FIG. 1.

Figure 2:
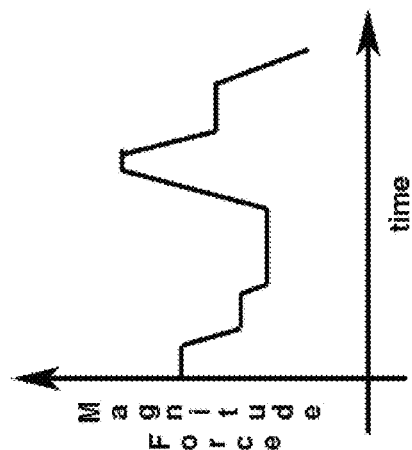
FIG. 2 is a schematic illustration of transitions between force magnitudes.

Transitions between portions of a force function, portions of a curve, or between functions can have transitions to smooth the feel of the force, maintain Device stability, or otherwise alter the feel of the force function, as illustrated in FIG. 2. A force magnitude can increase or decrease from one value to another value at a later time, at which point the force remains constant, as illustrated in FIG. 3. A force magnitude can increase/decrease to a threshold value at which time the force magnitude can begin decreasing/increasing, as illustrated in FIG. 4. A force magnitude can increase then decrease and then increase again. Each of the three stages of force change can represent the same or different variable function, and can last for any period of time. For example, a liner equivalent of this type of force function can produce a saw shaped curve, while a non-linear equivalent can produce a sinusoidal shaped curve, as illustrated in FIG. 5. A force response function can be described by three stages. The first stage is an increase in the force magnitude indicating the start of a collision or contact. The second stage occurs after the force increases to a threshold magnitude value at which time the force can continue with a specific variable function before moving onto the third stage where the force magnitude begins declining to indicate the end of the collision or contact. Each of the three stages can be any other force, combination of forces, or force function, as illustrated in FIG. 6.

Figure 7:
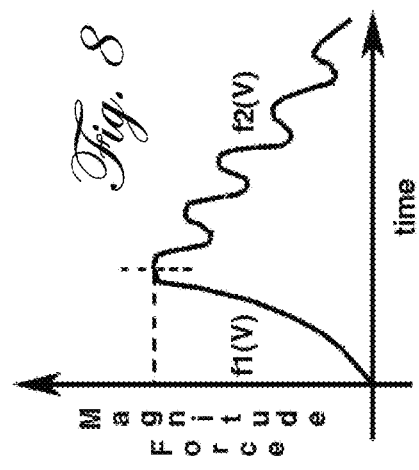
FIG. 7 is a schematic illustration of force magnitudes that remain constant for a period of time.
Figure 8:
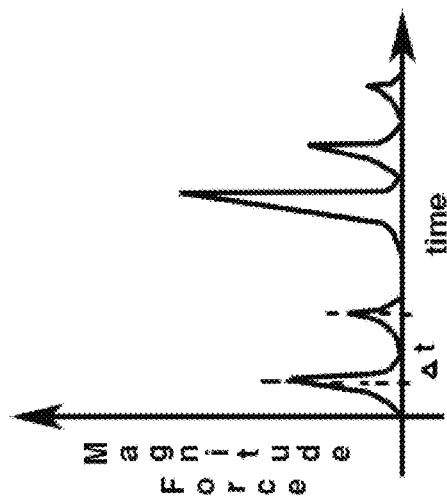
FIG. 8 is a schematic illustration of force magnitudes that decay with an oscillating pattern.
Figure 9:
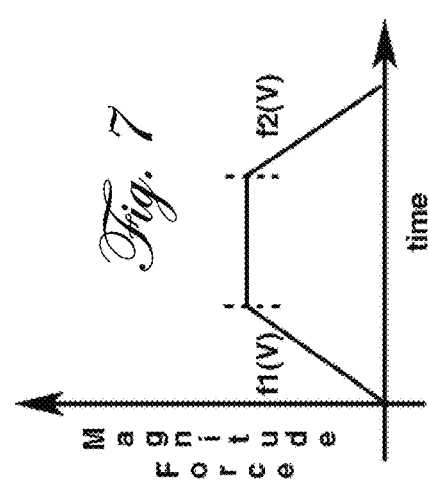
FIG. 9 is a schematic illustration of force magnitudes with rapid increase and decrease characteristics.

A force function can increase to a threshold value, at which point it can remain constant for a period of time. The shape of this type of curve can look like a plateau, with the rising and falling slopes consisting of any function. The relative time the force remains constant is variable for any length of time. One possible use for a plateau force function is to simulate an impact, smacking, or collision force, as illustrated in FIG. 7. A force function can increase in magnitude to a certain value before declining with a time varying force curve. The declining force can consist of an oscillating, sinusoidal, repeating, square wave, or random combination of a time varying pattern. One example of an implementation of this type of force function is to simulate a crash. The impact of the crash is felt by the maximum threshold magnitude. The decreasing magnitude can represent a violent shaking, vibrating, rumbling, settling, or other type of sensation variable in length of time, magnitude and frequency, as illustrated in FIG. 8. A force function can be created by a rapid or instantaneous increase of a force followed by a rapid or instantaneous decrease of the force. The resulting force function can resemble an impulse type of response. One example of using this type of force function is to simulate a quick tap, pop, or strike to a User. Impulse functions such as this can be combined together in a specific or randomized manner to create different sensations. The magnitude of each impulse, and the time between impulses can be set to a specific value, dynamically changed, or organized in a random order. Combining multiple rapid impulse type forces can be used to simulate vibrations, random contacts such as hail, textures, being shot, or any other type of contact or interaction force, as illustrated in FIG. 9.

Figure 10:
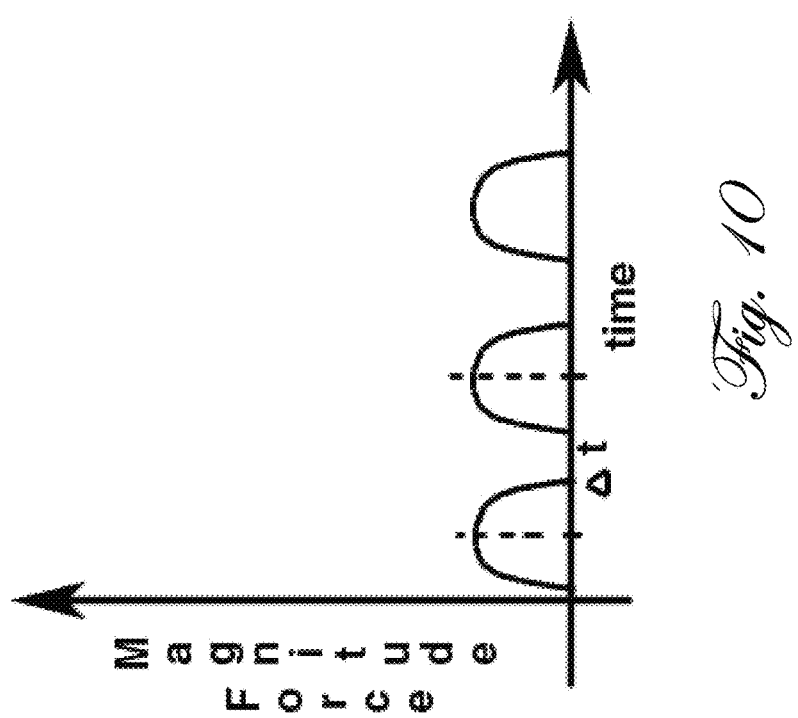
FIG. 10 is a schematic illustration of force magnitudes with a repeated pattern.

Any function or collection of functions can be combined in a repeated form similar to the description of impulse forces above. Some examples of repeating a curved function, as shown below, is to simulate a bumpy texture, simulate a series of events such as walking up stairs, or simulate an uneven surface such as a skier going over moguls, or a car driving over washboards, as illustrated in FIG. 10. A force function is not required to exert forces on a User in the direction of a contact, collision, etc. For example, when catching a projectile object, the initial force can be in the opposite or different direction of the motion of the object. This force can continue in the opposite direction of motion, or the force can change direction after a period of time. Presenting forces in the opposite direction as physically expected can be used to maintain Device stability, reduce or increase the overall force felt by the User, or to allow a User to perceive the force as being stronger, weaker, or different than it normally would be in the real world.

Centering a Cursor.

It can be desirable to center the Cursor or center a Device during an application, so that a User has an optimal range of motion before performing a specific action or so that the Device is optimally situated to give the best forces. For example, when balancing, the Device can be centered so that the User has an optimal range of motion to maintain balance without running into mechanical constraints of the Device while it is moved. Centering can be accomplished by creating a visual object that a User needs to grab, such that when the User grabs the object, the Device is centered or the Cursor is in a correct position. Centering can also be accomplished by creating forces that lead a User to the correct position (often in conjunction with graphical cues). The force can be a Spring that pulls the Cursor to a position, or the forces can be more complex such as vibrations that change as a Cursor approaches a correct position, or a modification to a spring that is determined by what the User is doing. For example, if a User does not move to the correct position over time, then the User might feel some quick tugs to get his or her attention and help lead the movement of a Device.

User Events/User Control/Pattern Detection.

Any User input, such as moving a Device, can cause a Cursor, Character, or object to interact with an Event Object (EO). An EO can be utilized to signify that an event, or series of events, has occurred in an application or algorithm. A User can interact with an EO to indicate a User input, a User action, a pattern, or any other type of User interaction with an algorithm. When not specifically stated herein, any User input, action, control, or event can be implemented using an EO.

An EO can be any geometric shape, volume, object, pattern, path, trajectory, point, space, physics model, lookup table, area, force, or any combination or portion of the previously named items. An EO can also be a generic mechanism that receives User inputs and determines appropriate sensory outputs to the User or application. An EO can have any combination of haptic, graphic, audible, or other sensory feedback characteristics.

A User controlled event can be created by interacting with an EO through touching, exerting force, position, velocity, acceleration, accuracy, precision, motion, time, a relative relationship between a Cursor and an EO, or any combination of any of the previously listed items. A User controlled event can also be any other type of computer or application input. An EO can provide any combination of forces, such as spring, viscous, texture, magnetic, weight, any force function, or the EO can have no haptic properties. A Cursor can reside on the inside, outside or in the same space as the EO. An EO can be broken, separated, portioned, or otherwise structured into components of faces, sections, segments, vertices, spaces, walls, paths, or other distinguishing components that can be interacted with to indicate different events or actions with respect to the same EO. All EO components can be statically set, or can dynamically change over time.

A User can interact with an EO through the use of buttons, touchpads, joysticks, or other input devices or peripherals. A User can create patterns with buttons or other inputs where the button inputs can affect the EO. Forces created by the EO can be presented to a User through a Device in response to the User inputs. For example, each time a User presses a button on a keyboard, a small impulse force can be presented to the User. The forces used to indicate a User input can be any force function as described above, or the User might not feel any force feedback in response to an input such as a button press.

Figure 11:
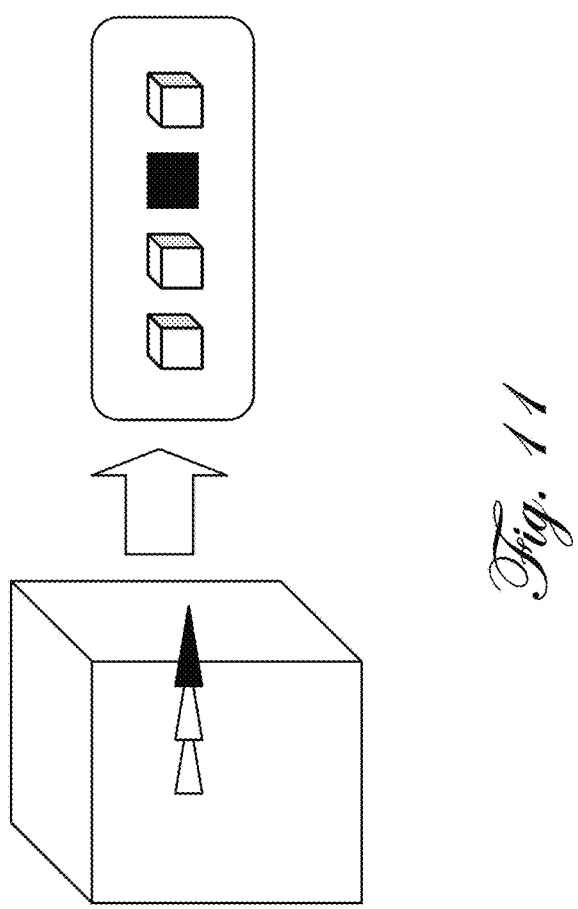
FIG. 11 is a schematic illustration of selecting a button by pressing a cursor against a side of an event object such as a box.
Figure 12:
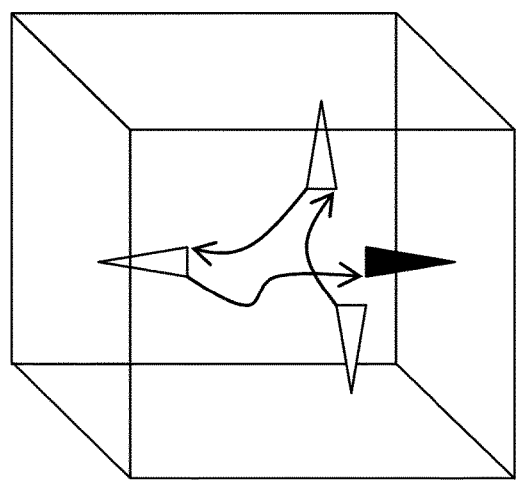
FIG. 12 is a schematic illustration of a patterned input.

A haptic cube surrounding a Cursor is an example of an EO. The Cursor can interact with the EO by pressing against the inside walls of the EO with spring forces to keep the Cursor inside the EO. Each time the Cursor comes in contact with one of the faces of the EO a specific event can be noted. As examples: Pressing the Cursor against the left side of the EO can indicate a potential part or component of a pattern, similar to pressing a specific button on a video game controller. Pressing the Cursor against the right side of the EO can indicate a different component, such as pressing a different button on a video game controller. In the figure, moving the cursor (indicated by a triangle) to the right wall can correspond to pressing the third button from the left (indicated by a darkened, flat button), as illustrated in FIG. 11. Contact with each wall of the EO can represent a different potential component of a pattern. A pattern can result from any combination of interactions with the EO. An example of a pattern with the cube EO can be defined as pressing left, then right, then up, then down. The pattern is completed by pressing, tapping, or otherwise moving the Cursor against the left wall, followed by the right wall, top wall, and finally the bottom wall without contacting other walls to change the contact pattern, as illustrated in FIG. 12.

Any of the action objects described in this document such as a BO, CLO, HO, etc. can be considered an EO. The same methods and descriptions described for interaction with an EO can be applied to any of the other action objects. A series of interactions or events with respect to an EO can result in different event combinations or patterns. Determining if a pattern is completed successfully with respect to the EO can be based on various criteria and parameterizations. The criteria can be based on time, speed, positioning, size of the pattern, orientation, idle time, force, event order, distance, or some other mathematical relationship between Cursors, Characters, objects and EOs. Criteria can be defined for a pattern or series of events such that complete success, partial success, or failure of the intended result occur.

Figure 13:
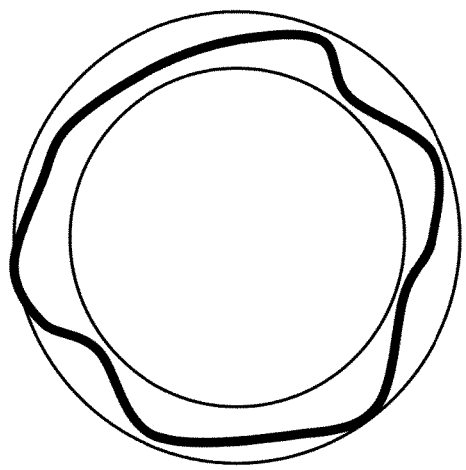
FIG. 13 is a schematic illustration of a user input falling within a criteria for acceptance as a circle.

An EO constrained to a path trajectory can vary in partial success in terms of absolute or relative error to a desired path. This error can be measured by taking the vector distance between a Cursor and the desired path, by measuring the distance between a Cursor and a point in space or other EO, or by any other method in which the difference can be assessed. For example, when completing a circular path, if the Cursor remains within a threshold radius distance limit for the duration of the circle completion, the pattern can be considered completed, as illustrated in FIG. 13. The radius of the circle can be limited to be a specific size, or can vary as long as it meets the requirements of a proposed circle. One method to calculate a dynamic radius circle completions is to account for the position of the Cursor when the circle is started. The vector direction of the Cursor's motion can be used to help define the plane on which the circle resides. The initial angular arc of the Cursor can define the desired radius and the center of the circle. A range can be imposed with a positive allowed error relative to the desired radius, and a negative allowed error relative to the desired radius. If the Cursor remains within the radius limit while completing the circle back to the point, or within a threshold distance of the starting point, the circle can be considered complete.

Figure 14:
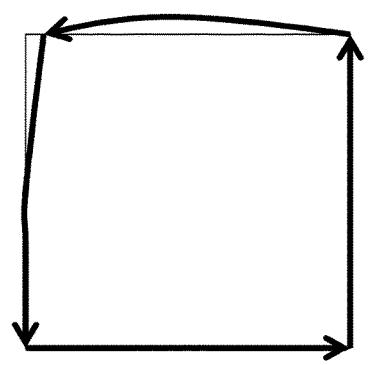
FIG. 14 is a schematic illustration of user input approximating a rectangular input pattern.

Variables such as the positive and negative radius limits, and the threshold distance from the starting point to complete a circle can be altered, skewed, rotated, or otherwise changed to alter the desired shape and to change the difficulty of completing the desired pattern. Error can also be measured in terms of a generalized direction or continuous motion of the Cursor. If a desired pattern has a specific size, shape, direction, or orientation and the implemented Cursor motion has additional movements, or otherwise differs from the intended pattern, the success can vary. An example of a directionally defined pattern can consist of performing a clockwise circular motion. If a counter clockwise circular motion, the pattern can be considered failed. A pattern can have requirements to have a smooth shape. A limitation on a square patterns success might be that each side of the square must not vary more than a certain amount or certain percentage away from a straight line between the start and the end of the edge. Therefore if a curve is added to one of the sides, or an oscillating jagged pattern is added while completing one of the sides, the square pattern can be considered partially successful or fully failed, as illustrated in FIG. 14.

Partial success of a pattern can alter the resulting effect of an action, pattern, motion, or event. Partial success can depend on the relative relationship between the error in performing a pattern and the intended pattern. Error can be a mathematical quantity such as a vector distance, or an event indicator such as contacting the wrong wall of a cube EO than was intended. Performing an action or pattern with zero error, or with an error below an acceptably defined value, can cause the action associated with the pattern to be performed perfectly with maximum force, speed, acceleration, or other characteristics of the event. Increased error can reduce the force, speed, acceleration, or other characteristics of the event on any some scale relative to the intended action (e.g., decreased proportionally according to the error). Increased error can also change the intended result of the pattern or event, if the error reaches an algorithm specified threshold value. A line pattern can be used as an example of how error effects the resulting action of the pattern. A line pattern can be defined as moving the Cursor from one point to another point in the shortest distance possible. If a User is completing a line pattern to throw a punch in a fighting game, a perfectly straight line can result in the hardest, fastest possible punch. Adding a slight spike or impulse somewhere alone the line pattern can reduce the speed or strength of the punch. By adding curve to the path in the form of a hemisphere for example, the error can be considered too large to throw a punch, resulting in a different action such as a wave, or no action can result.

Speed or time requirements of interacting with an EO can be utilized such that any two components of a pattern must be completed within a certain amount of time, or that an overall pattern must be completed within a certain amount of time. The speed at which a pattern is completed can alter the end result of the action. For example, when completing a left-right-left tapping pattern to kick a ball, a rapid completion of the pattern can result in a harder, faster kick while a slow completion of the pattern can result in a slower, softer kick. Criteria can be combined to give different force effects. In the example above, a faster kick can result in a higher magnitude force function as compared to the slower kick. Any combination of criteria can be combined to alter, skew, or otherwise change the associated force response. Limitations or requirements can be placed on the velocity of the Cursor, Character or the EO. A threshold velocity can be required before an action or pattern can be completed, or the velocity can be required to remain below a certain threshold value. Restrictions on velocity can apply to any part, whole, or combination of patterns or events.

Detection of User input, event, or path can be done in a haptic loop, graphics loop, physics loop, any other software loop or function, or in hardware such as a graphics card, physics card, or haptics card. A method that can be used to evaluate a User input or event is to compare the state of a current software variable in the haptic, graphic, or other software/hardware loop to the value of the same value during the previous algorithm loop. For example, this method can be used to keep track of how variables change over time. Patterns can depend on the relative position of the Cursor in the virtual environment. The environment, Device workspace, or visual display of the environment can be broken into sections, each of which has different characteristics. For example, a User creating a circular pattern with a magic wand while the Cursor is in the upper right quadrant of the display screen, Device workspace, or Cursor workspace, can initiate a fireball event. Performing the same circular pattern in the bottom left quadrant can initiate a snowball event.

The method in which an algorithm begins to check for a specific pattern can vary. Pattern detection can begin by a User controlled input such as pressing a button or by some other input method. A pattern can begin from a software determined event, such as the moment a skateboarder begins a jump off of a ramp. Pattern detection can also always be running such that any time a User completes a pattern known to the algorithm, a resulting event occurs. Patterns can be detected relative to a reference point. A reference point can be static or dynamic and can be defined by the User, an algorithm, a random specification, a specific state of an application, or by any other method. A reference point can be set to a static position in space. A static reference point can require the Cursor to be within a certain distance of the point in order for patterns to be recognized. A reference point can be set by an event in the software algorithm. For example, when a snowboarder goes off a jump, the pattern reference point can be set to the position of the Cursor, Character, or another point as the snowboarder leaves the jump. The reference point can then change or be reset on completion of the jump, on completion of a pattern, movement of the Cursor or Character, or any other reason. A reference point can be manually set by an external input from the User such as a button press. For example, in a fighting game, the User can press a button, and perform a left-left-down motion pattern relative to the position of the Haptic Device at the moment the button was pressed.

The depth of the Cursor relative to the virtual environment, Cursor workspace, or Device workspace can be used as a spatial consideration to evaluate events and patterns. The actions and motions involved in creating an event or pattern can be depth-dependent or depth-independent. Depth independence can aid in making tasks easier, reducing the need to use depth perception, and allow Users to perform the same task irregardless of the Cursor's position in terms of depth, for example into the workspace along the Z axis. Depth dependence can allow a wider range of flexibility for performing tasks. The use of depth for defining a resulting event can be used by the absolute depth such as a threshold value, or the relative depth such as the direction of motion. For example, in a swordfighting game, a pattern completed with moving the Device forward into the workspace can result in an aggressive sword attack. The same pattern performed while moving the Device backward away from the workspace can result in a defensive shield being raised. For example, when the Cursor is greater than a specified Z depth, all Cursor controls can control a sword. When the Cursor is less than the Z depth, all Cursor controls can control a shield. The Z depth for changing from sword to shield and from shield to sword can be different. The concept of having different Cursor spatial areas controlling different types of Character actions can be applied to any type of action. The same concepts for depth can be applied to any axis, direction, or combination of directions, positions, or orientations.

An EO can be used to create another EO, multiple EO's or combination of EO's. In creating an event, input, or pattern, an EO can also be part of a hierarchy of EO's. One possibility for such a hierarchy can be a method of organizing or grouping actions in a structured manner. By performing a pattern or action with respect to an EO, another EO can be created with the same, similar or different function or purpose. A User can interact with the new EO in the same manner, similar manner, or completely different manner as the previous EO. For example, in a spell casting game, a triangle pattern with respect to an EO can be used to specify the User wishes to cast a spell in a certain group or family such as a fire spell. Upon completing the triangle pattern, a second triangle pattern can be used to cast a specific spell in that group or family such as a fireball.

A hierarchy or combination of EO interactions can consist of any number of levels of EO's. Any new level can be created by performing a pattern or action with respect to an EO. Each level of a hierarchy can consist of patterns or events that bring up a new EO, multiple EO's, result in an event occurring, or any combination of these items.

Graphics relating to an EO or representing an EO can be of any form and can be scaled, translated, rotated, can also be a symbol, icon, something relating or not relating to the associated EO, action, or event. Graphics can be used to aid in navigating through a hierarchy. A graphical cue can indicate the current location within the hierarchy, the hierarchy as a whole, or any part or component of the hierarchy. For example, in a spell casting game, when the location within a hierarchy indicates that fire spells can be cast, a graphical indicator can be used to indicate the current level within the hierarchy is for fire effects. A graphical indicator can be a small icon located in the corner of the visual display, or any other location. The color, texture or graphical representation of a Cursor, Character, or object can change as a means of indicating the current event, effect, or state within a hierarchy.

When interacting with an EO, forces can be presented to a User through a Device such that the interaction with an EO and the resulting effect of interacting with an EO can be felt. A pattern or event, and the associated forces can lead into any other action or event. A force relating to an interaction with an EO to create an event can be changed to create a smooth transition with the resulting event. The transition can include increasing or decreasing the magnitude of applied forces, adding forces in different directions, or otherwise alter the forces to control the overall effect. Transitioning the forces can be used to maintain Device stability, prevent or control large forces to the User, smooth the feel of the action, or alter the intended effect.

Forces can be used as indicators for interacting with EO's, as well as to create new EO's. For example, when interacting with a haptic cube, a Cursor can break through the walls of the cube when a sufficiently high force is applied. The force response can be a spring force while pushing against the walls, then quickly ramp down when a threshold is reached resulting in breaking a membrane type of feeling. After breaking through one of the wall membranes, an event can occur, or a new EO can be created. For example, in a spell casting game, a haptic cube can be used as an EO to choose families of spells. If the Cursor breaks through the top wall the User can be allowed to cast Air spells with a new EO. Similarly, pushing through the bottom wall can allow Earth spells, the right wall for Fire spells, the Left Wall for Water spells, forward for Travel spells, or backwards for Mind spells.

Interaction with an EO can be mapped to or result in direct interaction with another Cursor, Character or object. The actions, forces, motion, velocity, or other characteristics can apply from interaction with an EO. For example, by touching and sliding across a cube EO, a cube object at a different location can slide proportionally to the sliding of the Cursor on the EO. A User can feel the properties of the object through contact with the EO such as weight, mass, acceleration, texture, or any other properties. Movement of an EO can control, be related to, or map to an object in an application. Such as by pulling a level EO, a lever moves in the application.

In the process of completing a pattern, forces felt by the User can be increased or decreased in order to alter the difficulty of performing the given pattern task. Forces can be used to help correct the movements of a User by resisting against a potentially incorrect movement component of the pattern. For example, when completing a circular pattern, if the Cursor starts to move too far away from the intended radius, a vector force can be added in the direction to pull the Cursor toward the center of the circle. Forces can be used to aid in completing or hinder completion of a pattern. For example, in a shooting game, an advanced high level Character can be aided in throwing a grenade to complete a pattern by having forces that direct the Cursor toward the next component of the pattern while also possibly having forces with a component perpendicular to the desired path to restrain the Cursor from moving away from or off of the current pattern path. Alternately, if the User is performing a pattern to shoot a shot that will injure an ally, forces can push against the current Cursor direction to resist or hinder the current pattern in progress from being completed.

An EO can have dynamics or can move on its own. The resulting dynamics of the EO relative to a Cursor, Character, or object can be felt by a User through the Device. The dynamics can be strictly graphically represented, and can have no force feedback to the User. One possible implementation of dynamically changing is to alter the difficulty for a User to complete a task or pattern with an EO.

The individual movements of a Haptic Device, such as the movements relative to an EO, can have an equivalent mapping to existing computer input devices or video game peripheral devices. The mapped motions or patterns can be of any form and might or might not be related in some way to the peripheral Device being mapped. For example, a leftward motion relative to an EO with a Haptic Device can have the identical or similar function as the 'Square' button on a Sony Playstation video game controller. Similarly, a rightward motion can map to the 'Circle' button, an upward motion to the 'Triangle' button, and a downward motion to the 'X' button. Any motion or pattern can be mapped to each button of a specific peripheral. This type of mapping allows for direct integration of existing pattern detection and recognition currently implemented in all video games or computer software applications.

The motions and relative spatial positioning of an EO, or group of EOs, can be mapped to spatially align or be similar to existing peripheral devices. For example, in using an Xbox video game controller, equivalent positioning of EOs can create a four button pad on the right half of the workspace, navigation joystick controls on the left half of the workspace, and addition functions relative to the location of additional buttons on the controller.

Specific Haptic Device motions or patterns can also be mapped to multiple buttons on a peripheral Device. A single pattern with a Haptic Device can represent a combination of key presses on a computer keyboard. For example, a rapid motion against an EO creating an Up-Down-Up pattern can represent a Control-Alt-Delete combination keyboard press. Combining multiple key or button presses into Haptic Device patterns can be used to improve efficiency of using a peripheral, and allow for new types of interacting with peripheral functionality.

A virtual keyboard can be created in 3D space such that each key of the keyboard can be an EO. A User can interact with the keyboard by pressing each button with a spring or weight force feedback response. The keyboard can have a graphical representation; the graphic representation can but does not need to match the haptic representation. Motions can be created or defined for interacting with the keyboard. An example in the place of key presses can be a form of wand waving, such that each motion of the wand types a letter, or as mentioned above, a combination of presses.

The number of accessible patterns to a User for any given application can change depending on the level difficulty, level of Character advancement, practice of a pattern or set of patterns, current Character modifiers, weather, or other reasons relating to the Character or state of the application. The number, types, and methods for performing actions with an EO can change over time.

An algorithm can learn patterns as they are completed by the User. This can allow Users to input individual preferences for moving the Device such as how far or fast movement is preferred. Pattern learning can be implemented by allowing input of desired patterns at the beginning of a game or application. A User can be instructed to perform a desired pattern for a desired effect. The User can perform a pattern with a starting and ending event, such as a button press. A preferred pattern can be input a single time or multiple times for verification depending on the instructions or requirements of the algorithm. Graphics can be used to help define a pattern, possible set of patterns, where to go next, or possible places that can create an event. For example, a set of glowing or colored spheres located at different locations in the workspace can be a graphical aid. By moving the Cursor within one of the spheres, an event can be triggered. The Cursor can move to another sphere to continue a chain of events in creating a pattern. Contacting the glowing spheres in different orders can create different patterns.

Actions. Acceleration.

In video games and other computer applications that simulate acceleration of a Character or an object, aided or unaided, due to propulsion, falling, or force or change in motion of any kind, there is a need to allow the User to feel that acceleration. A haptic experience of acceleration can enable the User to more realistically control a virtual object or Character, can give a simulation a greater intensity or requirement of skill, can make interactions and movements seem more real, and can make game-play more enjoyable. There are a number of applications, simulations, and games that require acceleration, including snowboarding; skateboarding; skiing; water skiing; surfing; riding a bicycle, motorcycle, or other wheeled Device; piloting a boat, jet ski, or other water craft; piloting a plane, jet pack, helicopter, hang glider, broom or other flying or winged Device; riding on a horse and other creatures and animals; walking, running, or otherwise moving on foot in a way where the rate of movement changes; skydiving or falling; being pushed or pulled by an explosion, by another Character, by an impact, or by another game event; roller skating or roller blading; ice skating; jumping and flipping; swinging; avoiding being hit; martial arts and other forms of fighting; moving objects; or any other action that involves acceleration. The sensation of acceleration can be applied in several ways even within a specific game. For example, in a military-based soldier simulation, there is a need for different types of acceleration when parachuting from a plane, when launching from a crouch into a sprint to avoid detection, when being propelled by the force of an explosion, and when driving away in a commandeered jeep.

Previously, acceleration was simulated almost exclusively by the increase in the rate of passing scenery in the virtual environment or in the ways that objects move visually. This approach is limited in that it relies solely on visualization to achieve what is fundamentally an experiential and physical sensation. The realism is severely limited by a traditional controller's lack of 3D force feedback interactions.

When riding a rollercoaster, or in any situation where there is some type of acceleration or movement, forces can be applied to the Cursor or Haptic Device to simulate the forces felt by the Character. For example, when a Character starts down a big ramp on a rollercoaster, the Character can feel an acceleration in the direction of movement, which pushes the Character back against his seat, for example. That same force, or a variation of it (for example, a force that is magnified to give a more compelling effect) can be applied to a Cursor.

When a rollercoaster goes over a hump, it can make a Character lift off the seat. A force in the upwards direction can be applied to a Cursor to simulate that feel. When a vehicle stops, Characters can be pushed forwards, and then their weight can create an effect of moving back into their seat. A force can be applied to a Cursor that pushes it forwards (same direction as the Characters movement), and then backwards, to simulate the feel of the Character's body rebounding from the force of the stop. When a vehicle goes over a bump, Characters can be pushed into the air, and then pulled back down by a seatbelt. A force can be applied to the Cursor in the same direction as the seat to the Character while the Character is being pushed up, and a force can then be applied to the Cursor in the same direction as the seat belt to the Character while the Character is being pushed down.

Sudden forces, such as a crash into an object, can be modeled by forces applied to the Cursor to give the sensation of a violent change in acceleration. For example, a force can be applied instantaneously to the Cursor, rather than being ramped up, or it can be ramped up very quickly (more quickly than the force is applied to a Character). This force can be applied to a sudden decrease in movement (e.g. a vehicle crash) or a sudden increase in movement (e.g. being hit by something).

Forces can be added to the acceleration forces to give an overall effect. For example, in a roller coaster simulator, as the cart begins an ascent up an incline a Character can feel several forces. There is the force of gravity which changes direction relative to the Character (i.e. the Character leans back and is pushed against the back of the seat more than the bottom). The Character also feels clicks of the cart being grabbed by a chain pulling it up the slope. A force on the Cursor can change from pulling down to pulling at an angle, representing the cart tipping. A force can be added to that force so that clicks are felt by a User, simulating the clicks the User feels from the cart's movement.

Acceleration forces can be applied to a Cursor based on the acceleration of a specific part of a body or an object rather than the whole Character. For example, as a Character picks up an object, a force can be applied to the Cursor representing the forces on the hand to simulate what a hand might be feeling, or forces can be applied to the Cursor representing the object being picked up to simulate what the object might be feeling. Forces can be applied to a Cursor to simulate any object being accelerated in any way. These forces can be direct forces applied to the object, can be scaled forces of what is applied to the object, or can be some type of force representing the object's acceleration but not directly computed from the object's acceleration. Objects can be assigned mass, which can be used to calculate forces on the object or movement of the object. The flow of time in a simulation of movement can also be used to determine an object's acceleration, velocity, and position, and forces applied to the object. Any of the forces applied to an object, or any movement of the object, can be used to calculate forces applied to a Cursor to give the User a sensation of what is happening to the object. Forces can also be applied to an object that are not calculated directly from characteristics of the object, but instead are heuristically designed to give a User force sensations that mirror what is seen on the screen. An object in this description can refer to a Character as well.

Acceleration forces can be displayed to a User differently, depending on the Character's interactions with the environment. For example, the force displayed to a User from an acceleration force that a Character feels created from pushing against a solid object (for example being accelerated while sitting in a seat, where the seat pushes against the Character), can be more (or less) than the force displayed to a User from an equal acceleration force that a Character feels created from a different type of acceleration (such as the acceleration of Gravity, when a floor falls out from under a Character). Acceleration can be integrated with other types of interaction as well. For example, a User's actions can control a Character as described in many of the sections of this document, and while performing that control, acceleration forces can be added to what the User feels from the control and action algorithms.

Forces on the Cursor representing Acceleration can be implemented based on the interactions of a Cursor and a weight or an object in a dynamics simulation or two objects in a dynamics simulation. For example, an object with mass can be attached to a Cursor by a Spring. Acceleration forces can be applied to the object, and therefore felt by the User through the Cursor and its interactions with the object through the Spring. Forces from acceleration can be added as an effect to the forces displayed to a User to create the effect. For example, the acceleration a User feels from a cycling simulation (i.e. the acceleration displayed to the User based on the acceleration a Character feels because of movements on a bicycle), can be combined with the forces a User feels in actually controlling the cycling.

Acceleration effects can be increased to give a perceptual effect for a User. For example, in an acceleration simulation of a hang-glider, a hang-gliding Character can swoop through an arc towards the ground. The acceleration felt at the tip of the arc can be increased to give the User a more enhanced feeling of the change in direction from moving up to down. The increased acceleration forces can be inconsistent with the simulation being used, but can give a better experience for the User.

Rotational acceleration can be implemented several ways, and to give the perception of different effects. The rotational acceleration felt when a car goes around a turn can be implemented by a force to the Cursor (or Haptic Device) in the direction that the Character would feel the rotational movement. The force can also be the negative vector force. Rotational acceleration can be displayed to a User by creating a dynamic effect with a User, where the Cursor interacts with another object. For example, the rotational forces felt by a skiing Character as he flips through the air can be perceived by the User as a force from the Cursor to an object that rotates around the Cursor at the same rate that the skier flips. The direction of the force can be the direction the skier is aimed within a world coordinate system. For example, if the skier does a 360 degree turn, the User can feel forces 360 degrees along the XZ plane, at the same rate of rotation that the skier turns. If the skier does a 360 degree flip, the User would feel force 360 degrees along the YZ plane, at the same rate of rotation that the skier turns. For more complicated flips, the forces displayed to the User can be any direction or magnitude. Forces displayed to the User can have any type of correspondence in direction, magnitude, and time variation, to the forces a Character can feel.

Forces can be added to the acceleration forces, based on the type of acceleration. For example, forces displayed to a User from a Character being accelerated by an explosion can be added to a force representation of many pieces of shrapnel hitting the Character. The forces applied to a Cursor can give a User a feeling of movement, and can affect how a Haptic Device moves. For example, if a Character is rocking in a rocking chair, forces can be applied to a Haptic Device to make it move in a back-and-forth U type of motion. The rocking of the Character (and therefore the acceleration felt by the Character) can be displayed to the User by movement of the Haptic Device, created by forces applied to it from the simulation of the acceleration. Even though the Character is not solely translating (in the rocking example the Character is rotating), the translation of the Cursor can give the User the perception of the rotation.

Figure 15:
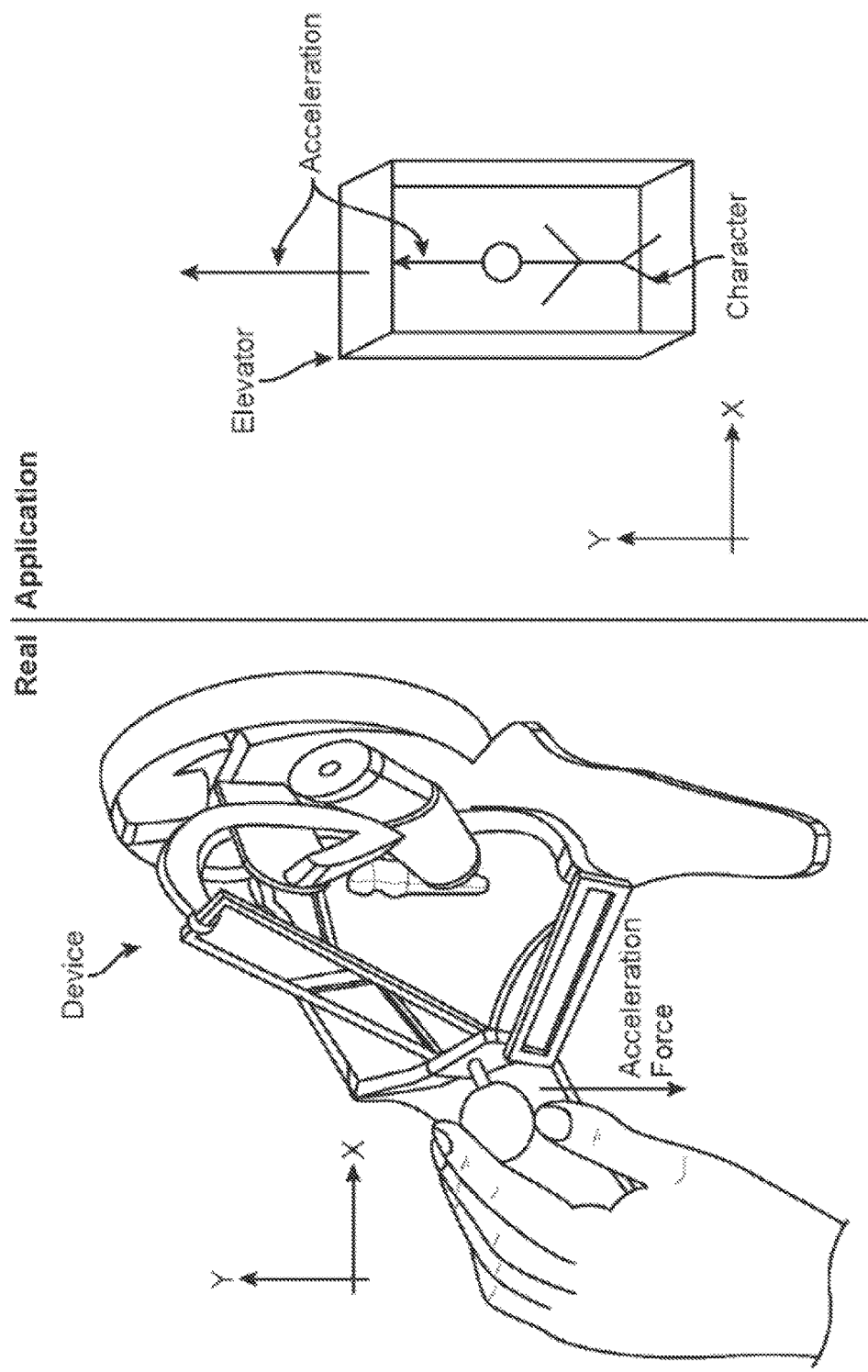
FIG. 15 is a schematic illustration of an input device and forces corresponding to an elevator simulation.

One body accelerating with respect to another body can cause forces to be exerted by a Device and felt by a User to represent the relative acceleration. For example, a Character might stand inside a stationary elevator. When the elevator begins to accelerate upward (along the Y axis), thus causing the Character to accelerate upward as well, a User can feel acceleration forces. The forces can be along the Y axis or in any other direction, and can be proportional, related, skewed, or otherwise representative of the acceleration caused by the initial acceleration of the elevator. When an elevator is accelerating in the +Y direction, a User might feel a force in the −Y direction. When the elevator reaches the final stopping location, the continued momentum of a Character in the elevator can be represented with an acceleration force in the +Y direction. Similarly, when the elevator begins accelerating downward the User can feel a +Y acceleration force, with a final −Y force felt when the elevator suddenly stops when moving downward. The forces used can be mathematically related to an acceleration value, can be impulse forces used to simulate the start or stop of the elevator, or the forces can be any force function related to the acceleration of the elevator or Character in the elevator, as illustrated n FIG. 15.

Balancing.

In video games and other computer applications and simulations that represent actions that require a sense of balance, there is a need to let a User feel the sense of balance. This sense of balance can enable the User to more realistically control a virtual object or Character, to give a simulation a greater feeling of depth or skill, or to make a game more fun. There are a number of applications, simulations, and games that use a sense of balance including snowboarding; skateboarding; skiing; water skiing; surfing; riding a bicycle, motorcycle, unicycle, car or boat at high speeds, broom in quidditch, horse, other vehicles or animals; walking, running, or otherwise moving on a surface that is difficult to balance on; climbing; skydiving or falling; balancing on a log in water or on a platform balanced on a point; gymnastics events such as balance beam, pommel horse, floor exercise, parallel bars, rings vault, rhythm gymnastics, and baton twirling; dancing; roller skating or roller blading; ice skating; jumping and flipping; swinging; balancing a ball or a stick; juggling; acrobatics; tight rope walking; avoiding being hit; lifting and holding heavy or hard to balance objects; martial arts and other forms of fighting; or any other action the involves some type of sense of balance. The feel of balancing can be applied in several ways even within a specific game. For example, in skiing, there is a need for different types of balance when sliding across the snow, when standing still, when turning, and when jumping, spinning, and flipping.

Previously, balancing was often accomplished by pushing buttons and moving joysticks using video game controllers. These types of interactions focus almost solely on the timing of game controller interactions, and often a Character maintains balance regardless of a User's control. Although the timing of movements involves learning and can give a basic sense of balance, the lack of feedback and the limited control buttons and joysticks give limits the realism and more complex learning that balancing can have with 3D force feedback interactions.

With 3D force feedback, balancing can be accomplished by measuring a distance from the Cursor to a point in space, and having that distance along any axis control the position, velocity, or acceleration along an axis of a Character or object. A spring force can be applied to the Cursor pulling it to the point in space, so that a User has a feel associated with what happens either graphically or in an underlying simulation. As a Character begins to fall graphically, a User can see it and push the Cursor in a direction opposite the direction the Character is falling to regain balance. The User can feel forces applied to the Cursor representative of falling, such as a vibration, a force in the direction of falling or in the opposite direction, and push against or with those forces, feeling the changes in balance as the Character is controlled.

Balance can be accomplished with a Haptic Device by countering the acceleration forces a Character feels when trying to balance. For example, when a Character starts to tip over to the right, he is accelerating in that direction. The User can apply a force to the left to push the Character back up. Alternatively, the User can apply a force to the right to an object that a Character is on, making the object move right, and making the Character regain his balance. Generally, any type of force can be applied to a Character to either push the Character directly and keep him from falling, or adjust an object relative to the Character to keep him from falling.

Balance Object Method for Balancing.

Figure 16:
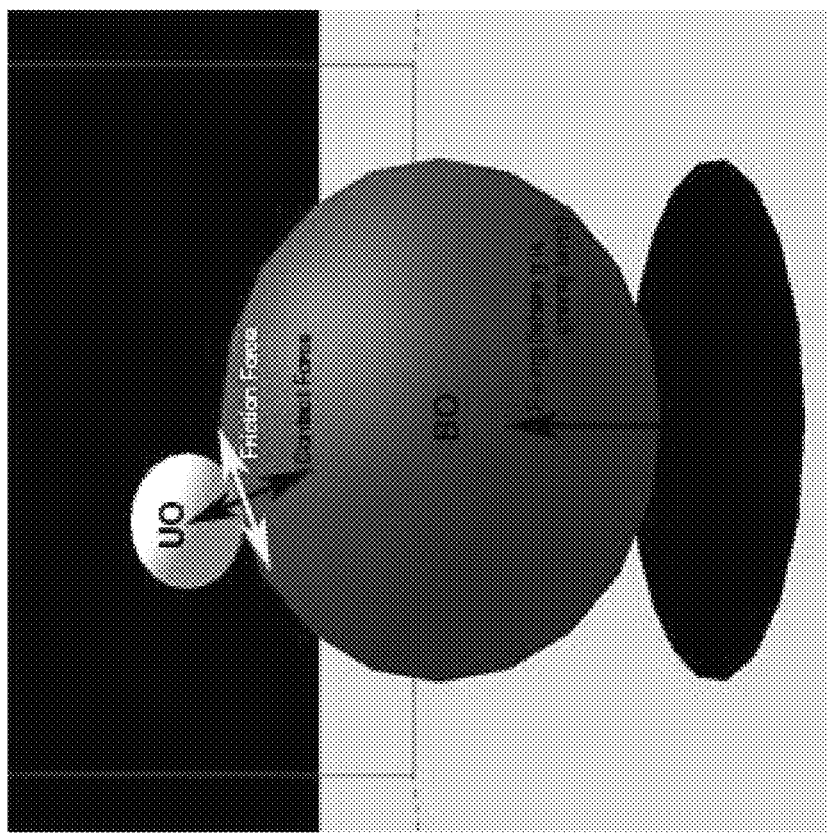
FIG. 16 is a schematic illustration of a user object and a balance object to implement a balancing interaction.
Figure 16:
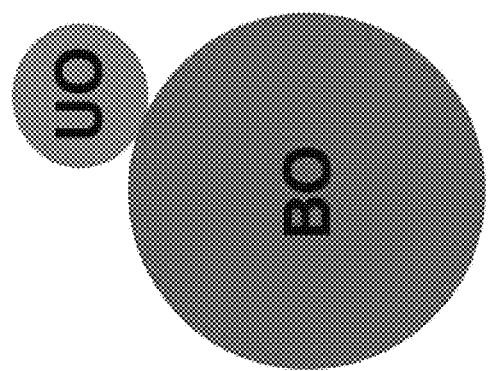

Another approach to balancing is to have the User control a User Object (UO) that interacts with a Balance Object (BO), the Balance Object Method, as illustrated in FIG. 16. The User controls the UO the way he might control a Cursor, as an example. The UO interacts with the BO, and their interactions control the Character or Simulation. In a Balance Object Method, the User controls a User Object (UO). The UO and BO can each be a point, a sphere, any other geometric shape, a polygonal surface, a volumetric representation, a solids model, a spline based object, or can be described in any other mathematical way similar to how a Cursor can be described. The UO and the BO do not need to be the same object, or even the same type of object. A UO can be controlled as a Cursor is controlled by a Haptic Device, or can be controlled through interactions with a Cursor, such as a mass-spring system where the UO is a mass attached to the Cursor by a spring. As the User moves the UO, it can interact with a Balance Object (BO). The interaction between the User Object and the Balance Object controls the act of balancing. Often in this type of algorithm, but not always, the BO will have a mass and can move in a physics simulation. The UO, controlled by the User, can push against the BO, and keep it from falling in the direction of gravity, therefore giving the User a sense of balancing the BO. As the BO falls past the UO, for example, that might trigger falling in the simulation of balancing, such as falling while riding a snowboard.

The representation of a UO and a BO does not have to be shown graphically. It can be the underlying haptic simulation from which the balancing simulation, graphics, and game interaction and control is based upon. The UO and BO, in combination with other application forces create the total feel for the User. The User's movements of the Haptic Device can control the UO, where the movements of the Device are scaled, rotated, skewed, or input into some type of function from which the UO position is determined. The BO can have its own description and properties. It can have mass, velocity, acceleration, position, scale, and surface representation, as examples. It can be acted upon by forces such as gravity or force created from the UO or a Cursor, or other objects in the balancing simulation.

As the UO is moved, it can interact with and collide with the BO. When a UO collides with a BO, forces can be created for the UO which are then transmitted back to the User either directly or through the simulation of the Cursor with the UO. Forces can also be created for the BO, which can adjust its properties and movement. The BO, for example, can move in the same way that a Mass moves, utilizing a simulation incorporating forces, acceleration, velocity, mass, and gravity as some potential characteristics. The BO, therefore, can move along the direction of gravity, or any other force applied to the BO for the simulation. Gravity can be implemented as a force in any direction, and can be non-linear. If, for example, Gravity is in the positive Y direction, then the BO would "fall" up if no other forces are applied to it. Then, if the UO is above the BO and touching it, it would create a force pushing down. The UO can therefore keep the BO from falling. As an example, if the UO is a sphere, and the BO is a cylinder with its axes along the Z axes, then the UO sphere can push against the BO cylinder to keep it from falling up. If the UO is not directly above the BO, then it will tend to move right or left, as there will be a component of force in the X or −X direction between the sphere and the cylinder. The User will have to compensate and move the UO toward the center of the BO, effectively pushing against the X axes force to keep the cylinder in balance. This overall effect gives the User a sense of balancing an object.

Then, the simulation of balancing the BO can be applied to the control of the game and the simulation of the interaction in the game. For example, the UO-BO interactions can control a snowboarder. In the simulation of the snowboarder's movements, the interactions of the UO and the BO control how the snowboarder moves. For example, the X position of the UO relative to the X position of the BO can control how the snowboarder turns. A User would not see either the UO or the BO, but instead would see a graphical representation of the snowboarder himself. As the User moves the UO to the right (+X) of the BO, the snowboarder can lean to the right. As this is done, there is a force in the +X direction, which gives the User a sensation of pushing into the snow as the snowboarder turns, and the User can see the snowboarder lean and turn. In this type of simulation, the User likely will not even realize the underlying haptic UO-BO algorithm, as the eyes are dominant to our perception of reality (and virtual reality), however, the User would sense a feeling of balance.

In the example of the sphere as a UO and a cylinder as a BO controlling a snowboarder, there are a number of additions and variations that can be applied to the algorithm. These variations are applicable across any other examples as well. Any, all, or none of the variations can be utilized. The UO and BO can take different forms (i.e. UO as a cube, and BO as a pyramid). Any combination of the strategies described can be used on any of the applications described above (skiing, flipping, acrobatics, martial arts, etc) or in any other application where a sense of balance is desired.

The simulation of the movement of the BO can vary in different directions. For example the forces applied to the BO along the X axes, and the acceleration, velocity, and mass of the BO along the X axes can be different from those parameters along the Y axes. Differing levels of viscosity, vibrations, dampers, etc. can be applied to the BO in different amounts along different directions. In doing this, the cylinder can be made easier to balance in the X direction, giving the User a better ability to control and balance the BO while maintaining a realistic feel in the Y direction, which is the direction of gravity.

The control of the Character can be determined through any interaction between the UO and the BO, through movements of the UO irrespective of the BO, or through a combination of the two. For example, the UO can be pushed forward to speed up a snowboarder with no interactions with the BO, while balance is maintained through the interactions with the BO at the same time. The difference in position, forces, velocity, acceleration, etc of the UO and BO can control any of the parameters of the snowboarding simulation. For example, the difference in X position of a cylinder BO and a sphere UO can control a snowboarders leaning (which can consist of rotations about the snowboarders relative axes), and the rotational turning velocity of the snowboarder (velocity of the snowboarder around his relative Y axis).

The BO can be constrained to only be able to move in certain ways. It can be constrained so that it can only move around a pivot point, or pivot line, or constrained so that it cannot move in the X or Z directions (i.e. it can only move in the direction of gravity, in this example), as examples. This can give the User more control in trying to balance the BO. During a simulation, the constraints and variations in the BO's simulated movement can be rotated, scaled, skewed, or transformed in some other way to give a desired effect. For example, the Cylinder and the UO-BO interactions can be rotated around the Y axis, so that in the Device coordinates the forces are rotated. This can give a more realistic feeling of the snowboarder cutting into the snow while turning.

The direction of gravity can change during a simulation. For example, if the snowboarder rides up onto the side of a halfpipe, gravity can be rotated so that it is in the direction of the normal to the surface the snowboarder is sliding on. This can give the User a realistic sensation of sliding across uneven surfaces, as an example. As another example, gravity can rotate in direction 360 degrees as a motorcycle racer does a flip through the air. This can require that the User adjusts his movements to the changing gravity in order to land the flip successfully.

The forces from the BO to the UO can be different than the forces from the UO to the BO. The forces on the UO are largely used to create sensations for the User. The forces on the BO are largely used to modify the simulation of the BO's movement. By removing the constraint to keep those forces equal, the BO can maintain a consistent movement algorithm while allowing a programmer to give varying effects and sensations to a User. A specific example of this is to scale the X forces on the UO by a value greater than 1 depending on the speed of the snowboarder. Scaling-up the forces can make it harder to balance the BO. This scaling can be dependent on other aspects of the simulation, such as the snowboarder's speed. For example, as the snowboarder goes faster, it can be more difficult to maintain balance, so the scaling can be increased to create a more realistic simulation.

When the BO falls (i.e. it is no longer kept from falling in the direction of gravity by the UO), then that can signal a falling event in the simulation. For example, in the sphere-UO, cylinder-BO example, as the sphere moves to the right (+X direction) the X forces increase in magnitude as a higher percentage amount of the total force is in the X direction (and therefore a lower percentage amount of the total force is pushing the cylinder down against gravity). If the sphere moves far enough to the right (+X direction) then it can no longer prevent the cylinder from falling upwards, and the snowboarder will therefore have leaned too far and will crash. Alternatively, the X distance between the BO and UO can be kept at less than a maximum amount by moving the BO with the UO in the +X or −X directions as the UO moves past that point (and therefore allowing the BO to move in a direction that might normally be constrained). In effect, this can keep the snowboarder from ever falling (especially on an "easy" setting in a video game) while maintaining the realism of the simulation.

Given the simulation of the movement of the BO, other effects beyond simply balancing can be achieved within the overall balancing algorithm. For example, when the UO pushes down against the BO, it gains momentum and acceleration in the −Y direction. This is similar to throwing the BO, in the same way that a person would throw a ball, for example (except that the BO is being thrown down, but still against the direction of gravity). In the snowboarder simulation, the pushing of the BO down can let the snowboarder jump into the air. When the BO comes back in contact with the UO, the snowboarder can feel the momentum, and it will feel as if he landed. Alternatively, the BO can be constrained to not move too far away from the UO to keep a more consistent feel with less movement of the BO. This pushing of the BO, or other interactions with it can control, can be applied to different Character actions. For example, pushing the BO down can cause the Character to duck rather than jump. Another effect that can be simulated with the BO is the feel of textures or movement a Character is feeling in an environment, such as the feel of a snowboard moving over snow. If a virtual haptic texture is applied to the BO, which creates forces on the UO that the User can feel when the UO is moved across the BO, then that texture can simulate the feel of the texture of the snow as it moves under the snowboard. This can be accomplished by creating an infinitely long or very long balance object, for example (in the cylinder as the balance object example, it can have a finite radius but an infinite length), and allowing the cylinder BO to continually slide in the Z direction along its length, when the snowboarder is moving, creating the sensation of the texture of the snow. The effect can be magnified in order to simulate crispy snow, or lessened to create the effect of powdery snow.

Similar to the effect of pushing the BO down to jump, when a snowboarder approaches a ramp or a jump and starts moving up it, the User will expect to feel that force. A force in the +Y direction can be applied to the BO, the UO, or a representation of a Cursor to give the User the feel of the acceleration into the air. A force can be modeled differently depending on how it is applied to the User. For example, if the force is applied directly to the UO or the Cursor, it can be ramped up from 0 to a peak force to make the jumping feel realistic (i.e. to account for the bending of the snowboarders legs as he takes of into the air). If the force is applied to the BO, then it can be applied differently as the force can be modified by the simulation of the BO's movement. Similarly, in landing on the ground after a jump, a force in the opposite direction can be applied to give the User the sensation of landing on the ground. This can be a particularly effective strategy, as an additional force applied to the UO can make balancing more difficult (i.e. it is difficult to keep your balance when you land a jump, which happens naturally with this type of implementation of the algorithm).

Different directions of interaction and movement of the UO can accomplish different things. For example, the UO can be moved forward and pushed against a virtual wall to increase the speed of the snowboarder. This interaction does not utilize the BO for increasing speed, but balance still has to be maintained. Graphically, the snowboarder can crouch when the UO is moved in the −Z direction, and the other variables in the simulation relating to the BO can change (when crouching a snowboarder will go faster, but has less control and finds it more difficult to balance). Pulling backwards can make the snowboarder slow down. Lifting up or pushing down gradually might ready the snowboarder for a jump (as a real life snowboarder might ready his legs in a different position just before takeoff). A User can also switch between modes of balancing and doing another action. For example, an input from the User can give the User a moment to perform an action like pushing another snowboarder with his hands (if he was a cheater in the race), or shooting a weapon. He might not have long to perform that action, though before needing to regain his balance, and the action can have an effect on balancing (such as a force in the opposite direction of the push, which would require a counter force to maintain balance, or the requirement to return to a specific position to regain balance).

Additional effects can be accomplished by adding forces to the UO, added to the forces on the UO from the BO. For example, to create the feel of the snowboard moving over the snow, forces in the Z direction can be applied directly to the UO or to a Cursor. The forces can be short forces in duration that are ramped from zero to a maximum level, and then ramped back to zero after an amount of time. A number of these types of forces, randomly spaced, randomly overlapped, and with random durations (within ranges for each) can create the effect of the board moving over snow. As another example, the snowboarder can hit a tree or other object while snowboarding, or have some type of interaction with other objects within the snowboarding simulation. If the snowboarder hits a tree, a force can be applied from the tree to the snowboarder. If the snowboarder hits the tree straight on, then the force can be comprise a force in the +Z direction relative to the snowboarder (i.e. the direction primarily opposite movement). As another example the feel of the snowboarder tumbling or falling can be simulated and felt by a User. A force can be applied to the UO as the Character tumbles to simulate the feel of tumbling. The force can be in a direction defined by the vector between the Character's head and the Character's Feet, and can have a magnitude proportional to how hard the Character is tumbling.

Different levels of difficulty can be applied for various reasons. A User can choose a difficulty level such as hard, medium, or easy for the game as a whole. During specific interactions, the difficulty of maintaining balance can be harder such as when a snowboarder is grinding (balancing) on a rail, going very fast, landing a jump, etc. This can be accomplished by adjusting the movement parameters of the BO or by adjusting the forces to the UO from the BO or from the environment. For example, constraints on the BO's movement can make it easier to balance. Force from the BO cylinder to the UO sphere in the given example can be scaled in the X direction. Higher scaled forces makes balancing more difficult while lesser scaled forces in the X direction make the balancing easier. Friction between the BO and UO, or some type of viscosity model or any other type of force that resists their movement against each other while moving can make it easier to maintain balance of the BO. As another example the size of the BO or the UO can be scaled to be bigger to make balancing easier, or the relative movement of the UO with respect to the movement of the Haptic Device can be scaled to make the balancing easier or harder.

As another example of balancing, a snowboarder needs to maintain a sense of balance when flying through the air after taking off from a jump. The snowboarder might do flips, spins, and rolls through the air and then be upright again just before landing to successfully land the jump. One example of a balancing method for spinning and flipping it to have a spring from the UO (or a Cursor), pulling it towards a point in space. While in the air, the UO's position relative to the point in space along an axis can be used to modify the velocity of rotation of the snowboarder around one of his relative axes. The UO's position relative to the point in space along a different axis might control a different type of rotation for the snowboarder. The amounts of rotation can be weighted based on which is more dominant to let the User more accurately control the rotations.

A different example of balancing while flipping and spinning can be accomplished by utilizing a UO attached to a BO by a spring, and constraining the movements of the BO relative to the UO. The BO can be constrained to remain at a fixed distance from the UO. It can also be constrained to remain at a distance from the UO that is primarily fixed, but can vary slightly to give the simulation more stability. This type of UO-BO interaction gives the User the feeling of swinging an object, similar to a paddle ball game in real life. The angle of the BO with respect to the relative axes of the UO can be used to determine the rotation of the snowboarder, so that as the UO swings the BO around, the snowboarder spins at the same speed. Alternatively, the UO can interact with two BO's, where each BO is attached to the UO at a fixed distance. The first BO can be constrained to a YZ plane intersecting the UO. The second BO can be constrained to a XZ plane intersecting the UO. Then the movement of each BO relative to the UO can control a different rotation of a snowboarder. As the XZ BO is swung around, for example, the snowboarder will spin around. As the YZ BO is swung around, the snowboarder will flip head over heels. The planes can also change as the snowboarder spins, flips, and rolls.

When landing, sometimes a Character falls, and sometimes the Character lands successfully. This can be implemented by keeping track of the Character's orientation in space while in the air. If the Character's orientation is within a range of orientations determined to be successful, then the Character lands successfully. For example, while spinning, a snowboarder can land successfully if the snowboarder's rotation about the Y axis is within + or −15 degrees of being straight down the hill. Additionally, sometimes all orientations or all orientations about a specific axis can lead to a successful landing to make the game more fun, and create less User difficulty. All of the balancing algorithms can be implemented or modified utilizing multiple User Objects or multiple Balance Objects, that interact with each other.

Multiple types of balance can be accomplished within a single simulation. For example, in a snowboarding game, a User can need to maintain balance while sliding down the slope, and then maintain balance in a different way when flipping. The UO and BO can change in any way when transitioning to a different type of balance. For example a User can control a snowboarder sliding down a slope utilizing a BO that is a cylinder and a UO that is a sphere, but then switch to one of the flipping and spinning examples of balancing when the snowboarder jumps into the air. There can be User requirements in transitioning from one balancing method to another. When transitioning back from one balancing method to another, the User can be required to move the UO back to the position it was at just before the last transition happened. For example, when a snowboarder jumps into the air, the balancing algorithm changes to a spinning/flipping algorithm, and the position of the UO can be marked. As the snowboarder spins and flips through the air, the UO can be returned to the marked position, so that when the original balancing algorithm is returned, the transition happens smoothly. This is a way to simulate the need for the snowboarder to prepare himself to land.

While a User is maintaining balance when using a balance algorithm, the Haptic Device can move. Many of the balance interactions can be implemented independent of the position of the Device within its workspace. The algorithm can be designed to work equally well at any position within the Device's workspace. The algorithm can also be designed to work equally well at specified positions within the workspace. For example, the balancing algorithm can work irrespective of a User's movement in the Z direction. Alternatively, the balance algorithm might not work equally well in all areas of the Device's workspace. For example, if the User starts the balancing when the Device position is towards one of the extremes of its movement, it might not be able to move adequately to maintain balance. A User, therefore, can be required to put the Device into a specific position or region to begin the balancing simulation.

All of the forces applied to a UO can be rotated, scaled, skewed, or input through some type of function to account for changes in the orientation of a Character, or changes in the terrain or objects the Character is interacting with. Balancing can be applied in conjunction with other actions. For example, when riding a bicycle, one algorithm can simulate the feel of pushing the pedals and rotating the tires, while the balancing algorithms described above can be used at the same time to simulate the balancing of the bike. Another example is to have a User control a Character that is swinging, where the swinging is controlled by a swinging algorithm, and where that swinging includes a balancing component which is implemented with a balancing algorithm. In these types of approaches the Balancing Objects and User Objects from one algorithm can interact with and put forces upon the Balancing Objects and User Objects in other algorithms. The balancing algorithms can be used to control something that would not normally be associated with balancing, such as shooting a gun, to give the interactions more complexity and a sense of learning that is fun. For example the relative positions of the UO and BO can control aiming.

Being Hit.

In video games and other computer applications that simulate the force of a blow or an impact, there is a need to allow the computer User to actually feel a representation of that contact force. A haptic experience of being struck can enable the User to more realistically control a virtual object or Character, can give a simulation a greater intensity or requirement of skill, and can make game-play more enjoyable. There are a number of applications, simulations, and games that simulate jarring crashes, landings, tackles, and physical jockeying and combat, including snowboarding; skateboarding; skiing; water skiing; surfing; riding a bicycle, motorcycle, or other wheeled Device; piloting a boat, jet ski, or other water craft; piloting a plane, jet pack, helicopter, hang glider, broom or other flying or winged Device; riding on a horse or other creatures and animals; skydiving or falling; being pushed or pulled by an explosion, by another Character, by an impact from another virtual object, or by another game event; roller skating or roller blading; ice skating; jumping and flipping; martial arts and other forms of fighting; or any other action that involves the receipt of force impacts. The sensation of being struck can be applied in several ways even within a specific game. For example, in a snowboarding application, there is a need to simulate different types of contact forces when jockeying with other riders, when crashing into a stationary object, when falling to the snow, and when landing from an aerial maneuver.

Previously, force impacts were simulated primarily in the visual or audio realms: a Character or virtual object reacts graphically as though a blow was received. This approach is limited in that it relies solely on visualization to achieve what is fundamentally an experiential and physical sensation. There have, however, been attempts at providing the User with force feedback in the form of controller vibration. These low fidelity controller movements provide only the most rudimentary depiction of the actual impact. This vibration does not provide the User with useful information about the force of the blow, the direction from which it came, nor does it require the User to recover. The realism is severely limited by a traditional controller's lack of 3D force feedback interactions.

Recorded or calculated data can be used to simulate or create the haptic forces felt by a User through a Device. Recorded force measurements can be obtained by placing force sensors on real objects to measure real world collisions, contacts, or any other form of force interaction. For example, a football player can wear force sensors to measure the types and magnitudes of exerted forces during a tackle. This force data can then be applied, transformed, or otherwise used to create a virtual tackling sensation with a Device. The use of force sensors to obtain real world data in order to create virtual forces can be applied to any other section in this document. For example, a basketball player can jump off of a scale to measure the curve response of force distribution to create an appropriate force function curve for a jumping application.

Force data can be collected from a person wearing a force suit, similar to the motion tracking suits currently used for video game character tracking animation. Many force sensors can be placed, such as by using Velcro, on a body suit such that the motions and interactions of the person are recorded in terms of force data.

Recorded force data can be evaluated and converted into a force function to be used in an application that utilizes a Haptic Device. The data can be evaluated, manipulated, or changed using signal analysis techniques or any other mathematical technique. A corresponding force function can be formed directly from the force data in the same, similar, scaled, rotated, skewed or otherwise altered state. Recorded force data can be transformed using time domain or frequency domain transfer function analysis techniques to generate appropriate and stable force functions.

A contact, hit, collision or any other type of force exerted on a Character or User can be represented by forces to a User through a Device. The exerted forces can be represented by any individual force function or combination of force functions as described above in the Force Function section such as impact, crash, impulse, and vibration forces to name a few. The force exerted by a Haptic Device can be in the direction of the initial contact, in any other direction, or the force response can change directions any number of times in order to represent a single contact. Mathematical calculations such as momentum, gravity, velocity and acceleration can be used, but are not required to be used to calculate the forces, positions, and orientations of Characters, objects, and Cursors as the result of being hit. Being hit forces can be combined with any other forces described in this document such as a force created for any of the Actions, Tools, or Modifiers sections.

In a boxing game for example, a jab punch can be felt by creating a force with a Device toward the User (the Z axis), while an uppercut can be felt in an upwards direction (the Y axis). Combining forces in different directions can be used to alter the feel or perceived direction or magnitude of a contact force. For example to simulate a double damage or a larger contact, a force function can increase, decrease, and quickly increase again to produce a curve with two peaks. The magnitude of the peaks and time between the peaks can be altered to change the perceived contact force strength.

The act of being hit can have an impact on a modifier such as becoming dizzy and immobilized for a moment. If a Character is knocked down for example, when trying to stand up after the event, resistive forces to make moving difficult by adding weight forces, increasing mass or other properties, adding random vector forces with varying directions and magnitudes, rotational forces pulling the Cursor in a circular motion, or other controlled or random force function effects.

Being hit can alter other actions or effect the interaction between a Cursor and any defined object such as a Balance Object, or Climbing Object. For example, if while skiing, a Character collides with a tree, an impact force can represent the contact with the tree, while at the same time the Cursors position relative to a BO changes making balance more difficult, and navigation orientation, speed, or control can also change or be altered.

A contact can be represented with a combination of haptic, graphic, and auditory cues. In a boxing game for example, a punch to the stomach can result in an audible grunt, a graphical bending over of a Character, and an implementation of a contact force function. Graphical motions, position, or orientation of the camera view, view of the Character, or orientation of a Character can be generated by a Character, object, or User being hit. For example, in a shooting game, each time a Character is hit, a force can be felt in the direction of the bullet, and the Character's view can jerk to the side a bit to create a haptic and graphic correlation to emphasize a hit occurred.

The combination of haptic, graphic, and auditory feedback to the User can be used in any combination to achieve a desired effect. All three forms of feedback can be correlated to occur at the same time, any two can occur at one time with the third occurring at a different time, or all three can occur at separate times to achieve a desired effect or perception. For example, when being shot, the haptic and graphic cues can occur at the same time followed by a delayed sound impact to simulate the relative speeds between light and sound in the real world.

Figure 17:
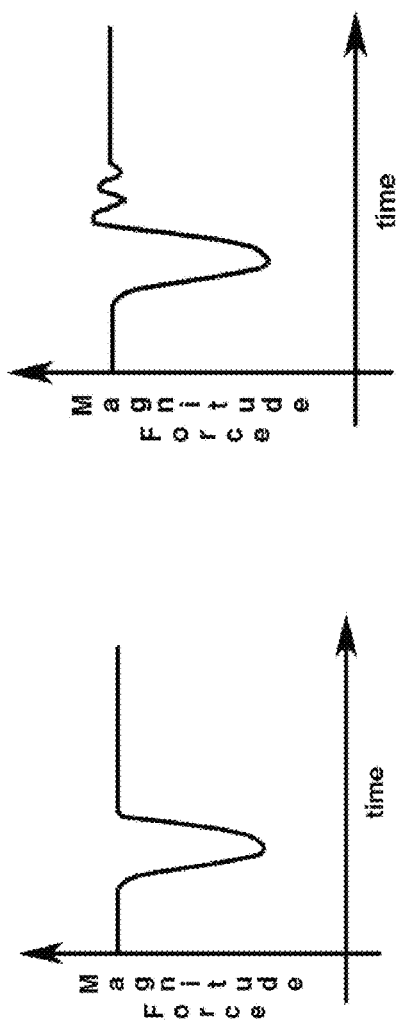
FIG. 17 is a schematic illustration of a momentary force in connection with a sustained force.

A contact of some kind can be represented by reducing the forces currently being applied by the Haptic Device. As an example in a NASCAR racing game, if a car is accelerating around a turn, the Haptic Device can be exerting significant forces to represent the acceleration of the automobile. During this time, if a second car bumps into the first, rather than adding additional forces, the force can be reduced for a relatively short period time before again increasing in magnitude, as illustrated in FIG. 17. Quickly reducing the force then quickly ramping it back up can be used to simulate a pop, jolt, hit, or other type of contact. This technique can be used to prevent the Haptic Device from exceeding the maximum force capabilities, or to produce unique collision effects.

A contact or hit can alter or modify aspects of how a Character or object functions. A hit or repeated hits can reduce or enhance the speed, maneuverability, control, longevity, durability, strength, power, distance, balance, dizziness, concentration, or other capabilities of Characters and objects. As a capability is modified, the forces responsible for the modification can be altered as well by increasing or decreasing the magnitude, frequency, duration, or other characteristics of the contact force.

Figure 18:
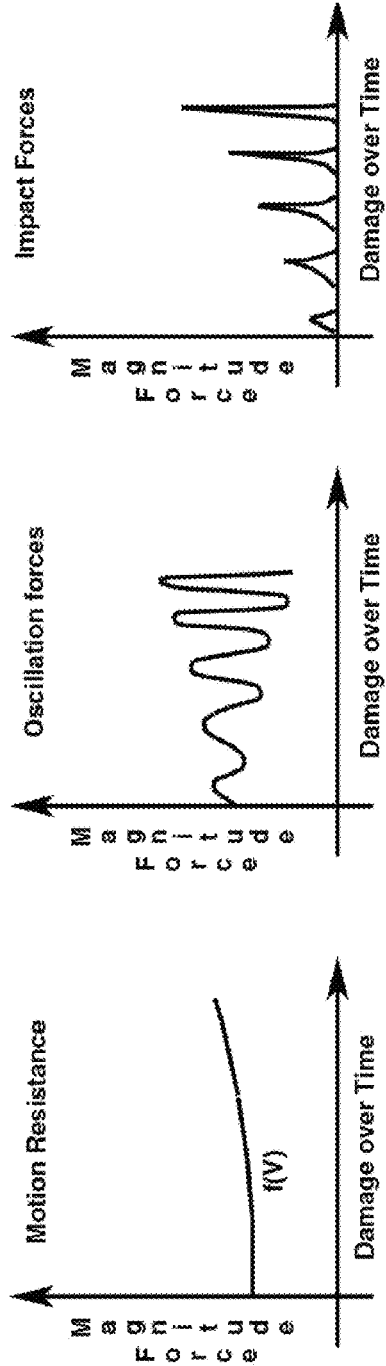
FIG. 18 is a schematic illustration of forces interacting to communicate an effect of damage to a character in a game.

For example, when flying a WWII fighter plane, multiple gun shot hits can accumulate damage to the airplane such that the plane begins to fly more slowly and maneuver slower until enough damage eventually causes the plane to crash. As the plane is shot and begins to fly more slowly, a spring force, viscous force, or overall restricted motion force can be added as the plane begins to loose functionality and control. Oscillating forces or impulse train forces can be added to simulate shaking or difficulty in turning or steering. Impulse forces can be used to simulate the bullets hitting the aircraft. The magnitude and frequency of the impulse forces can be increased as overall damage increases to indicate accumulated damage through the use of force feedback, as illustrated in FIG. 18.

The forces described for actions involving being hit can be directly or similarly applied to related hitting actions. The relationship between being hit by something, and hitting something can have the same response, an inverse relationship, or a skewed, altered, rotated, scaled, or otherwise varied force response.

Figure 19:
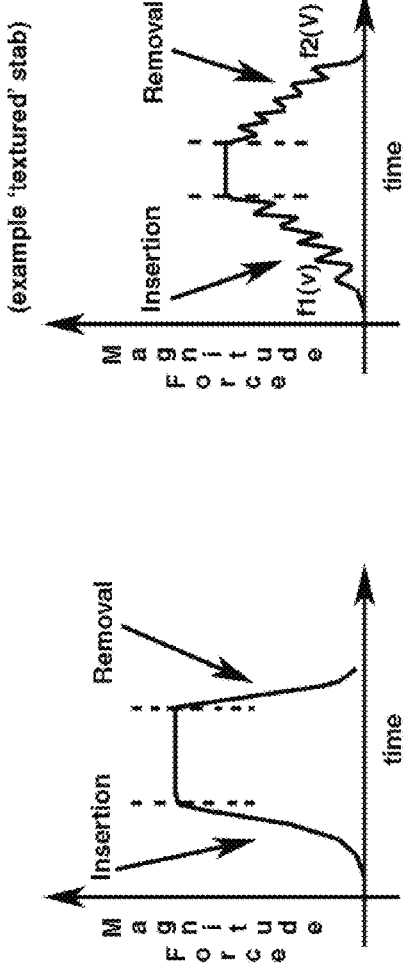
FIG. 19 is a schematic illustration of forces giving different interaction effects to different user implements.

A penetration can occur when an object or Cursor enters another object, Character, or Cursor. A force response related to a penetration action can be represented by controlling the direction and magnitude of the exerted force in the direction of the penetration. The object used to penetrate can alter the feel of the force. For example, a sharp dagger can be represented by a force function that quickly increases along a smooth curve to a maximum value, at which point the force quickly decreases along a smooth path when the dagger is removed. A rusty gardening tool on the other hand will be duller than a dagger, so the force can increase more slowly with the addition of small saw tooth shaped force function to give the weapon a textured feeling as a stabbing penetration occurs, as illustrated in FIG. 19.

The properties of the feel of a penetration, such as being stabbed, can be altered depending on the location of the contact, the depth or force applied by a User, the object doing the penetrating, the material being penetrated through, or any other condition that can affect a related real world penetration or stabbing. For example, a stab to the arm can be smoother or smaller in magnitude to a stab in a vital area such as the chest. A shallow stab produced by a small force can feel like quick jab or poke, while a deep or forceful stab can result in a larger force, with added texture components to simulate cutting flesh, tendon, bone, etc. A Character's clothing can alter the feel of being stabbed. Being stabbed though a leather tunic can slow the force and reduce the magnitude of the force, while being stabbed through a silk robe provides little protection and can allow for larger forces.

Any Cursor, Character, or object can be inserted into another Cursor, Character, or object. The insertion can be limited such that a proper hole, socket, or other item to be inserted into exists. The size and shape of the item being inserted can change the success of the insertion. For example, a square peg might not fit into a round hole, or a larger peg might have greater magnitude forces when inserted into a smaller hole. The forces felt by a User can include forces associated with the insertion using any of the methods described in the Touching Objects section, or the Force Function section. A force can be applied to signify a full insertion such as a spring or wall force to prevent further insertion. A force can indicate removing an inserted Cursor, Character, or object in the same, related or different manner to the force representing the inserting process.

For example, a key can be inserted into a lock, along the Z axis, such that once the key is aligned with the lock slot and is pressed into the lock cylinder, forces can be exerted on a User along the Z axis to indicate insertion contact with the inside of the lock cylinder. Spring forces can be used to keep the key from moving away from the vector line running along the lock cylinder. During the insertion, a saw shaped force function curve can be added to simulate the teeth of the key hitting the cylinder pins inside the lock. When the key is fully inserted, a spring force can prevent the key from being inserted past a threshold depth. Upon removing the key from the lock, the magnitude of the forces can be reduced but remain opposite to the forces used for the insertion. Reducing the magnitude of the removal forces relative to the insertion forces can indicate that it is easier to remove the key compared to inserting it.

A Cursor, Character, or object can slide back and forth inside, across or relative to another Cursor, Character, or object such that forces are felt by a User to represent the sliding. The forces used to represent the motion can be created using any of the methods described in the Touching Objects section or the Force Function section. The type, direction, magnitude, and other force characteristics can depend on the type of sliding, materials of the sliding objects, the velocity of relative movement, the presence of oil, water, or any other lubricant, relative size of the sliding objects, and any other relative relationship related to the sliding.

For example, when playing a trombone, the U-shaped slide can be moved forward and back in a sliding motion to create different pitches. Forces can be used to represent the sliding motion by resisting motion with spring or other forces in all directions other than along the slide. In addition a friction or texture force can be added with a magnitude and frequency that depends on static friction of initially moving the slide, the velocity of sliding, or depending on if the trombone is well oiled or rusty. Sliding slowly can result in a greater magnitude of friction, and a well oiled trombone can slide more easily with smaller magnitude forces.

Any of the methods, concepts, algorithms, and forces used for being hit, insertions, or any other action in this document can be used to simulate virtual sex, or any sensation or contact of a sexual, intimate, or sensual nature.

A force function can be used to simulate a single, solid hit such as a tackle in a football game, or a collision with a wall while making a home run saving catch in a baseball game, or crashing into the ground while skydiving. One possible solid collision force function can be a bell shaped curve. Increasing the forces at an increasing rate can help prevent the Haptic Device from going unstable. Decreasing the forces in a similar smooth manner can help a User maintain control and position of the Haptic Device. The overall smooth shape of the function can also exert a force on the User in a comfortable manner. The magnitude and duration of the bell shape can be altered to make a force faster and harder, or slower and more damped.

At the time of impact, a force can be added in the opposite direction, or in any other direction other than the direction of the resulting impact force. After reaching a small threshold value relative to the strength of the hit, the force can be ramped up, or quickly increased, in the direction of the impact force to a maximum value. The force can then continue with a smooth form for a period of time, or a slight oscillation to the magnitude can be added before the force is finally quickly dropped at the end of the collision.

A solid impact can be simulated by increasing a force magnitude to a threshold value, at which point a decreasing function curve with a sinusoidal, square wave, saw, or other alternating shaped curve until the force magnitude decreases to a desired level. The frequencies and magnitudes of the crash function wave form can be altered to achieve various types of collisions with different objects.

A crash or hit can consist of an impact stage followed by a settling out or sliding phase. The impact stage can represent the primary crash with included directional variations, and the sliding phase can provide a textured feel by utilizing force impulses or repeating force functions while the object is moving. An example of a settling force can include small sinusoidal forces decreasing in magnitude and frequency over time. The settling out forces can help slow the object, Cursor or Character down, and level out or reduce the forces from the crash impact.

Figure 20:
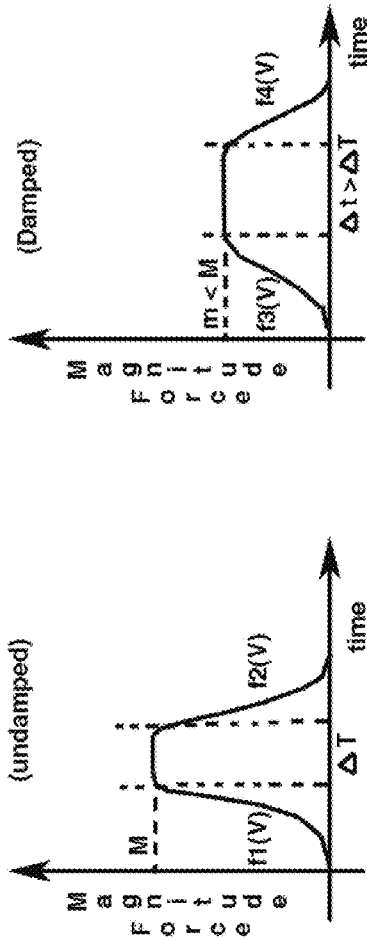
FIG. 20 is a schematic illustration of damped and undamped forces.

Force functions can vary depending on the type, orientation, or success of a contact. When a Character lands a jump for example, the forces can be damped by reducing the magnitude and increasing the force durations to simulate a successful landing, a soft landing, legs cushioning a fall, or another object cushioning a fall, as illustrated in FIG. 20. Another method to simulate a damped landing is to add a brief impulse force in the opposite direction of the landing impact force. This impulse force can simulate a gymnast straightening her knees after a pommel horse landing in the opposite direction of landing.

A strong impact or collision force, such as being tackled in a football game for example, can produce many combinations of force function responses. At the moment the contact begins, the force felt by the User can be related to the direction the tackle is occurring relative to the position or orientation of a Character. The magnitude of the contact force can vary depending on the velocity, size, mass, skill level, environment conditions, weather, or other characteristics of the Characters, objects, or Cursors involved in the collision. The collision dynamics of two Characters colliding with each other can be mathematically based on physics in terms of mass, weight, velocity, and acceleration, or in other mathematical terms. Additional forces can be added to indicate additional contacts during a collision. If a Character is hit, and begins falling into another Character for example, forces can be added to indicate the second contact. The force can be added with a magnitude relative to the strength of the hit in a direction relative to the motion of the two Characters.

Forces can be added as a Character hits the ground after an impact such as a tackle for example. A force can be exerted for each part of the Character that contacts the ground. For example, an impulse force can be added as a knee contacts the ground, followed by a larger impulse force as the body contacts the ground, followed finally by a contact force with a slight vibration as the Characters head smacks into the ground. In addition to contact forces, texture forces can be added to the tackle or when the Character contacts the ground. Landing on pavement can add a bumpy, rough texture represented by a sinusoidal or repeated force function, while mud can add a slippery, viscous textured feeling represented by weight forces or viscous forces described above in the Tools section.

The forces related to being hit can be randomized, where two identical collisions or contacts result in a different force response function. Forces can also be specifically based on mathematical properties, states, orientations, etc. of the objects involved in the contact. For example, a snowboarder landing on his head can result in a larger magnitude crash force function than if he were to land on his knees. Individual objects can have properties or characteristics that can change the feel of a crash. For example, crashing a snowboard in powder snow can result in a smaller magnitude and longer duration force curve than a crash on ice.

Texture forces can be added to any form of contact, collision, or act of being hit as described in the Touching Objects section. When crashing into a brick wall for example, a texture representative of the ridges between each brick can be added in the form of impulse forces spaced relative to the graphical representation of the brick grooves. Or crashing a motocross bike into an oil pit can incur a slippery or low viscosity feel where a weight associated force can be added to the movement of the Cursor as described in the Tools section.

Forces can be added as the position or orientation of a Cursor, Character or object changes. For example, forces can be added in the direction of the orientation of a spinning object during a crash, or a skydiver's body position while free falling. In a car crash for example, where the car collides with a wall then spins around several times, forces can model or simulate such a crash by proving the impact force followed by forces that move around the Cursor. The forces can be created by adding a weight that spins around the Cursor pulling the Cursor along the spinning trajectory as an example. The rotational forces can match with the graphical orientation of the rotating object, or the haptics can be independent of the graphics but related in some way to the objects orientation.

The forces can be proportional to the change in orientation, or be unrelated to the orientation of the object. For example, as a wrestler falls and his head moves along an arc toward the floor, a force can be added relative to the Cursor such that it pulls the Cursor along an arc from the wrestler's feet to the location of the wrestler's head prior to the fall, resulting in a directional vector force opposite, or a mirror image of the fall. The forces of falling can also be generalized by the forces described for flipping and spinning.

Repetitive impacts, or hits that result in a shaking sensation can be generated by repetitive forces, such as combined sinusoidal forces with a magnitude and frequency that can be controlled and varied. Shaking forces with a small magnitude and high frequency can feel like a vibration while shaking forces with large magnitudes and low frequencies simulate shaking a person by the shoulders. Shaking forces can be added to other collision or crash forces, or can be used as an indicator that some event has occurred, such as an explosion nearby a Character.

Being shaken can be simulated by moving a weight back and forth in any direction relative to the Cursor, Character, or object being shaken. The magnitude of the weight forces can be increased, and the overall motion of the weight can be increased to intensify a shaking effect. A hit can stun or immobilize a Character for a period of time, such as with the use of a stun gun. An increased impulse force can indicate the initial contact followed by an oscillation or repeated variation of the force for a period of time. This will produce a shaking or convulsing feeling for the Character. This effect can be combined with other forces such as a strong spring force which holds the Cursor to a point in space to prevent movement of the Cursor, as well as graphical stun or shaking of the Character to match or simulate the feel of being immobilized.

Weather.

Virtual weather conditions can directly affect or indirectly affect Users including changing the forces exerted on or by the User. Weather can be added to any algorithm as wind, fire, rain, hail, snow, clouds, fog, humidity, sand storms, ice storms, lightning, thunder, tornados, tsunamis, earthquakes, hurricanes, hot or cold air, or any other weather phenomenon. In addition to producing forces resulting from weather, other actions, modifiers, and objects described in this document can be altered by weather. All of the applied force concepts described in the weather section can be applied to other forms of being hit. For example forces produced by hail can be applied to machine gun fire, or a swarm of killer bee stings.

Projectile types of weather, such as rain or hail, can be felt by a User through a Device when a Cursor, Character, or object is contacted by the weather. The forces felt can include small impulse or ramp forces with each contact. This type of force response can create a tapping sensation as described above in the Force Function section. The magnitude of the forces felt can vary depending on the size, shape, frequency, or other characteristics of the projectile weather. The direction of the force felt can vary in any direction, and can represent the physical direction from which the hit occurred. The forces are not required to directly match with the graphical representations of the weather. The rate of which forces are felt can be faster or slower than the contacts graphically appear.

The contact forces of these types of weather can be randomized by changing the time between hits, the magnitude of each hit, and the length of time or duration of each hit force. A more detailed description of this randomization effect can be found above in the Force Function section. Forces can be based on a calculated physical description, measurement, or simulation of the physical weather phenomenon. For example, the impact forces of rain can be correlated to a physics simulation of the rain hitting a Cursor, Character, or object with specific magnitudes at determined intervals.

Multiple sets of Force Functions can be combined to provide different effects. The combined functions can be any combination of calculated or randomized functions. For example, a randomized function can be used to simulate a light rain (quick impulses with small magnitudes). As it begins to rain harder, a calculated function with larger drops (longer duration impulses with larger magnitudes) can be added to the existing light rain to add larger drops periodically.

One way to implement weather in the form of waves, currents, or streams such as wind, or heat waves is to exert continuous forces or forces that are substantially continuous over a period of time. The forces can vary in direction and magnitude depending on the direction of the weather force relative to the direction the Character, Cursor, object, camera or view is facing.

When riding a motorcycle wind forces can resist motion in the direction of motion, additionally wind gusts can add to existing forces by adding larger force inputs in the direction of the gust. The strength of the gust can be controlled by how quickly the force increases, the magnitude it reaches, and the duration of the gust force. In the case of riding a motorcycle, the User must compensate to the gust in order to maintain balance while riding.

For example, if a motorcycle is traveling along a road parallel to the Z axis, a non-linear spring force can be added in the Z direction relative to the speed of the motorcycle. As the motorcycle speeds up, the force can increase at an increasing rate until a reaching a maximum threshold value at which point the force levels off. If a gust then hits the motor cycle perpendicular to the direction of travel in the direction of the X axis, a plateau force can be added in the direction of the X axis. The initial impact of the gust might require the motorcycle to adjust balance with respect to a BO. The plateau drop in the force can coincide with the gust subsiding, resulting in the length of the plateau being associated with the duration of the gust.

Different types of textures can be mapped or applied to weather. For example, in a sand storm type of situation, a sand paper texture can be applied to an area or volume such that any movement by a Cursor, Character, or object in the sand storm adds the sensation of a sand friction force. The texture forces can be applied in the direction of motion, or in any other desired direction in 3D space. Weather that makes air feel thicker such as humidity, fog, or clouds can have forces added to them by adding a viscosity component to movement as described in the Tools section. This makes movement while in the weather more difficult.

Temperature can directly affect the forces felt by a User presented by a Device, or any Action of a Cursor, object, or Character. Force functions can be applied to simulate a specific feeling associated with being hot or cold. In an extremely cold setting, vibration or oscillatory forces can be used to simulate a chattering or shivering as a Character gets colder. The colder the Character gets, the worse the shivering can get, the forces can become stronger and more uncontrollable simulated with larger magnitudes and higher frequencies of vibration forces or repeated impulse forces. This type of force addition can be used as a warning or danger indicator such as the imminent threat of frostbite setting in.

Temperature can be used to modify the abilities of a Character or object. For example, colder temperatures can add more lag to moving objects, can add weight forces, spring resisted motion forces, or viscosity forces as described above. Extreme weather conditions can be modeled by creating similar force effects for the given weather event. Rumbling events such as earthquakes or lightning/thunder storms can be felt by increasing the oscillation, transitioned step input functions, a randomized force function, or other force function to create a rumbling, ground shaking sensation. A tornado can spin objects creating rotational forces by rotating weights around a Cursor or varying directions and magnitudes or forces exerted on a Cursor, Character or object relative to its position or orientation.

Catching.

In video games and other computer applications that simulate catching a virtual object—using a glove, tool, or hands—there is a need to allow the computer User to actually feel a representation of the catching. This haptic experience of catching an object can enable the User to more realistically control a virtual object or Character, can give a simulation a greater intensity or requirement of skill, and can make game-play more enjoyable. There are a number of applications, simulations, and games that simulate catching, including the collection of insects, spiders, birds, animals, items or creatures; baseball; basketball; football; soccer; lacrosse; Frisbee or ultimate; jai alai; handball; water polo; playing with jacks; juggling; gymnastics rhythm ball routines; boomerang; baton twirling; and any other action that requires catching. The sensation of catching can be applied in several ways even within a specific game. For example, in a baseball game, there is a need to simulate different types of catching when playing the position of catcher, when diving for a fly ball, when fielding a ground ball, when catching a ball in front or behind the player, and when catching a ball above or below the waist.

Previously, the act of catching was simulated by pressing buttons and/or moving joysticks using video game controllers. These types of interactions focus almost solely on the timing of game controller interactions and often provide the User only visual feedback. Although the timing of movements involves learning and can give a basic sense of the task, the lack of haptic feedback and the limited control buttons and joysticks offer limits the realism and more complex learning that this operation can have with 3D force feedback interactions.

A User can move a Device which controls an object that a Character will use to catch a virtual object, the Catching Object (CO). For example, the CO might be a catcher's mitt, and the User might control the movements of the mitt itself, the Character's arm or hands, or anything else that influences the position of the mitt. A Moving Object (MO) can move within reach of the catching object, and the moving object can be caught. Catching forces can be applied to the User through the Cursor, the CO, or directly to the User.

Figure 21:
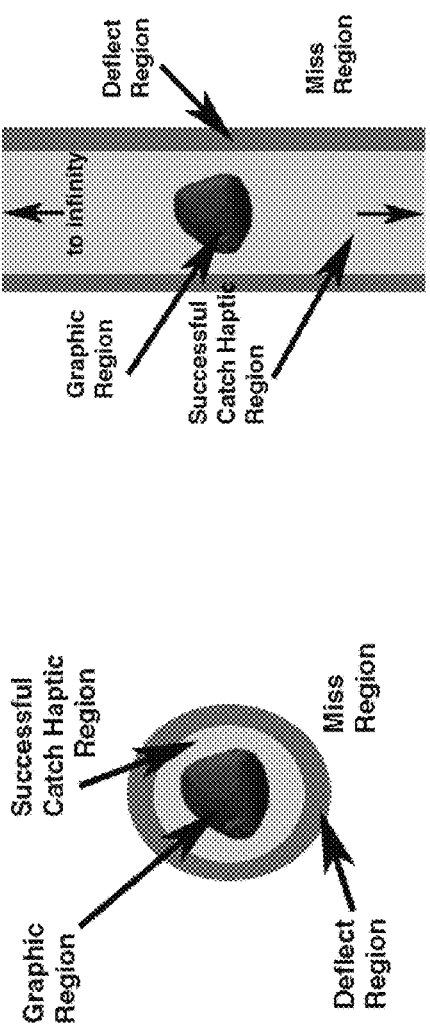
FIG. 21 is a schematic illustration of an implementation of a catching interaction.

Forces can be created in the same way as "Being Hit" forces are created, based on the object that is caught and what the Character uses to catch it, where the object being hit is the CO. The User's movements can move the Character's hand, something attached or held by a Character's hand, or whatever else is used to catch an object. There can be a region of interaction between the CO and the MO that indicates success of a catch, a near catch, a complete miss, or some other result of a catching attempt, as illustrated in FIG. 21. For example, a catcher's mitt might have a specific area that a baseball can hit to be caught. The catcher's mitt might also have an area where the baseball will create a force on the mitt, but will drop to the ground or be deflected. The mitt might also have a defined region where the ball completely misses the mitt. These regions do not have to accurately relate to the graphical representation of the CO. For example, a catcher's mitt might have a successful catching region that is larger than the graphical representation of the mitt itself. When a baseball hits the successful catching region, it might graphically be shown to quickly move within the glove creating a visual effect that the ball was caught successfully even though the ball was actually caught outside the glove's graphical boundaries. A successful catching region, for example, might be infinitely tall and positioned in front of the CO so that as the MO approaches, if it is within the correct right-left relative position, it will be successfully caught, and the graphics can be modified to make it look as if it was caught correctly.

User movements can be scaled across different directions differently. For example, a CO might move farther right-left than forwards-backwards with equal User movements. Catching can be more dependent or only dependent on one axis of movement. For example, a User's up down movements might make a catcher's glove move up and down, but the success of a catch might be independent of those up-down movements, and rely exclusively on right left movements. Force functions applied to the CO can include force effects to simulate the feel of the momentum and inertia of an object. Objects can be caught through the movement of a CO that the User controls by throwing the CO. For example, in catching with a lasso, the lasso is thrown towards a MO. The relative positions of the CO and MO, and regions that indicate the success of a catch can make the object caught. The forces can be applied based on the movements of the MO after it is caught, for example the movements of a bull after a lasso is thrown over it. There can be multiple CO's controlled by a User. For example, the User might control a pair of chopsticks to catch a fly. Forces can be applied to a CO to control how tightly an object is caught. For example, if a Character takes his arms and catches a person by grasping his arms around the person, the arms have to be held tightly to maintain the grasp. A minimum force might need to be applied to maintain the grasp, while feeling the forces of the person struggling to get away, and fighting against the grasp.

Climbing.

In video games and other computer applications that simulate climbing a virtual object—using a rope, tool, Device, or hands—there is a need to allow the computer User to actually feel a representation of the climbing. This haptic experience of scaling an object can enable the User to more realistically control a virtual object or Character, can give a simulation a greater intensity or requirement of skill, and can make game-play more enjoyable. There are a number of applications, simulations, and games that simulate climbing including the movement up or down on any rope, web, set of stairs, ladder, or rope ladder; climbing large objects like mountains, jungle gyms, trees, walls, houses, climbing walls, cliffs, buildings; climbing onto smaller objects like tables, chairs, desks; mountain climbing or other types of climbing using hands, picks, axes, ropes, hooks, claws, suction cups, sticky pads, barbs, ladders, cables, lines, pitons, or anchors; climbing walls using hands, picks, ice picks, axes, ropes, hooks, claws, suction cups, sticky pads, barbs, ladders, cables, lines, pitons, or anchors; climbing over piles of rubble, blocks, boxes, crates, boulders, or rocks using hands, picks, axes, ropes, hooks, claws, suction cups, sticky pads, barbs, ladders, cables, lines, pitons, or anchors; or climbing any barrier regardless of material using hands, picks, axes, ropes, hooks, claws, suction cups, sticky pads, barbs, ladders, cables, lines, pitons, or anchors.

Previously, the act of climbing was simulated by pressing buttons and/or moving joysticks using video game controllers. These types of interactions focus almost solely on the timing of game controller interactions and often provide the User only visual feedback. Although the timing of movements involves learning and can give a basic sense of the task, the lack of haptic feedback and the limited control buttons and joysticks offer limits the realism and more complex learning that this operation can have with 3D force feedback interactions.

The same techniques that are used in Running to control a Character's feet can be used to control a Character's feet or arms in climbing (or any other part of a Character, that is used in Climbing). For example, a running technique can control how each arm moves in reaching to a new place while climbing. A Spring can be used to control speed and direction of climbing. You can push up to climb up a ladder, or push down to climb down a ladder. Added forces can give the effect of touching a new step or new rung, for example.

Figure 22:
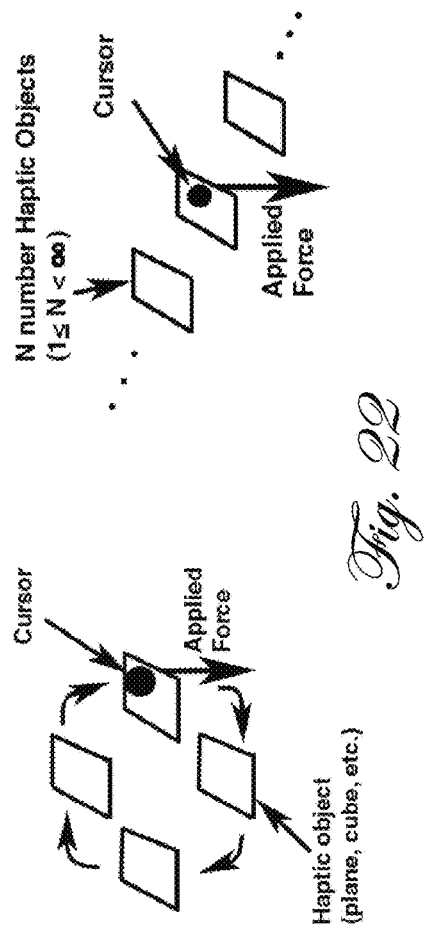
FIG. 22 is a schematic illustration of an implementation of a climbing interaction.

A User can move a Cursor to touch a surface or object, a Climbing Object (CLO) to control climbing. The interactions with the CLO control the Character's movements. The CLO can be above the Cursor when climbing upwards, and the Cursor can move up to touch it. Then, the Cursor can push the object down to make the Character climb up. For example, the Cursor can touch the top of a plane when climbing stairs (with any of the algorithms given in Running as well). When the Cursor moves up past a threshold, it can then push down on the surface. As the Cursor pushes down on the surface, both it and the surface move down, however, on the screen the Character moves up, as illustrated in FIG. 22. This creates the effect of pushing to take steps, while maintaining the Device's position in a general area.

The CLO can be slightly forward in addition to up, such that the Cursor moves forward in addition to upwards to touch it. Then when the Cursor pushes down on it, it can move backwards and down to move the Character up while maintaining a consistent climbing area in the Device's space. When a Cursor touches a CLO, climbing can be initiated by a force applied to the CLO, by a button on the Device or otherwise accessible to a User, or in any other way that a User can trigger a change from a non-climbing state to a climbing-state or a change from a climbing state to a non-climbing state.

The CLO can be implemented so that the Cursor can feel across its surface before a climbing action (start or stop climbing) is initiated. For example, if a Character is climbing a tree, a Cursor controlling the Character's hand can feel across a representation of a branch. The User can then indicate that he wants to climb by pushing a button, for example, at which point the Cursor can attach and the object can no longer be felt (because the relative positions of the Cursor and CLO remain fixed). Alternatively, the Cursor position relative to the CLO can remain unfixed, and the Cursor can feel across the surface of the CLO even during climbing.

The User can control any type of object or any part of a Character with respect to a CLO to climb. For example, the User can control either a Character's feet or a Character's hands or a combination of the two to climb. The CLO can be intangible and create no forces on the Cursor until the Cursor is in a good position to begin interacting with it. For example, if the Cursor is interacting with a horizontal plane to move upwards, the plane can be implemented so that only the top of it creates a force, while the Cursor can move through the bottom of the plane freely without any collision or forces applied to it.

The CLO can have dynamics of its own. For example, when moving down stairs the CLO can move. The Cursor can move down until it touches the CLO, at which point the CLO moves upwards until it reaches a specified height. The Cursor can then move down to touch another CLO which then moves up as well, giving the effect of climbing down, while maintaining a consistent climbing area in the Device's space. The Cursor can attach to the CLO, such that their relatively positions do not change while climbing is taking place. The Cursor can have a necessary force in a specified direction, for example, to then unattach from the CLO.

The Cursor can have force effects applied to it when it touches the CLO. For example, if a Character steps on something or touches an object while climbing (a spike, a bug, an electrified surface, or any other object), a force can be applied to the Cursor to represent the object, in addition to the forces applied to the Cursor for Climbing itself. The CLO can move, separate from the climbing movement, to create other effects. For example, the CLO can freely move right and left, and forwards and backwards to represent climbing a rope, while its movement in the up down direction controls the climbing. This can give the effect of having to pull oneself up in order to climb, while creating the impression of swinging (as one would feel when climbing a rope in real life).

There can be multiple Climbing Objects. The Cursor can interact with any or all of them to climb. The climbing objects can move or can be stationary. If they are stationary, for example, the Device can control the Cursor by moving through a consistent range of motion in the Device's workspace. The CLO can also move differently depending on where the Device is in its workspace. Different types of Climbing Objects can be used together to create an overall climbing experience. For example, a User can have the ability to climb a smooth wall using his hands, but handholds can help the climbing. A CLO representing the wall, and CLO's representing the handholds on the wall can be attached to each other or can generally be used together.

A CLO can have dynamic properties, so that it can move on its own or have forces applied to it. For example, if a Character is doing pull-ups, the Cursor might attach to a CLO that acts as a weight. The direction of gravity (which applies a force to the CLO based on the CLO mass) can be in the upwards direction to create the sensation of hanging, as the force on the Cursor from the CLO would always be pulling up. As the CLO is pulled down, the Character will move up to do a pull up. As the CLO is then let up, the Character would move back down. The relative position from which the Character's movements are measured (with respect to the movement of the CLO) can vary from one set of pull-ups to another or even during a single pull up simulation.

The CLO and the Cursor can have forces applied to each other, and can interact with each other to create climbing specific effects. For example, if a Character is climbing a rope, the Cursor can attach to the CLO to enable a User to pull the Character up the rope. The rope might slide through the Character's hands if the Character slips. If this happens, then the Cursor can slide against the CLO (where the Cursor moves, the CLO moves, or both move), creating a sensation of sliding. See the Holding an object section for other examples of how an object can feel. The interactions between the Cursor and the CLO can be representative of the simulation or of the actions a Character is taking. For example, if a Character is climbing an ice wall with an ice pick, there can be forces between the Cursor and the CLO that make it feel as if the Cursor is penetrating the CLO when it is struck with sufficient velocity (see example of Hitting and Being Hit).

The Cursor can control an object that works with the CLO. For example, the Cursor can control an ice pick to climb up ice. In this example, the CLO can be a plane that represents the cliff wall and which is in the same general orientation of the cliff (or the CLO can be a more complex representation of the cliff, such as a polygonal representation). The Cursor can be graphically represented by a polygonal representation of an ice pick, and can have a simpler haptic representation such as a thin cylinder (the pick) on the end of another cylinder (the handle). When the Cursor touches the cliff (i.e. the haptic representations of the two touch) by moving forwards, a force can be applied to the Cursor. Graphically, the graphical representation of the Cursor would also touch the graphical representation of the Cliff. If the Cursor hits the cliff with sufficient velocity, then the force applied to the Cursor can change so that the Cursor moves deeper into the cliff. The force can suddenly decrease (the penetration) but then be applied again shortly after (the lodging of the ice pick). If a User pulls the ice pick up or down while the ice pick is lodged, then the Character can climb. For example, if the User pulls the ice pick down while it is lodged, then the Character would move up, and the Cursor and Cliff would move down. A User can then pull on the ice pick with sufficient force away from the cliff to dislodge the ice pick, so that it again can be lodged in the cliff at a different location. A User can control different hands by moving the Cursor past a plane (where one side of the plane controls one hand and the other side of the plane controls the other hand), and the combination of moving the hands can provide for an overall climbing experience. The hands can also be switched using the algorithms described in Running, or some other method of indicating that a different hand should be controlled. Additionally, different devices can control different Cursors that each interact with their own CLO's or the same CLO.

The relative positions and orientations of the Cursor and the CLO can determine the relative graphics positions and orientations of the Character (or a part of the Character, such as his hands) and the virtual object being climbed on. When the Cursor haptically disengages from a climbing object, that can imply that a Character's climbing status is temporarily locked. For example, when a Cursor touches a CLO representing a rope, pulling down on the CLO can represent pulling up on the rope, and then letting go of or stopping touching the CLO can represent that the Character has stopped climbing (in order to switch hands, pausing in an ascent or descent, letting a Character perform another action, etc).

A climbing motion of a Cursor, Character, or object can be incorporated, represented, or controlled by any other type of motion or navigation. For example, if a User is holding a button to make a Character walk or run along a flat surface, and the Character comes to a vertical wall, by continuing to hold the button, the Character can automatically climb up the wall. During an automated climb, forces can be used to represent climbing related sensations, such as an impulse force for each stop on a stair, or for each hand grasp matching graphical movements of the Character.

Some types of climbing involve contacting one object onto another such that a force can be applied perpendicular to the contact force in order to climb. A force is then required to overcome the stick force and pull the two objects apart in order to repeat the process and continue climbing. This type of climbing requires a User to stick and unstuck the object used for climbing such as when climbing with suction cups or an ice pick.

The strength of the stick force can be proportional or otherwise related to the force applied between a Cursor or object and a CLO. A minimum force can be required to initially stick to the CLO. This stick force can be directional, such as a threshold force perpendicular to the surface of the CLO. For example, if a User sticks a suction cup to glass with a small force, the suction cup will not be able to support the weight of the User trying to climb with it; the suction cup needs to be pressed against the glass with more force. If the suction cup is then pressed very hard against the glass, the User will have to pull very hard away from the surface of the glass to get the suction cup to come off of the glass. Pulling on the suction cup parallel to the glass will not cause it to become unstuck.

Contact forces between an object, Cursor, or Character and a CLO can be implemented as described in the Force Function section. For example, when sticking a pick into a sandstone cliff, a plateau force function can simulate the impact force. Once a Cursor or object is stuck to a CLO, forces can be use prevent motion of the Cursor or object in a desired direction. These forces can include spring forces that pull the Cursor or object toward the contact point. For example, when climbing a vertical wall with an ice pick, a force away from the wall can remove the pick from the wall, a force up or down relative to the wall can result in climbing up and down respectively. Movement to the right and left can be prevented by providing a spring force to pull the Cursor along a vector pointing toward the stick point of the pick.

For example, when climbing a vertical wall with sticky gloves, a force applied up or down can cause the Character to move up and down on the wall. Forces applied to the left and right can cause the Character to climb left and right on the wall. Finally, forces applied perpendicular to the wall might have no affect the climbing motion, and spring forces can be used to prevent motion of the Cursor into or out of the wall.

A force can be added to simulate an object or Cursor from becoming unstuck from a CLO. If a threshold force or distance away from the CLO is reached, the stuck object can be released. In doing so, any previous forces can be rapidly reduced or removed. An impulse force can be added upon release to simulate a pop, or snapping type of release. The impulse can either be added or subtracted from the forces currently felt by the User, and the direction can be perpendicular or any other direction relative to the CLO. For example, an impulse can be added each time a suction cup pops off the glass.

The orientation of a Cursor or object used to interact with a CLO can have associated limitations that can vary the effectiveness of a climbing motion. For example, when climbing with an ice pick by swinging a pick shaped Cursor to contact a wall CLO, the orientation of the Cursor can alter how well the pick sticks into the wall. Hitting the wall with the tip of the pick will result in the best stick force. However, if the pick is rotated such that the point does not contact the wall, the pick will not stick as well. Orientation limitations can be avoided by providing the same performance characteristics regardless of the orientation of an object as it contacts a CLO. For example, an ice pick can be made to stick the same, with the same force feedback regardless if the tip of the pick makes contact with the wall or not.

The forces and climbing properties, such as ascent rate, can be altered by mathematical properties or characteristics of a Character or the environment. Characteristics that can affect CLO interaction include weight, mass, modifiers, weather, experience level of the Character, etc. For example, a heavy back pack can cause a Character to climb more slowly resulting in higher forces felt with respect to a CLO in order to climb. Or a level 2 Character might be able to climb faster than a level 1 Character with possible changes to the forces between the Cursor and CLO.

Additional forces such as forces to indicate or simulate a texture can be added to a CLO as described in the Touching Objects section. A texture effect can typically be added for climbing or slipping movement across a surface. For example, when climbing a tree with rough bark, the action of grabbing onto a limb CLO might not have any associated texture forces. If the hand, Cursor, or object holding the limb then slides along the limb, a texture sensation can be added with a random saw tooth force curve to simulate the varying texture of the bark.

A User can be required to apply or maintain a minimum threshold force in order to continue climbing or prevent from falling. For example, when climbing up a flag pole, a User can interact with a cylinder CLO where the climbing motion involves pressing the Cursor into the cylinder and sliding the Cursor up and down along the cylinder such that the upward cycle increases the Characters height on the pole. A minimum threshold force of pressing into the cylinder can be required or else the Character will begin to slip down the pole.

The properties and interaction with a CLO can be combined with any of the other objects described herein including a BO, HO, EO, etc. Any CLO or part of a CLO can be another object such as a BO for example. When climbing a tree, reaching and pulling up onto a branch CLO can be followed by the Character having to balance on the branch BO while attempting to reach for the next CLO. Position or orientation with respect to a CLO can alter modifiers experienced by Character. An example of a CLO modifier can result from the fear of heights. As a Character climbs a cliff CLO, the height, or view of the height can cause the Character to become dizzy, or experience a sensation of vertigo.

Flipping.

In video games and other computer applications that simulate flipping (including other types of control of a Character's body) there is a need to allow the computer User to actually feel the act of flipping. This haptic experience of a body's spinning, rolling, or whirling or change in relative body positions can enable the User to more realistically control a virtual object or Character, can give a simulation a greater intensity or requirement of skill, and can make game-play more enjoyable. There are a number of applications, simulations, and games that simulate flipping including snowboarding; skateboarding; skiing; water skiing; surfing; riding a bicycle, motorcycle, or other wheeled Device; skydiving or falling; gymnastics events such as balance beam, pommel horse, floor exercise, parallel bars, rings, vault, rhythm gymnastics, and baton twirling; dancing; acrobatics; tight rope walking; roller skating or roller blading; ice skating; jumping and flipping; avoiding being hit; being spun by an applied force from an attack; martial arts and other forms of fighting; or any other depiction of flipping. The sensation of flipping can be experienced in several ways even within a specific game. For example, in an action game, there is a need for different types of flipping when leaping to execute an attack, when rolling to avoid an attack, and when spun around by a successful attack from an enemy. Ducking can be considered as related to flipping. There are a number of applications, simulations, and games that simulate ducking including snowboarding; skateboarding; surfing; roller skating or roller blading; infiltrating an area; escaping; shooting; martial arts and other forms of fighting; or any other action that involves evasion, searching, or executing leaping maneuvers.

Previously, the act of flipping was simulated by pressing buttons and/or moving joysticks using video game controllers. These types of interactions focus almost solely on the timing of game controller interactions and often provide the User only visual feedback. Although the timing of movements involves learning and can give a basic sense of the task, the lack of haptic feedback and the limited control buttons and joysticks offer limits the realism and more complex learning that this operation can have with 3D force feedback interactions.

The control of a Character's body can be implemented in a number of ways. Flipping can be controlled by the direction that the Cursor moves. If the Cursor moves to the right, then a Character can flip to the right. Similarly, in controlling a Character's relative body positions, a movement can control how the Character changes. For example, a downward movement by the Character can make the Character duck or roll into a ball. Different directions of movement and their effects can be combined with other directions of movement and their effects. For example, pushing the Cursor to the right can make a Character flip, while pushing the Cursor down can make a Character roll into a ball, so pushing down and right can make the Character flip and roll into a ball at the same time.

Figure 23:
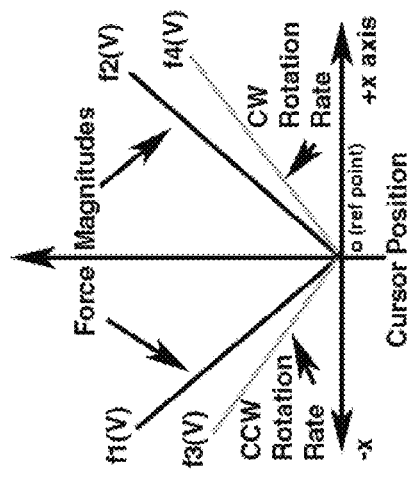
FIG. 23 is a schematic illustration of an implementation of a flipping interaction.

Flipping can be controlled by the relative position of the Cursor with respect to another object. For example, flipping can be controlled by a spring force applied to the Cursor, where the Cursor is attached to a point in space. If the Cursor pulls to the right or left, a Character can rotate around the Y axis clockwise or counterclockwise. If the Cursor pulls up or down, the Character can rotate around the X axis, and if the Cursor pulls backwards or forwards, the Character can rotate around the Z axis, as illustrated in FIG. 23. Any Cursor movement direction, can be applied to any Character movement or rotation, and any of these movements can be combined. Flipping can also be implemented by the relative position of the Cursor on a sphere. The euler angles of the Cursor relative to the center of the sphere can control the orientation angles of a Character.

For the purposes of this description, flipping includes any type of Character movement, where the Character changes his orientation or changes his body position. It includes such things as rolling, flipping, twisting, and other things like ducking, crouching, curling into a ball, etc. Flipping can be controlled through the use of a Flipping Object (FO). The FO is an object that interacts with the Cursor. The interactions between the Cursor and the FO control how a Character Flips. A FO can have dynamic simulation and can be a weight. The speed and direction of a Character can be controlled using a FO. A Cursor can exert forces on the FO by touching it directly, through a spring between the Cursor and FO, or through some other means, and adjust their relative positions and properties. The relative positions, velocities, accelerations, and properties of the FO and the Cursor can control the speed, intensity, and direction of flipping.

The relative position of a FO to the Cursor can directly control the orientation of a Character. For example, the vector between the Cursor and a FO can be used to orient a Character in space such that the Character is always facing in the direction of the vector. If, for example, the FO is directly in front of the Cursor, the Character would be facing directly forward. If the FO is to the right of the Cursor, the Character would be facing right. It is possible to have any type of mapping from their relative positions, velocities and accelerations, to the orientation of the Character.

The Cursor can move a FO through their interactions with each other. For example, the Cursor can pull on a FO with a spring connecting the Cursor to the FO. The FO can be a weight, where it would move based on the forces applied to it from the spring (or directly by touching the Cursor). The rotation of the FO around the Cursor can control the rotation of the Character. For example, as the FO rotates around the Cursor 360 degrees the Character can spin in a one-to-one correspondence 360 degrees. The User feels the spring pulling on the Cursor as the Character turns, giving the User a sensation of rotational movement. The FO can be constrained to be a specific distance from the Cursor, or can be constrained to be in a range of distances.

The FO can have different properties in the simulation of its movement based on the Character's situation. For example, a Character spinning in water might be implemented with a higher mass FO, than a Character spinning in air. The FO can be constrained so that it only moves in a constrained way. For example, the FO can be constrained to move only in the XZ plane relative to the Cursor or relative to another coordinate system. Multiple FO's can be used and combined to accomplish flipping of a Character. For example, a FO that only rotates in the XZ plane can control a Character's spinning, while a FO that can only rotate in the YZ plane can control a Character's head-over-heels flipping. The Cursor can control both FO's at the same time, giving a Character a broader ability to spin than either single FO gives by itself.

A FO can be constrained so that it has areas where it cannot move, or areas where its movement is modified. For example, a FO might have a viscous area in front of a Cursor, where it does not move as freely. This can help to allow a User to control a Character so that the Character lands facing forward. The constraints can be any type of constraint including an inaccessible area, a viscous area, an area that stops movement, an area where a specific force or action is needed to begin movement, etc.

A FO can be the Character itself. The Cursor can therefore be used to throw the Character and make the Character flip based on the simulation of the FO's movements when thrown. A FO can control how a Character changes his relatively body positions. For example, the Cursor might push against a sphere (the FO) to control crouching. The harder the User pushes against the sphere, the more the Character might crouch.

A User can interact with a FO in different ways for different stages of a Character's flipping. For example, if a User wants to control a gymnastics routine, a FO can be used. The User can begin a jump by pushing down against a FO that the Cursor is touching. That can make the Character jump, and can make the FO move away from the Cursor. Then the Cursor can swing the FO around, making the Character flip and spin. Then as the Character lands, the FO can hit the Cursor giving the User the feeling of landing.

A FO can have different properties based on what the Character is holding or interacting with in the environment. For example, a FO might have more mass when a Character is flipping on a bicycle than when the Character is flipping on a skateboard. A FO can have different properties based on the difficulty level of a game. For example, a FO might not be able to turn as quickly (or might turn too quickly) on a higher difficulty level setting, making a flipping task more difficult for a User. A FO can be used to control how a Character or User flips another object (like a baton, for example).

A magnetic attraction can be used with a Cursor and a FO, so that flipping is easier. For example, a Cursor might be attracted to a FO such that it is always touching it. The FO can be used to control a baton, or some other object held in a Character's hand that is spun. Forces can be applied to the FO to make it move to a specified timing or be more likely to move to a specified timing. For example, if a User is controlling a gymnast on a floor routine, then additional forces (not created by the User) can be applied to the FO to make the Character stay better synchronized with music.

The forces of flipping can be combined with other forces a User can feel. For example, the forces used to create a sensation of a Character flipping for the User can be combined with the force of a Character landing on the ground. The forces of the flipping can be modified by the Character's interactions with the environment. For example, if a skiing Character is spinning in the air, and one of the Character's ski's hits a tree, then the User can feel that impact implemented through the flipping algorithm. For example, when using a FO, if the FO collides with the tree, its properties (velocity, position, etc) can change giving the User feedback that the flipping motion was altered by the environment.

The same interaction by a User can have different results based on a Character's situation in a game. For example, if a Character is flying through the air off a ski jump, pushing down can make the Character crouch into a ball. The same Character can duck while standing on the ground if the User pushes down. The forces displayed to a User can be simply to experience flipping rather than control of flipping. For example, if a monster grabs a Character and throws him through the air, the User can feel that flipping through the air without have any control of it.

Hitting.

In video games and other computer applications that simulate the striking of an object or surface—using either a tool, Device or body part—there is a need to allow the computer User to actually feel the delivery of that contact force. This haptic experience of striking a surface or object can enable the User to more realistically control a virtual object or Character, can give a simulation a greater intensity or requirement of skill, and can make game-play more enjoyable. There are a number of applications, simulations, and games that simulate hitting and striking, including snowboarding; hockey; football; soccer; dancing; acrobatics; rugby; skateboarding; climbing; swordplay and other weapon-usage; martial arts and other forms of fighting; or any other action that involves the delivery of force impacts. The sensation of striking an object or surface can be applied in several ways even within a specific game. For example, in a fantasy adventure application, there is a need to simulate different types of hitting when striking an enemy with an axe, when using a pick to ascend a slope, and when kicking in a dungeon door.

Many of the concepts, descriptions, and force functions described for actions involving hitting are similar and can be directly or similarly applied to actions involving being hit. The relationship between being hit by something, and hitting something can have the same response, an inverse relationship, or a skewed, altered, rotated, scaled, or otherwise varied force response. The forces associated with hitting can be any combination of force functions as described above in the Force Function section. For example, the concept that being hit can alter the state of a Character, Cursor, or object relative to other actions or objects, such as a BO, also applies to hitting.

The action of hitting can be performed by a User, Cursor, Character, or object interacting with a Hitting Object (HO). A HO can be an object, weight, or anything that a User can interact with through a Device to create a resulting hitting action. A hitting motion with an associated rotation or arching motion, such as using a baseball bat or golf club, or performing an uppercut punch, or a soccer punt, can be implemented by rotating a weight around a point in space. The weight can be rotated around a fixed point in space, or around a changing point in space.

A HO can be a weight attached to the motion of a Cursor, Character or object. The attached weight can provide forces to the User that resist motion and simulate moving an object with mass in order to complete a hitting action. For example, adding a weight to each hand of a boxer, as described in the Tools section, can simulate the weight of the boxing gloves, hands and arms of the boxer. As a User controls the boxer's hands, the forces added by the attached weight simulate moving objects with real mass through a space.

The properties of a HO can be set to a single static form, or the properties can change with respect to the type of hitting, a type of object being used to hit something, or for any reason associated with an application of algorithm. For example, in a boxing game, as a boxer gets tired, the weight of the HO applied to the boxer's hands can be increased. Increasing the weight can slow the response of punching, and simulate a state of being tired. For another example, in a golf game, the length, material, and type of iron or wood can alter the properties of the HO. Steel clubs and longer clubs can have larger HO weights than graphite clubs and shorter clubs respectively. Similarly, each specific club can be given individual properties to affect the weight forces felt by a User while swinging the clubs.

The properties of a HO or of an object, Character or Cursor can alter the effects of other Actions. For example, in a pool game, using a 22 ounce cue stick can have a higher associated weight, a higher impact force with the cue ball, and slower motion control than a 17 ounce cue stick. The slower motion control aspect of using the cue stick is an example of a change to motion or navigation based on the mass property of the cue stick. A form of slower motion control can be implemented by requiring a greater spring force to be applied to create motion, or to slow the rate of motion or navigation with an applied force relative to a property, such as mass.

The act of hitting can be performed by a User with a Device or any other form of input, such as by pressing a button, such that the motion of the hit is not felt by the User, but the impact of the hit is felt through the Device. For example, in a fighting game, the User might not feel any forces as a Character is swinging a leg around to perform a roundhouse kick, but at the moment of contact with another Character, an impact force as described above, can be felt by the User through the Device.

The action of hitting something can be accomplished through the use of an Event Object (EO) as described above in the Tools section. An EO can be utilized to create a hitting event based on particular movements of a Device, by pressing combinations of buttons, or by pattern detection and recognition. An EO and a HO can be combined to function together, an EO and HO can be the same object, or an EO and HO can be different entities with different functions. A HO can have any of the properties, characteristics, or functions of an EO as described above in the Tools section.

For example, the Cursor can reside within a haptic box EO, and a specific type of punch can be activated by hitting the walls of the EO. Different touch combinations or patterns can result in different actions. A right-right-left wall contact combination resulting in a jab, while an up-up-down wall contact combination resulting in an uppercut. Then when the punch is activated, the haptic box EO can disappear and the motion of the Cursor, Character, object, or Device can then control where the punch lands and how it feels depending on how a Cursor is controlled and applied force functions.

The act of hitting can be completed using a body part or other part of a Character. Such hitting actions can include punching, kicking, kneeing, elbowing, head butting, body slamming, or any other action requiring the use of a body part to hit another Character, object, or Cursor.

The sensation of hitting an object or surface can be applied in several ways even within a specific game. For example, in a soccer application, there is a need to simulate different types of kicking when shooting on goal from different positions on the field, when passing to a teammate, when maintaining one's own ball control, and when attempting to steal control of the ball from an opponent. The same concepts, descriptions, and forces can be used for any of the forms of using a body part to perform a hitting action.

The motion of a hit, such as the motion of a Characters leg for a kick, or the swinging of a baseball bat, can be represented by any force function or combination of force functions as described in the Tools section. A force function can be added to any forces created by an EO or HO. For example, in a wrestling game, if a Character is performing a motion to elbow another Character, a weight HO can be used to simulate the motion of the elbow. In addition, a small vibrating or oscillating force function can be added to simulate that the wrestler is shaking with anger or adrenaline.

Forces can be added before, during, or after a hit or a series of hits as an indicator to a User that an event, or change in characteristics has occurred. For example, when a Character defeats another Character or enemy in a fighting game, the triumphant Character can feel a surge of added power. This surge can be simulated with related graphics, haptics, and sound. One way to combine the graphics and haptics to achieve this effect is to have the Character graphically straighten in stance and posture while making the Character appear larger, while at the same time adding an impulse or bell shaped force function in an upwards direction (Y axis) relative to the Character straightening up.

The type of hit, or the resulting forces and impact of a hit, can change with respect to the location of a Cursor or Device relative to its corresponding workspace. A workspace, display, or space can be split up or sectioned into any number of different components. Any component can be a volume, plane, area, or other form of sectioned space. Each component section can control the type, force, motion, or other characteristics of a hit when a Cursor, Character or object resides within that section. For example, kick action within a soccer game can result in a right footed kick if the Cursor is on the right half of the workspace, or a left footed kick if the Cursor is on the left half of the workspace. In this example, the workspace is sectioned by a single plane along the Y-Z plane.

The depth of a Cursor, Character or object within a workspace can alter the response of a hit. For example, in a soccer game, the strength of a kick and the magnitude of a resulting force function impact can be scaled relative to the depth of the Cursor within the environment workspace. A kicking motion performed with the Cursor along the positive Z axis can result in a softer kick than if the same motion is performed along the negative Z axis. The relative depth of the Cursor in a workspace can result in larger or smaller hit results and force responses, depending on the desired effect or type of hit.

The motion of an object, Cursor or Character performing a hit can be mapped to the motion of a Device. The type of motion can alter the type of hit, motion of the hit. For example, in a boxing game, a motion of the Device in the Z direction can result in a jab punch, a motion in the direction of the Z axis with an added downward motion in the direction of the −Y axis can result in a body punch, or a curved motion in the direction of the Z axis curving upwards in the direction of the Y axis can result in an uppercut punch.

The velocity, acceleration, or other characteristics of Device, Cursor, Character, or object movement can change the force of an impact. For example, a jab punch performed by slowly moving the Cursor can result in an impulse force with a small magnitude, compared to the same jab performed with a rapid Cursor motion resulting in a larger impulse force.

The Cursor speed or other characteristics of performing a hitting action can alter both the speed and resulting force of the hitting motion and contact force. A hitting motion can also be performed at the same speed regardless of the Cursor speed of performing the action, resulting in only a change to the force response. For example, all related kick actions can result in the same graphical kick representation, but the speed of moving the Cursor to perform the kick can change the force felt by the User.

The act of hitting can be controlled by the motions of a User, while the resulting action or motion of the hit can be controlled by some other type of means, such as automatic algorithm control. For example, when kicking a ball, the action of the kick can be initiated by a User controlled motion or input, while the direction of motion of the ball resulting from the kick can be automatically controlled, such as to a selected or highlighted team member.

Locations of a contact between Cursors, objects, or Characters can change the graphical representation, the feel of the contact, and the effect of the hit. For example, hitting a baseball on the inside handle of a bat can produce ground ball, with a dull force through a long duration plateau force function with an added vibration force effect, while hitting the ball on the sweet spot of the bat can produce a smooth, rapid impulse force, resulting in graphically setting the ball on fire to indicate a home run.

A hitting action can involve swinging a Cursor, or object into another Cursor, object or Character resulting in the objects sticking together requiring a force to pull the objects apart. This type of hitting can be found in actions such as using a sword, ice pick, axe, any other sharp object, or otherwise potentially sticky object or action. Hitting with an associated sticking component can be utilized by presenting forces to a User representative of the impact, the stick contact, and the force required to release the objects as described above in the Climbing section.

Hitting actions can involve a constant or continuous force applied to a User through a Device. An example of a continuous force is using a fire hose to put out a fire. A force can be applied to a User in the opposite or different direction as the path of the water. The magnitude of the force can depend on the pressure of the water, or the amount of water moving through the hose. Additional sinusoidal, impulse, perpendicular, or other forces can be used to create a sensation of a difficult to control or wild fire hose. The extra forces can move the projected location of where the water hits a fire thus requiring the User to press against any applied forces to accurately aim the fire hose to put out the fire.

A drumming action can be related to hitting. There are a number of applications, simulations, and games that simulate drumming including those that utilize taiko, djembe, tabla, chenda, snare, timbal, bass drums, kettle drums, Bera drums, Mooring drums, Bata drums, timpani, bongos, pressure drums, talking drums, tom-toms, tambourine, cymbals, Hi-Hat, cowbells, woodblocks, electronic drum pads and synthesizers, Bodhran, frame drums, Cajon, Candom be, castanets, darabukka, Karate drums, khomok, klonton, lam beg drum, steel drums, tambour, udu, vessel drums, cylindrical drums, xylophone, and any other object struck to make a sound. These objects can be constructed from wood, plant matter, metal, plastic, glass, bone, skin, body parts or organs, or any other material. These drums can be struck using mallets, sticks, brushes, hands, feet, hammers, utensils such as spoons, fingers, claws, branches, arms, elbows, knees, head, or any object made of wood, plastic, metal, bone, glass, or flesh and used as a beater.

Many of the concepts for hitting with body parts or hitting with objects described above can be applied to drumming actions, including the motions, actions, and resulting force responses. The concepts of Drumming can be applied to any type of timed or rhythmic striking of objects, or to other actions and events.

Drumming can be controlled by holding onto an object and touch that object against another object. For example, a drum stick can be set as a Cursor, and drumming can occur by hitting the Cursor against the drum object. The motion of the moving the drum stick can have an associated force response, such as a weight applied to the drum stick, and each contact with the drum can have an associated impulse force response as one example of one type of contact force. The force response of contacting a drum can change depending on the type of drum, the type of object used to contact the drum, the velocity of the contact, the force of the contact, or any other characteristic of the drum, Cursor, object, Character, or algorithm.

Two handed drumming can be accomplished in various ways. Two separate Devices can be used to control two separate Cursors, hands, or objects to perform the drumming. Alternately, the position of the Cursor or Device can control which hand is performing the hit as described above for sectioning a workspace for different effects. Or the switching between hands can be controlled automatically by an algorithm to match a pattern, timing, or for other intentions.

Graphical representations can be used that tell you when to beat a drum. This can be used as a requirement for a User to have to time hitting the object with that graphical representation as a challenge, learning tool, or for any other reason. For example, if there are two snare drums to hit side by side, one of the drums can light up to indicate to the User to hit that drum. The graphical cue can remain on until the drum is hit, or can turn off or change automatically depending on the application, or necessary timing for matching the graphical cues. Another type of graphical cue is a moving graphical cue, in which a User can see when and what types of drumming actions to take. For example, a User can see circles moving towards a line at a constant speed. The User is required to make a drum beat when a circle touches the line. The graphical spacing between the circles can indicate to a User how fast and what type of rhythm to use in the drum beating. Depending on the success of the timing of a drum beat, graphical cues and haptic cues (or other sensory cues) can give a User feedback on how well the drumming action was performed, and adjust the scoring for the User in a game. A perfectly timed drum beat might have the circle turn green, and the User would feel a small click in response to touching the drum and receive a high score. A slightly late drum beat might make the circle turn yellow, and the User might feel a slight vibration, and receive a lower score. A very late drum beat can make the circle turn red, create a strong and unpleasant vibration, and the User would receive little or no score.

Haptic effects can be used to present information involving timing, which drum to contact next, or any other type of information related to the task. For example, small impulse forces can be added in any direction as a type of tap force to help a User maintain correct timing. This type of effect can be used continuously, or as a means of correction once timing becomes too far from an acceptable error limit. Another type of haptic cue can be vector forces that push or pull in a direction the User needs to move to tap or hit the object. One possible implementation of this type of force is to slowly increase a directional vector force, toward a desired hit location, until a threshold force limit is reached. Upon reaching the maximum allowable force, the force can remain at that threshold level, or add an oscillating, vibrating, or other force function effect in an attempt to get the Users attention to move the Cursor to the correct location.

Previously, force impacts were simulated primarily in the visual realm: a Character or virtual object reacts graphically as though a blow was received or delivered. This approach is limited in that it relies solely on visualization to achieve what is fundamentally an experiential and physical sensation. There have, however, been attempts at providing the User with force feedback in the form of controller vibration. These high-frequency, unvarying, and monotonous controller movements provide only the most rudimentary depiction of the actual impact. The realism is severely limited by a traditional controller's lack of 3D force feedback interactions.

Movement.

In video games and other computer applications that simulate running, jumping, swimming, walking, sliding, or other similar means of movement at various speeds and body positions there is a need to allow the computer User to actually feel a representation of the movement process. This haptic experience of running can enable the User to more realistically control a virtual object or Character, can give a simulation a greater intensity or requirement of skill, and can make game-play more enjoyable.

One type of movement is running (or walking). There are a number of applications, simulations, and games that simulate running and its variants, including on- and off-road foot races; simple travel on foot; riding on a horse and other creatures and animals; gymnastics events such as balance beam, pommel horse, floor exercise, vault, rhythm gymnastics, and baton twirling; skating; skipping; tripping; roller blading; adventuring; evading; escaping; hiking; exploring; fleeing; jogging; track and field events such as sprints, marathons, long distance running, cross-country running, hurdles, long jump, high jump, triple jump, pole vault, and speed walking; dancing; crawling; acrobatics; tight rope walking; avoiding being hit; martial arts and other forms of fighting; sporting events such as football, basketball, soccer, etc. The sensation of running can be applied in several ways even within a specific game. For example, in a track and field application, there is a need to simulate different types of running when speed walking, when sprinting, when jogging long distances, and when approaching the triple jump.

Another type of movement is swimming. There are a number of applications, simulations, and games that simulate swimming, including races in swimming pools or other bodies of water; triathlons; surfing; water polo; synchronized swimming; swimming to reach a destination; swimming to locate objects; and any other situation in which an object is submersed in liquid and must move through it for any purpose. The method of moving through liquid can vary, and can include specialized strokes such as the breaststroke, crawl stroke, treading water, freestyle, backstroke, sidestroke, dog paddle, butterfly, dolphin kick, and any other means of propelling an object through liquid. Furthermore, the properties of the liquid itself can vary, and can include fresh water; salt water; varying currents; waves; funnels; oil; gel; partially frozen water; contaminated water; water containing marine life; or any other fluid characteristics and types. The sensation of swimming can be applied in several ways even within a specific game. For example, in a swim meet application, there is a need to simulate different swimming strokes to correspond with different events. These include the breaststroke, backstroke, butterfly, freestyle, and others.

Another action and type of movement is sliding. There are a number of applications, simulations, and games that simulate sliding, including sledding; skiing; waterslides; walking, driving, skating, or otherwise moving over a slick or slippery surface; hockey; shuffleboard; curling; figure skating; air hockey; and any other activity that involves sliding an object or body. The sensation of sliding can be applied in several ways even within a specific game. For example, in a hockey application, there is a need to simulate different types of sliding when jockeying with other players, when coasting versus accelerating, and when skating while in, and out of, control of the puck.

Another type of movement is jumping. There are a number of applications, simulations, and games that simulate jumping, including snowboarding; skateboarding; football; basketball; volleyball; baseball; soccer; tennis; racquetball; gymnastics events such as balance beam, floor exercise, vault, rhythm gymnastics, and baton twirling; dancing; snowboarding; skateboarding; skiing; water skiing; surfing; riding a bicycle; walking, running; roller skating or roller blading; ice skating; acrobatics; tight rope walking; avoiding being hit; leaping over obstacles or hazards; martial arts and other forms of fighting; skipping rope; hopscotch; track and field events such as high jump, long jump, hurdles, and triple jump; or any other action that involves jumping.

Another type of movement is flying. There are a number of applications, simulations, and games that require flying including piloting a plane, jet-pack, helicopter, hovercraft, land speeder, flying carpet, hang glider, broom or other flying, floating, or winged Device; skydiving or falling; flying without the aid of a Device, due to special powers; floating in a zero-gravity environment; and any other action that involves flight.

Another type of movement is cycling. There are a number of applications, simulations, and games that simulate cycling including urban action RPGs in which the Character can commandeer bicycles throughout the city; sports titles that simulate tournaments, races, tours, or events involving bicycle riding; virtual exercise clubs where a Character can ride a stationary bike to increase stamina; a unicycle ride; riding any two-, three-, four- or more-wheeled pedal-powered Device.

Another type of movement is dribbling. There are a number of applications, simulations, and games that simulate dribbling including basketball; soccer (including "juggling"); field hockey; ice hockey; hand ball; golf ("juggling" or trying to keep a ball in the air using a club face).

Another type of movement is swinging. There are a number of applications, simulations, and games that simulate swinging including those that utilize vines, ropes, bars, rings, pillars, chains, strings, webs, cables, wires, lines, fabric, hooks, harnesses, cords, bungee cords, swings, and any other object that can be held and can carry an object along an arc or swing an object or Character.

Previously, these acts of movement were simulated by pressing buttons and/or moving joysticks using video game controllers. These types of interactions focus almost solely on the timing of game controller interactions and often provide the User only visual feedback. Although the timing of movements involves learning and can give a basic sense of the task, the lack of haptic feedback and the limited control buttons and joysticks offer limits the realism and more complex learning that this operation can have with 3D force feedback interactions.

Any type of movement can utilize the concepts and descriptions described above in the Being Hit, and Hitting sections such as switching between hands or feet, the use of an EO, patterns, User inputs, and directional control of a Cursor or Device. For example, separating a workspace such that a left hit occurs while the Cursor is on the left half of the workspace can be applied to movement. To apply the same concept to movement, a motion of the Cursor on the left half of the workspace can control the motion of a left hand, foot, fin, or other object. The same description can apply for motion and control for the right side as well. Any form of movement can be initiated, controlled, altered, or otherwise changed through any User input or any interaction with an Event Object (EO) as described above in the Tools section. For example, a motion with a Device can cause a Character to transition from walking to running, while another pattern with respect to an EO while running can cause the Character to jump and begin flying.

Movement characteristics and associated forces can vary depending on the type of Character, environment, or any conditions of an application, algorithm, or game. For example, an overweight superhero Character might not be able to jump as high as a thin superhero, and the forces associated with the overweight superhero might be greater in magnitude to account for additional mass. Another possible example is a soldier running with a fully loaded heavy backpack who can move more slowly, have an additional viscous or drag force, and larger magnitude forces relative to a soldier without a backpack.

Blind Movement.

A User can move or navigate a Cursor, Character, or object in an environment with little or no graphical feedback. The shape, texture, and location of a Cursor, Character, or object can be determined by the use hands to feel around a dark environment. A detailed description of touching objects can be found below in the Touching Objects section.

A cane or other object can be used to explore a dark or blind environment in a similar fashion to how canes assist blind people in the real world. For example, a User can tap a cane represented by a cylinder. The forces felt by a User through contacts of the cane with different surfaces can vary depending on the types of contacts. Running the cane into a solid or object or wall, can add strong spring forces to resist motion into the object or wall. Taps of the cane on the hard ground such as concrete can be simulated by small impulse forces added in the vector direction of the impact. The tap forces can be softened by decreasing the magnitude of an impulse, and increasing the duration of the impulse for contacts with soft surfaces such as dirt or grass.

Blind, dark, or difficult to see motion can be aided through the use of another Character, Cursor, or object as an assistant. One example is the use of a seeing-eye dog as an assistant. A User can control the motion and actions of the primary Cursor, object, or Character while the assistant can act independent of the User's inputs. The assistant can indicate to the User when, where, and how to move relative to the environment.

For example, a seeing-eye dog can lead a Character by providing a spring force in the direction the dog assistant is trying to lead the Character, the User can then respond to the forces and move the Character in the direction of the leading assistant. The assistant can stop moving as an indicator for the Character to stop. If the Character moves while the assistant is stationary, a spring force can pull the Character back to the location of the assistant. The magnitude of the spring force can be proportional to the distance away from the assistant.

Any force function or combination of force functions can be used as a means of communication between a User or Character and an assistant. One method of communication is for an assistant to indicate to a User or Character when, where, and how to move or stop moving within a dark or difficult to see environment.

The act of exploration or interacting with an object through the sense of touch can add graphics to a screen, window, display, or other graphical component of an application. This can be used to visually display objects as they are uncovered, discovered, or otherwise evaluated by a User with the sense of touch.

For example, if a Character is touching an object in a dark room such as a statue, as the Cursor or Character touches parts of the statue, a graphical representation of the statue can appear to the User indicating what the Character has touched so far. The graphics can be imposed on the object being touched, or at any location, in any graphical form to the User. For example, if the Character is touching a statue of a dog's head in the center of the display, as the hands of the Character feel over the statue, a picture of the dog's head can begin to appear as a smaller image in a corner of the display.

Forces can be used as an indicator to present information to a User. Information can be presented to indicate directionality, danger, or any information that can be useful to a User. The force indicators can be especially useful in dark or difficult to see settings.

One type of force indicator is to use a repetitive impulse tapping with variable frequency and magnitude to indicate danger. The speed and magnitude of the tapping can be increased as danger to the Character is increased. For example, when walking in a dark cave, audio sound of a heart beat can be matched with impulse forces to help guide a User. As the User controlled Character approaches a cliff, the speed and magnitude of the forces matched to the heartbeat can be increased. If the Character turns away from the cliff, the beating of the heart can subside with less intense forces indicating a decrease in danger.

Directional vector forces can be used to help guide a Character through an environment or setting. The magnitude of a force felt by a User can be related to the angular relation to the desired direction. For example, if a Character is facing the opposite way they need to travel, a large magnitude force can be exerted toward the back of the Character. If, on the other hand, the User is generally moving in the correct direction, the magnitude of the forces can be much less in the direction of desired travel.

The magnitude of a spring force pulling toward the correct direction can increase over time if the User does not correct or compensate toward the desired direction of travel. Haptic textures can be added to objects in a dark or blind setting to convey information to a User about the setting. A more detailed description of texture forces can be found in the Tools section and the Touching Objects section. A User can be required to find certain objects using the sense of touch with limited or no graphical feedback. For example, in order to get out of a dark room, a User might need to first find a square pillar and press a button, or possibly flip on a light switch.

Another example can involve finding and picking up an object where the object itself is not visible, such as a ring at the bottom of a mud puddle. While the User can graphically see the mud puddle, the sense of touch must be used to feel around the mud in order to find the ring. The forces for an interaction can be implemented by applying a viscous texture to the volume of the mud puddle. Additionally, haptic objects, such as a ring and rocks, can be added to the mud each with possible textures, weights, and other properties. A User can distinguish between the objects in the mud by feeling along the surfaces of the objects with a Cursor or other object.

Blind tasks can involve finding and manipulating objects with no graphic feedback. This type of task can require a User to find an object using only the sense of touch, then upon finding the object, an action can be performed through some sort of manipulation. For example, a User might be required to find a rusty padlock on a door at the end of a dark corridor. A User can feel along the door with a Cursor, Character, or object, and be presented with object and texture information as described in the Touching Objects section. Upon feeling a cylindrical padlock on a flat door as an example, the User can correctly align the orientation of the key to enter the lock cylinder after finding the slot of the lock through force feedback.

As another example, a User can be required to pull a lever inside a slimy hole dug into a rock wall in a pitch black room. The User can feel along the wall to find the hole, which can be represented by a haptic cylinder inset into a haptic plane. Haptic textures can be applied to both the wall and the hole to simulate a hard rock feel for the wall, and a slippery, viscous feeling for the hole. Upon finding a hole, the User can move the Cursor, Character, or object into the hole and feel for a lever, then the User can pull on the lever and feel a spring force until a threshold maximum is reached, and the lever is released.

"blind games": A game can be implemented that relies mostly on touch (i.e. the visuals are absent or limited). A Character can need to escape from an area relying only on feeling the walls and other landmarks. The Character can be given hints like "the door is near the statue of a dog's head.", and would have to feel the statue to see if it is the shape of dog's head. This can increase the terror factor of some of the "survival horror" titles, such as resident evil, silent hill 3, manhunt, and some of the spy-related games (e.g., James Bond).

Running.

Actions such as walking and running can be accomplished in various ways. Running can be accomplished by interacting with an EO as described above in the Tools section. An EO can be used to control any part or portion of running including changing feet, controlling speed, or controlling any aspect related to running. For example, completing a pattern can cause a Character to start running, while completing a separate pattern can cause the Character to stop running. Walking and running can also be accomplished by pushing against a spring. A User can push forward against a spring in Z direction to move—the harder the push, the faster the motion. Forces in Y direction (or in any other direction) can let the User know when the virtual feet of the Character hit the ground. Forces can hit at a faster rate when running faster. Forces can have a non-Y component that differs depending on which foot is hitting.

Switching Feet Method.

The following methods allow a User to switch which foot (or other aspect of a Character) is active. As examples, the User can control which foot is taking a step, which hoof or tentacle is taking a step or moving, which hand is moving in climbing or in handstand movement, which knee or hand is moving in crawling, or which skate is moving in ice or roller skating.

Figure 24:
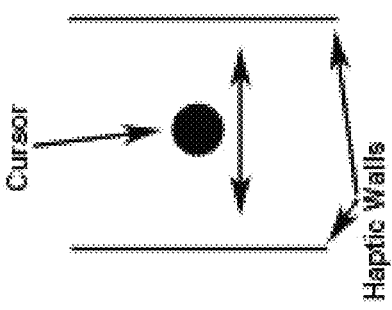
FIG. 24 is a schematic illustration of an implementation of a running interaction.
Figure 24:
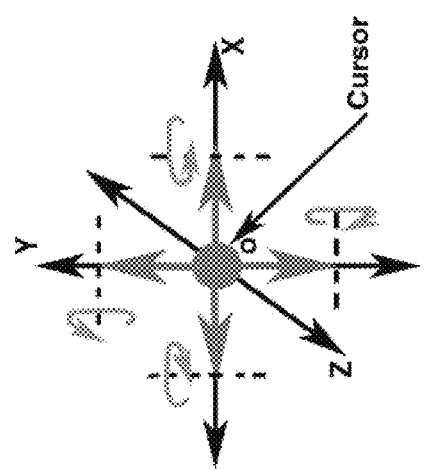

A User can push against two boxes that slide in the X or −X directions, where the Cursor is in between the boxes, as illustrated in FIG. 24. The boxes slide towards the Cursor from a force on them, and the Cursor. The Cursor can push against or hit the boxes, temporarily pushing them away. When the Cursor hits the right box, the Character moves the right foot. When the Cursor hits the left box, the Character moves the left foot. Jumping can be accomplished by hitting one of the boxes harder than a minimum threshold. The quickness of a Character's steps or running can be determined from the quickness of the right-left tapping.

Figure 25:
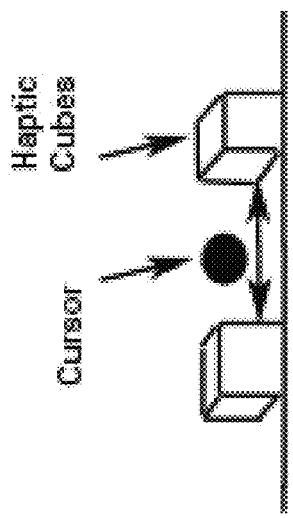
FIG. 25 is a schematic illustration of an implementation of a running interaction.
Figure 27:
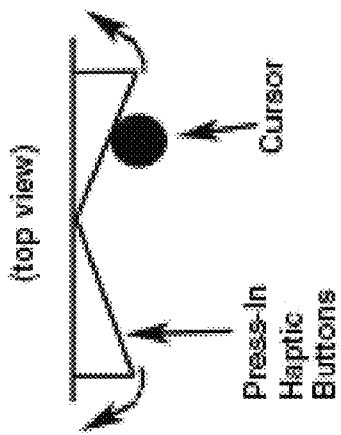
FIG. 27 is a schematic illustration of an implementation of a running interaction.
Figure 26:
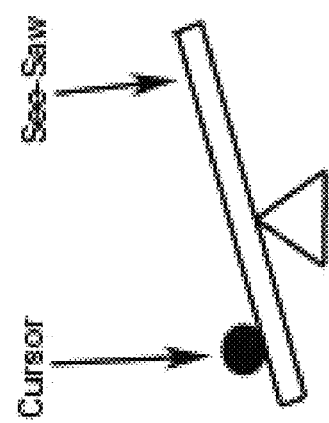
FIG. 26 is a schematic illustration of an implementation of a running interaction.
Figure 28:
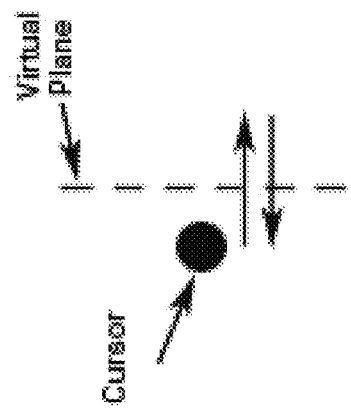
FIG. 28 is a schematic illustration of an implementation of a running interaction.

A similar effect can be obtained by having a Cursor between two virtual walls, with a gap between them, as illustrated in FIG. 25. Tapping the right wall moves the right foot. Tapping the left wall moves the left foot. A similar effect can be obtained by having a Cursor push on a see-saw, as illustrated in FIG. 26. When it is pushed down on the right, take a right step; when it is pushed down on the left, take a left step. A similar effect can be obtained by having a User push two buttons in for right-left steps, as illustrated in FIG. 27. A similar effect can be obtained by having a Cursor move back and forth across a virtual plane to take steps. A force or click can be communicated with each step, as illustrated in FIG. 28.

A similar effect can be obtained by causing a Character to run using concept in balancing algorithm in snowboarding game—rhythmically push down against the cylinder for each step. When Cursor leaves cylinder contact, a step is taken. A similar effect can be obtained by allowing a User to tap against a virtual wall for steps. The User can have to clear an object to be able to tap the wall on either side of it (like a virtual wall). Running and jumping can be combined: a User can initiate a jump by pushing a cylinder down like in snowboarding game, but timing has to be just right with planting of foot to get best jump. Running algorithm can be some other algorithm like pushing against a wall where the harder you push, the faster you go.

Walking and running can also be implemented by allowing a User to pull an object. Imagine an infinitely long plank on ice. The User can keep pulling it towards you by reaching forward, grabbing it (by clicking or pushing down), pulling it back, then releasing and doing it again. Walking and running steps can also be implemented responsive to a switch (e.g., a Morse code switch, or a switch on a Device). A Cursor can also be kept in contact with an object such as a sphere, and a step taken whenever the Cursor reaches a defined location or region of the object.

Forces can be added to simulate a contact with another Cursor, Character, or object while walking, running, or performing any other type of movement or navigation. The forces used to simulate the contact can be applied in the same way as described in the Force Function, Being Hit, Hitting, Touching Objects, or any other sections of this document. For example, if a character is running along a trail in the woods, and trips over a tree root, an impulse force can be added in the opposite direction of motion to simulate contact with the root. The magnitude of the collision can be proportional to the speed of the Character before contact. The trip can cause the running Character to fall forward and collide with the ground. The forces representing the contact with the ground can be implemented in the same manner as described for crashing in the Being Hit section.

The same concepts described for running can be applied to controlling the walking, running or other movement of an animal or another Character in which a separate Character, Cursor, or object has some control over motion capabilities of the moving Character (or animal). For example, when riding a horse, the same concepts used to cause a character to run can be applied to make the horse run. Additionally, more complicated force functions can be utilized to simulate riding a horse or vehicle, for example, than would be used for walking. For example, a User might push forward to make a horse move forward. The User might feel bumps or clicks representing each time the horse's feet touch the ground, simulating the feel that a Character feels while riding the horse.

Different force functions can be implemented for different types of motion, speeds, terrains, or other characteristics of a Character, Cursor, object or environment. For example, when riding a horse, a walking motion can have an associated force function shaped like an upside down 'U' on the X axis to provide a slow rocking back and forth sensation. As the horse speeds up to a trot, the force function can change to an 'M' shape on the X axis with a faster frequency than walking. For an increased speed gallop, the 'M' shaped force response can change from the X axis providing a side to side sensation to the Z axis to provide a front and back sensation to simulate moving faster. Finally, for an all out run, an oval shaped force function on the Y-Z plane, with a longer Z component along the oval, can be used to provide a smooth yet fast moving sensation. As another example, when a horse is walking over gravel, an additional crunching, vibration force function can be added to simulate the crunching of the horse hooves against the gravel.

User inputs can be used to control the speed, movement, direction, and any other capabilities of riding a horse or other animal or Character, vehicle, or object. For example, a Character riding a horse can be holding reins to control the speed and direction of the horse. The reins can have dynamics that can be simulated by applying a weight along the reins. A User can quickly lift the reins in the air and quickly lower them back down to create a whipping effect, and feel the associated whipping of the reins weight, to make the horse speed up. Pulling back on the reins while feeling an associated spring force can cause the horse to slow down. Spring forces can also be applied while pressing to the left and right with the reins to make the horse travel to the left and right respectively.

Creating Energy Method.

Another way to run or move is to have an action or movement unrelated to the movement control the velocity of the movement. For example, an action by the User might be able to be measured as energy created (even if that is not how the algorithm is implemented). Then, energy created by the User can control the energy of the movement. As another example, a User can swing around a ball on a wire or on a spring. The faster it is spun around, the faster the Character runs. As another example, a User can spin a virtual disc with mass (see the description of a Cycling Object—CYO—in Cycling). The faster it is spun, the faster the Character runs. Any type of interaction that can be tracked as building energy can be used. The energy built can be applied towards the motion. Examples include pushing a mass, swinging a mass, pushing a spring, grinding against an object (like sandpaper), spinning a wheel, lifting a weight, throwing balls, like in basketball, and swinging a pendulum.

Falling.

Forces can be applied to a User through a Device to simulate a sensation of falling. Falling can be implemented using the methods, techniques, and forces described in the Acceleration, Balance, Being Hit, Flipping, Flying, or any other section that might involve the falling action of a Cursor, Character, or object. The implementation of falling can be applied to free falling, tripping, falling upward, negative gravity, getting knocked down, jumping, projectiles, or any other action or event representing a falling related motion. For example, if a circus performer is shot with a canon ball on top of a roof, the initial impact force of the cannon ball can knock the performer off the roof as described in the Being Hit section. As the performer starts to fall, acceleration forces can be added as described in the Acceleration section. While falling, the performer can turn, spin, flip, or otherwise rotate to add forces as described in the Flipping section, or control the direction of falling using methods described in the Flying section.

Floating.

Forces can be applied to a User through a Device to simulate a sensation of floating, hovering, levitating, or any other type of suspension. Floating can be implemented using the methods, techniques, and forces described in the Flying, Swimming, Spellcasting, or any other section in this document. For example, when a ship wreck passenger is floating in the ocean, increasing and decreasing a force in a repetitive fashion along the Y axis can be used to simulate a bobbing motion of the Character. As another example, if a dwarf is levitated into the air with a magic spell, a weight force can be added in the direction of gravity proportional to the mass of the dwarf.

Swimming.

Swimming can be implemented using any of the methods described for other forms of motion or navigation. For example, switching feet while running can be applied to switching hands, feet, body side, and any other objects while swimming. In addition, the methods and descriptions for swimming can be applied to any of the other movement or navigation sections.

The movement of swimming can control the motion of any human, animal, or sea creature Character or any other type of Character, Cursor, or object, or any part or a Character, Cursor, or object. For example, while a forward motion with the Device might control a freestyle human swimmer, an up and down sinusoidal motion might control the motion of a dolphin.

A User can control a Character, Cursor, or object to propel another Character, Cursor, or object through or across water. For example, while rowing a boat, a User can perform an elliptical rowing motion with the Device to control oars, and propel a boat across water. The oars being controlled to propel the boat can have mass and an associated weight forces as described in the Tools section. Each contact between an oar and the water can produce an impulse type of force contact as one example. Pulling the oar through water can have added weight force resistance and an added viscosity force as described in the Touching Objects section.

The rate of swimming can be proportional to the rate of performing an action. For example, performing a swimming motion by moving the Device side to side in the direction of the X axis with a slow velocity can result in swimming slowly. Increasing the velocity of moving the Device side to side can increase the rate of swimming. A maximum threshold value can be used to limit the maximum speed of swimming which can reduce the potential overall velocity of a User moving the Device. The force used to create a swimming motion can be proportional to the resulting rate of swimming. If a swimming motion is controlled by pressing or pulling on a spring to control the rate of swimming, the rate of swimming can be increased or decreased as the spring force changes.

A force function or combination of force functions can be added to the forces exerted on a User while swimming. Additional forces can be used to represent or simulate the viscosity of the medium in which the swimming occurs, collisions with other objects, Characters, or Cursors, or to present any other effect to the User.

Some examples of collisions with objects while swimming include hitting other swimmers in a triathlon, rocks, or any other object, Character, or Cursor. Forces can be added to create the sensation of a collision or contact while swimming. The collision forces can be any of the contact forces described in the Being Hit and Hitting sections above, or any other Force Function as described in the Tools section.

Motions used to control swimming can be related or unrelated to the motion required in an equivalent or similar real swimming situation. For example, freestyle swimming can be performed with a hemispherical motion of the Device for each arm, similar to real freestyle swimming. Alternately, the same freestyle motion can be completed with an unrelated motion of moving the Device back and forth along the X axis to create the swimming motion.

The orientation of the Device or Cursor can alter the direction of swimming. The orientation can affect the swimming form, optimal swimming performance, direction of swimming, or any other performance characteristic of swimming. For example, completing a side to side sinusoidal motion along the X axis with the Device can control the tail fin of a fish to swim straight. Rotating the sinusoidal motion around the Y axis such that the motion is flat along the X-Z plane can result in a rotational turn to the left or the right proportional to the direction and amount of rotation of the motion. Similarly, a rotation of the sinusoidal pattern around the X axis can result in swimming down or up.

For example, in an Olympic freestyle swimming race, the orientation of the Device can alter the speed or performance of a swimmer. Optimal speed can be set for a swimming motion to be performed with the orientation of the Device parallel to the surface of the water. A change in orientation away from such a parallel relationship can slow down the swimmer.

Forces can be used to represent any part or component of a swimming process. For example, when performing a freestyle swimming action, each contact of a hand with the water can add a contact force to be felt by the User. In addition, weight forces can be applied to static or dynamically moving objects, such as hands and arms, and viscous forces can be added as the hand pulls through the water as described in the Touching Objects section.

Sliding.

The motion of sliding Character, Cursor, or object can be controlled in the same manner as the methods described below in the Navigation section. The act of sliding can affect other aspects of a Character, Cursor, or object such as the ability to interact with a BO, EO, or any other type of implemented object. Forces can be added while sliding to represent or simulate the surface on which the sliding is occurring. The forces can simulate any type of texture as described in the Touching Objects section with any force function as described in the Tools section. The added texture forces can be continuous, repeated, random, or any combination of possible textures or force functions.

Jumping.

The action of switching between feet in order to jump can be accomplished by using the methods described in the running section. The act of jumping can also be accomplished by utilizing building energy methods described above or by interacting with an Event Object (EO) as described above in the Tools section.

Any force function or combination of force functions can be used to exert a force on a User to indicate a jump, the direction of a jump, the height or magnitude of a jump, or any other characteristic of a jump or landing after a jump. For example, if a Character performs a small hop straight into the air, an impulse force can be added in direction of the Y axis as the Character jumps. Or, a force function in the shape of a hemisphere can be utilized to match the direction and trajectory of an Olympic long jumper.

The magnitude of a force can increase with the height or duration of a jump, and ramp down or quickly subside as the jump is completed. The forces can then transition into a landing or crashing force as described above in the Being Hit section. A User can initiate a jump by pressing a button or through any other type of User input. The action or input used to begin the jump does not need to have any associated forces. A force related to the motion of jumping can be added after the jump has been initiated.

A jump can be detected by reaching a threshold value for the velocity of the Device, an applied force, a specific position such as the height of a Cursor, or any other specified threshold. For example, a Character can begin a jump after the Cursor is lifted past a threshold height along the Y axis. Upon reaching the threshold, the Character can automatically jump. The path of jumping can be related to the path of the motion of the Device. For example, a Device motion directly up in the direction of the Y axis can result in a vertical jump straight in the air. A jumping motion primarily along the Z axis with a relatively small vertical component in the direction of the Y axis can result in a long jump with little height. Any path, motion, or action with respect to an EO can cause a Cursor, Character, or object to jump.

A jumping action can be performed by first pressing down, or in a direction other than the intended direction of jumping, followed by a movement of a Device toward or related to the desired direction of the jump. For example, in a basketball game with the court laying flat on the X-Z plane, a User can start a jump by quickly moving the Device a relatively short distance in the −Y direction followed by a change of direction to move the Device in the +Y direction with a slight added arc of the Device in the Z direction to propel the Character forward to slam dunk the basketball.

The initial act of pressing down can provide a spring force resistance. This spring force can be used to build energy for the jump by maintaining a spring force for a period of time. For example, the longer the spring force is maintained, the higher the resulting jump can be. The initial act of pressing down can control the height or distance of the jump depending on how hard or how fast the User presses down against the spring. A rapid hard press down can result in a more powerful jump than a slow soft press down.

An impulse force, weight force, or any other type of force function or haptic effect can be added upon changing from a downward motion to an upward motion during the jump. For example, an impulse force can be applied for a short period of time to indicate or correspond to a Character's feet leaving the ground, or a constant bell curve can be applied to match a Characters trajectory while in the air during the jump.

The height, distance, or other characteristics of a jump can be proportional, a function of, or otherwise related to the speed a jumping action is performed, or the force applied by a User to jump. For example, a jump can be initiated by pressing against a haptic plane EO above the Cursor. The faster the Cursor is moving as it contacts the EO, the higher the resulting jump can be, or the harder the User presses against a spring force of the plane the higher the resulting jump can be.

The height, distance, or other characteristics of a jump can be proportional or related to the physical distance a Device is moved. For example, moving a Device in the direction of the Y axis one inch can cause a Character to jump five feet, while moving the Device in the same manner two inches my cause a Character to jump twenty feet.

The forces associated with jumping can altered, skewed, scaled, or otherwise affected by properties of a Cursor, Character, object, or environment such as mass, gravity, the load on a Character such as a backpack, size, shape, existing modifiers, or any other property. For example, a Character jumping with heavy chain mail on can have higher magnitude jumping forces, and might not be capable of jumping as high or as far as a Character without the added weight of chain mail.

The act of jumping and landing can affect interaction with other actions or objects such as a BO, EO, CLO, or any other object. For example, a skier going off a super jump might have to compensate for balance both while in the air as well as at the time of impact during landing. Additional descriptions of jumping and altered actions can be found above in the Balance, Being Hit, Flipping, and Climbing sections.

The properties of a jumping action such as the height, distance, speed, and any other property can change depending on the action, or type of motion being performed prior to the jump. For example, a jump performed while a Character is running can utilize more energy and therefore result in a higher jump than if the Character was walking and then decided to jump.

By altering the properties of a jump, the corresponding forces associated with jumping can be altered, skewed, scaled, or otherwise affected by the action or type of motion prior to a jump. For example, if a scuba diver jumps vertically off of a buoy floating in the water, a rotational weight force can be added that pulls the Cursor down and to the side in addition to any vertical jumping forces. This additional force simulates the resulting force applied to the buoy that makes the buoy submerge and rotate while jumping from it due to the limited balance while on the buoy.

Flying.

The motion of flying can be controlled using the same concepts as are described for running, swimming, and navigation. In addition, the concepts and methods employed for flying can be applied to other forms of motion and navigation. Flying motion can be controlled by interacting with an Event Object (EO) as described in the Tools section.

Flying can be controlled by a Cursor pressing on the inside walls of a haptic cube EO. Spring forces can be used to keep the Cursor within the cube such that the deeper the Cursor presses into a wall, the stronger the spring force becomes. Pressing on the left and right sides of the cube can result in turning left and right while flying respectively. Pressing up and down and result in turning up and down respectively. Pressing the far wall, or into the workspace, can result in an acceleration or increase in flight speed, while pressing against the near wall, or away from the workspace, can result in a deceleration or decrease in flight speed.

Figure 29:
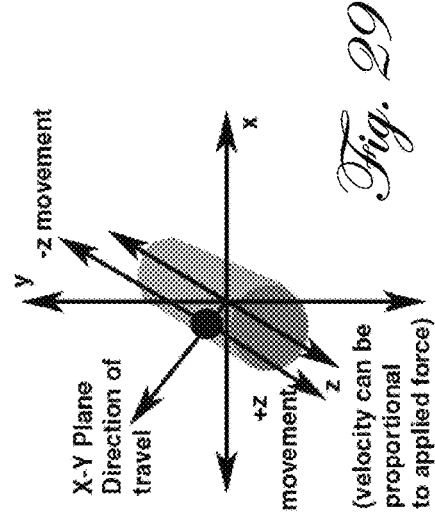
FIG. 29 is a schematic illustration of an implementation of a flying interaction.

Similar to the concept of a haptic cube described above, a haptic cylinder EO can be used to control the direction and velocity of flying. One way to align the cylinder in space is to for the cylinder to sit length-wise parallel to the Z axis, as illustrated in FIG. 29. The point of contact between the Cursor and the inside wall of the cylinder can form a vector pointing from the center line of the cylinder to the point of contact on the cylinder wall. This vector can be used to define the direction of the flight path. The depth of the Cursor and resulting strength of the spring force holding the Cursor inside the cylinder can be used to control the velocity of flight in the direction of the flight vector. Pressing against the far cap of the cylinder, or into the workspace, can cause result in a forward acceleration or velocity. The rate of forward motion can be proportional to the strength of pressing on the forward cap. Pressing on the near cap or away from the workspace can result in a negative acceleration allowing a Character, Cursor, or object to slow down as well as fly backwards. The rate of deceleration or velocity in the backwards direction can be proportional to the strength of the force applied to the near cap of the cylinder. Any geometric shape can provide similar flight or navigation control, and the geometric shape can be any size, and can be located at any location or orientation in space.

The motion of flying can match the motion the motions of a Device. Each DOF of a Device can control a DOF of a flying Character, Cursor, or object. For example, a Device that has 6 DOF position tracking, such as X,Y, and Z axes, plus roll, pitch, and yaw control, can control up to 6 DOF positioning of a Character, Cursor, or object by matching the motion of the Device. For example, while flying in 3D space, changing the pitch of the Device can change proportionately change the pitch of a Cursor, Character, or object under control of the User.

When mapping the movements of a Device to a Cursor, Character, or object any force function, or combination of force functions or haptic effects, can be applied to the motion. For example, a flying superhero that is flying up, down, left, and right might not exert any forces on the User, but when the Character rolls, a weight can be used to provide a force that spins around the Cursor in a vector direction that matches the rate of roll of the Character.

Interaction with an EO can add additional capabilities to flying such as special moves and maneuvers. For example, a circular pattern movement with the Device on the X-Y plane can create a roll maneuver for a Character flying along the Z axis. Similarly, a circular pattern on the Y-Z plane can create a flipping maneuver while flying along the Z axis. Any number of moves or maneuvers, with any number of possible patterns, inputs, or EO interactions can be used to increase the types of flying a User can perform.

The motion of flying can be constrained, guided, limited, or otherwise changed by controlling or changing the graphics and haptics. The graphics associated with a Cursor, Character, or object can be limited, overwritten, or prevented from moving in some way in order to stay within acceptable motion limits. For example, consider a magic carpet that is flying along a wall in a canyon, and a User moves the Cursor that is controlling the position of the magic carpet into the wall. While there might not be any physical or haptic limitations to moving the Cursor into the wall, the wall of the canyon can become a graphical limitation for the magic carpet. The graphical representation can remain next to the wall regardless of the position of the Cursor while it is in the wall. As soon as the Cursor exits the wall into the canyon again, the magic carpet can once again respond in position to the motion of the Cursor.

Haptic limitations can prevent motion of a Cursor, Character, or object as it is moving in an environment. Force functions, spring forces, or any other haptic effect can be used to stay within an allowable area, keep to a specific path or trajectory, or otherwise limit motion in any way. For example, if a bumble bee Character is flying around a garden, and the bee reaches the limit of the garden, or in other words the physical limit of the virtual environment, a spring force can be used to keep the bee inside the environment if the User tries to move outside the allowable environment limit.

Cycling.

Cycling can be implemented with any of the Running Energy methods, applying energy to the Bike. Cycling can be implemented with any of the Running switching methods to describe different feet pushing on the pedals of the bike. Cycling can be implemented with a virtual disc or cylinder or any other type of object, a Cycling Object (CYO), that the User spins.

The CYO can be modeled to spin around a point or a line. It can be modeled so that its mass is evenly distributed around the rotation line, or it can be modeled with more complexity with an uneven mass distribution or other non-linear effects or other functions relating to how it can be spun. One way to spin the cylinder is to model angular acceleration, angular velocity, and angular position through cycles of a simulation loop (which can be the haptics loop or another loop) given a mass description of the CYO.

The Cursor can touch any part of a CYO such as the sides of a cylinder or the edge of a cylinder, or only certain parts of the CYO. When the Cursor touches it, a representation of friction from the CYO to the Cursor can be implemented or the Cursor can attach to the CYO through a spring or exert forces through some other means. As the Cursor exerts forces on the CYO, those forces can make the CYO spin. For example, the Cursor can push against the side wall of a cylinder and it can then push in a direction tangential to the circle or sphere of movement of the CYO (i.e. in a disc, it would be tangential to a circle with a radius equal to the distance from the center of rotation of the CYO to the Cursor). As the Cursor continues to push against the cylinder, the Cursor can spin in circles as it touches the cylinder and spins with the cylinder, as illustrated in FIG. 30. The User can feel angular momentum and inertia of the disc, which can have a representation of mass.

As a CYO such as a cylinder or disc is spun, the Character and the bike move. The faster the cylinder spins the faster the bike moves. This type of energy creating function using a cylinder can be used in any simulation where energy can be applied to the simulation or an action of a Character. Different gears, or ratio's between the CYO's movement and the bike's movement, can be implemented during a Cycling simulation. The movement can also be any generic function from the CYO's movement to the bicycle's movement. The CYO can be any object or any type of representation of an object.

As the CYO moves, its angular momentum can be felt by the User. The User can feel the CYO pull it if it is attached (given the angular momentum of the CYO) or can feel some type of representation of movement, such as the friction of the CYO to the Cursor as the Cursor slides across its surface. The CYO can also create other effects on the Cursor as it moves if the Cursor is stationary or moving slower. For example, the Cursor can feel clicks from the surface of the CYO as it spins past the Cursor. This can be implemented as forces that are applied to the Cursor where their frequency is based on the speed of the CYO. Clicks can also be implemented by a spring force that attaches to a CYO, but breaks when a max force is applied to the Cursor, at which point the spring reattaches at the then current Cursor location. Specifically, a clicking feeling can represent the feel of a bicycle chain.

Pressure or resistance to movement from the Cursor to the CYO (i.e. forces applied to the CYO opposite the direction of movement) can act as a braking method, slowing the CYO and the Character.

Given the nature of a spinning object, and the fact that points on an object further from the radius of the spinning, spin faster, the User can have different sensations of spinning and different abilities to spin based on the radius at which the Cursor touches the CYO. The ability to touch different points on an object might be varied based on the situation of the Character in a simulation. For example, on an easy difficulty setting the Cursor might be able to touch an inner radius on a cylinder, where smaller movements can lead to greater speed.

Forces applied to the CYO in a direction other than in a direction to create a spinning force can have other effects. For example, a force against the side of a cylinder might steer a bicycle, while forces in the tangential direction to movement vary speed. The forces themselves might adjust the steering, or the line or point of rotation might change. For example, when pushing against a cylinder to cycle, the cylinder might be oriented along the YZ plane (i.e. the length of the cylinder is along the X axis). The User can touch the side of the cylinder and create a tangential force to get the cylinder moving, thus moving the bicycle and the Character. As the Cursor then pushes against the side of the cylinder, creating a force in the −X direction, the cylinder can rotate around the Y axis, which would steer the bicycle. This would also rotate the axis of rotation for the cylinder.

Forces from the ground or from the world on the bicycle or the Character can be applied to the CYO or to the Cursor directly. For example, if the bike hits a bump, and the Cursor is attached to the CYO, the CYO might jump up, giving the User the feeling of the bump. Alternatively, a force might be applied directly to the Cursor in the Y direction to simulate the feel of the bike going over the bump. A CYO can have an infinite radius, but a finite mass.

In a cycling simulation, the User might also command a change in state from moving the bike (controlling its acceleration and/or speed and/or position) to another action such as steering or throwing an object, etc. This change in state can be accomplished by pushing a button, moving the Cursor or Device in a certain way, or through some other input. One method of signaling a change in state can be to pull away from the CYO with a minimum force. Another can be to slide the Cursor along the radius of the CYO past a max or min radius.

The CYO might move at a very high speed, where taps of the Cursor keep the speed up (such as a performer, for example, who taps plates to keep them spinning on sticks), or the CYO might seem very massive and spin very slowly. Different parameters on the spinning (changes in mass, representation of time, CYO size, etc) can create different User effects. A CYO can be infinitely thin. A Cursor might only attach to it moving in one direction crossing its surface and not in others.

Dribbling.

Dribbling a basketball can be implanted utilizing a weight with which the Cursor interacts. The weight can have dynamics properties, such as its bounciness relative to the ground. The weight can be implemented so that is it always under the Cursor (i.e. same relative Y values), and so that the basketball is always under the Character's hands, while dribbling.

When the Cursor pushes against the weight downward, the weight moves towards the ground. It can have a minimum or maximum velocity when moving towards the ground. The minimum and maximum values can change based on whether the hand is touching the basketball or not. The weight can be modeled so that if the Cursor pushes it down harder, it moves up and hits the Cursor harder.

When a basketball bounces against the ground, a portion of its energy or velocity might be lost, and its direction changes and it begins moving upwards. The velocity moving up towards the hand can have a minimum value so that the ball is guaranteed to reach the hand, as illustrated in FIG. 31.

The haptics representations of the Cursor and the weight do not have to match the graphics representations of the hand and the ball. The relative positions of the Cursor and the weight can control the relative positions of the graphics and the ball. Cursor movements can control the Character's movements at the same time the Character is dribbling. For example, right-left and forwards-backwards movements can control the direction that the Character moves, while the up-down movement primarily controls dribbling.

Dribbling a soccer ball can comprise a User pushing a Haptic Device forward to move the Character forward. As the User is pushing forward, he can feel the steps of the Character running. These can be clicks or hits in the Y direction (or in any direction) or can be gradual up and down movements, or can be any other indication of running, which can change based on which foot is landing or leaving the ground. While the Character is running, the User also feels whenever the Character's foot touches a ball. The feeling can be felt as a tap, or through some type of dynamics simulation, or through some other type of force given to the User. The force can vary based on which foot is touching the ball, and how the foot contacts the ball. The ball can go in the direction that the Character is moving, but the direction can be modified by which foot is kicked or the input of the Haptic Device before the ball is kicked.

The Cursor can control a weight that represents a foot. Based on input from the User, or a switching method directly controlled by the computer, the currently controlled foot can change, as illustrated in FIG. 32. The movement of the feet move the Character. The foot can be controlled so that it contacts the ball at various places, adjusting what direction it goes, and how hard it is kicked or dribbled. The control of the weight can take 2 different directions, as an example, one for each foot: The individual control of a foot can be combined with a simpler directional running method, where the User controls where the Character runs through some type of running method, and then controls the Character's foot only before a kick or a dribble.

Swinging.

A swinging motion, or any aspect or component to a swinging motion can be controlled by interacting with an EO as described in the Tools section. Switching between hands, feet, vines, or any other type of motion change can be accomplished using any of the methods described for other actions or types of motions.

A swinging motion can be created, implemented, or otherwise represented by movement of a Device, forces presented to a User through a Device, strictly graphical, sound, or other representations, or by any combination thereof. For example, the motion of an ant swinging on a blade of grass fluttering in the wind can be handled by an algorithm updating the graphical position and orientation of the ant, while forces simulating the swinging motion can be presented to the User without the User having to manually move the Device. As another example, a User can begin a swinging motion with a Device to cause a Character to swing on a rope. Once the Character begins swinging, the User can feel forces representing the motion of the swing without being required to continue moving the Device to match the swinging position of the Character. This technique can be useful to maximize the potential Device workspace by preventing a Device from reaching mechanical limits.

The motion control and swinging action can be implemented using any of the movement or navigation methods described in this document. For example, swinging motion can be accomplished by pressing a Cursor forward along the Z axis. The pressing motion and the resulting swinging motion can have the same, different, or no force feedback.

A swinging motion can be controlled by movement control of a Cursor, Character, or object in certain directions where movement in other directions can be controlled by other User inputs, or the movement can be controlled automatically by an algorithm. For example, in an Indiana Jones game, a User can press a button to crack a whip and start a swinging motion. Movement of the Device along the XZ plane can control the directional swinging of the Character, while all Y swinging motion is handled automatically.

A User or Character can create an object to swing from such as a web, vine, rope, or other object to swing on. The created swinging object is not required to be attached to a pivot point from which forces can be calculated. For example, in a Spider Man game, a web can be cast upwards toward the sky. The graphical representation of the web can rise from the Character to the physical edge of the display without any indication of where the web goes or what it attaches to. In this example, forces can be calculated from an arbitrary point in space above the Character to simulate swinging forces without needing to know the location of the end of the web.

A swinging object, Cursor, or Character can swing on an object (a rope for example) that that rotates around a pivot point, as illustrated in FIG. 33. Forces can be used to match or represent the lateral or rotational position and orientation of the Cursor, Character, or object. A force vector can point between the pivot point and the swinging object, such that the orientation of the force vector can change with respect to the swinging motion.

The forces exerted by a Device can increase in magnitude with increasing acceleration on the downward path of a swinging motion. Similarly, the force magnitude can decrease with deceleration on the upward motion of an arched swinging motion. For example, in a Tarzan game, Tarzan can jump of a tree branch to swing on a vine. The vector force between Tarzan and the top of the vine increase as he falls down to a maximum force at the bottom arch of the swing. Upon swinging upward to land on a branch of equal height as the start of the swing, the vector force magnitude decreases until the swing is completed.

A vector force, or any other force associated with a swinging motion can be the same, related, unrelated, skewed, rotated, delayed or otherwise different from a graphical representation of a swinging object. For example, the angle of a vector between a pivot point and the graphical representation of a Character can be 45 degrees, where as the angle of the applied force vector relative to the same pivot point can be 65 degrees to produce an intended effect.

A swinging force can be represented by having a weight force that can provide forces in the direction of the −Y axis, in the direction of gravity, or any other desired direction. The magnitude, mass, dynamic characteristics, and/or the position of the weight can change with respect to the changing height or position of a swinging Cursor, Character, or object. The magnitude of the weight can be altered to match or imply similarity with a graphical change of a Cursor, Character, or object such as an arched swinging trajectory. For example, the magnitude of the weight force can reach a maximum at the highest or lowest point of a swinging path. Or the magnitude of the weight force might remain constant regardless of the graphical representation of the swinging Character, Cursor, or object.

Swinging forces can be related to the properties of the Cursor, Character, or object performing the swinging, as well as the material used to swing. For example, a fat monkey can have greater magnitude forces than a skinny monkey. Or swinging on a big rubber band can add spring forces that vary in magnitude along the rubber band to simulate a bouncing sensation while swinging on a metal bar might not provide any bouncing effect.

The movement or sliding of a Cursor, Character, or object along an object being used for swinging can provide additional texture forces that a User can feel. For example, if a Character is swinging on a rough twine rope, loses his grip and slides down the rope, any of the methods for implementing texture related force functions described in the Touching objects section, or the Force Function section can be used to simulate the rough texture of the rope. Or if a Character is swinging on a rusty chain, grinding vibration texture forces can simulate the rough texture of rusty chain.

The properties of a swinging Character, Cursor, or object can have physical properties such as mass, inertia, momentum, acceleration, and any property to alter the movement dynamics while swinging or associated forces presented to a User. External or environmental variables and forces on a Character, Cursor, or object can be changed to alter the feel of the swinging motion. For example, the direction and magnitude of gravity can be changed as a Character swings to produce an increase and decrease in the applied forces related to the acceleration and deceleration of the Character during an arched swing. As another example, the time variable can be altered such that forces produced by dynamics equations change as the time variable is changed.

A swinging motion can incorporate any of the properties described with respect to interaction objects such as a BO, CLO, HO, etc. For example, upon starting a swinging motion, a User can be required to interact with a BO to keep from falling. The UO falling off the BO can represent a Character falling off a rope for example. The properties of the swinging motion can effect the interaction with the BO where the position and properties of the BO can change relative to the swinging motion. For example, a BO can rotate relative to the UO to match the graphical rotation of the swinging Character around a pivot point. The mass of the BO can reach a maximum at a high or low point of the swinging motion thus requiring a User to account for the rotation and mass changes of the BO to prevent falling.

Swinging can be implement by creating forces that always pull towards a Character or object in movement that is proportional to the movement of a handle in the Device's workspace. For example, a swinging character can create forces for a User such that the forces always pull the Device handle to a point in the Device's workspace. That point can proportionally move (or move through some type of function) relative to the motion of a Character that is swinging. The Device, therefore, can be pulled so that it would move in a similar way to how the Character moves in the virtual world.

Swinging can be implemented within the workspace of a Device while a Character can continue swinging without bounds. Device movements within a constrained workspace, therefore, can control unconstrained movement by a Character.

A weight can be implemented to only move within a constrained path. The movement of the weight along the path can relate to the swinging motion (or any other type of movement or motion) of the Character. The weight can be attached to a Cursor with a spring giving the User a feeling of swinging. For example, a weight can be implemented so that it can only move along the Y axis. The weight can move proportionally, or through some other type of function, relative to some characteristic of a simulation of an object or Character swinging, such as a Character's velocity, position, or acceleration. Similarly, other aspects of the weight can be adjusted to simulate swinging, such as its mass, gravity acting on it, velocity, acceleration.

A Cursor that is being used to control a swinging Character can be constrained to move only along a set path, by applying forces towards that path. For example, the Cursor can be constrained so that it can only move freely along the Y axis, and has a spring force always pulling it towards the Y axis. The Cursor's movements and forces away from the path can be used to control the direction of a Character's swinging motion.

For example, a Cursor can be attached to a weight that is constrained to only move along the Y axis. The cursor can also be constrained to move along the Y axis. The weight can hang above the cursor, with gravity pulling upwards on the weight. The cursor and the weight can be presented to the User only haptically through the Device, without any graphical representation. A Character that swings on a rope can be used to adjust the movement and mass of the weight, giving the strongest force pulling up on the Cursor when the Character is at the maximum acceleration at the lowest point on the trajectory of the swing. As a Character swings from rope to rope, the User would feel a force pulling upwards representing the force the Character is feeling with his hands holding the rope. The User would feel the force change proportionally to the force the Character would feel, but the force the User would feel would largely be in the Y direction. The Cursor can pull away from the Y axis, but a spring would always pull the Cursor back towards it proportional to the distance the Cursor is away from the Y axis. The direction the cursor moves away from the Y axis, or similarly the force the Cursor pulls away from the Y axis, can be used to control the direction of swinging of a Character. This example would give the user the ability to control a Character's swinging, and feel the effects of the swinging, while maintaining most of the movements within the Device's workspace along a vertical axis in the center of the Device's workspace.

Navigating.

In video games and other computer applications in which there is general navigation (such as directing an object along an intended route, orienting and moving a Character or the Character's viewpoint, controlling virtual crafts, or controlling a virtual camera) or ones that simulate driving in a Device or vehicle (wheeled, hovering, flying, floating, rolling, or underwater devices, including those traveling on or off tracks), there is a need to allow the computer User to actually feel a representation of the navigating or driving experience. This haptic experience of navigating or driving can enable the User to more realistically, more accurately, or more effectively control a virtual object, Character, or vehicle, more easily find a desired viewpoint, and can give a simulation a greater intensity or requirement of skill, and can make game-play more enjoyable. There are a number of applications, simulations, and games that simulate driving including on- and off-road races, demolition derbies, and simple travel involving cars, trucks, trains, tanks, jeeps, ATVs, flying carpets, airplanes, space craft, carts, chariots, carriages, buggies, boats, jet-skis, motorcycles, hovercraft, land speeders, and submersibles; and general navigating in a virtual environment. There are a number of applications, simulations, and games that simulate navigation, including on- and off-road races, demolition derbies, and simple travel involving cars, trucks, trains, tanks, jeeps, ATVs, flying carpets, airplanes, space craft, carts, chariots, carriages, buggies, boats, jet-skis, motorcycles, hovercraft, land speeders, and submersibles; snowboarding; skateboarding; skiing; water skiing; surfing; riding a bicycle, motorcycle, or other wheeled Device; piloting a boat, jet ski, or other water craft; piloting a plane, jet-pack, helicopter, hovercraft, land speeder, flying carpet, hang glider, broom or other flying, floating, or winged Device; skydiving or falling; flying without the aid of a Device, due to special powers; floating in a zero-gravity environment; riding on a horse and other creatures and animals; walking, running, or otherwise moving on foot; climbing; gymnastics events such as balance beam, pommel horse, floor exercise, parallel bars, rings vault, rhythm gymnastics, and baton twirling; dancing;

acrobatics; tight rope walking; roller skating or roller blading; use of firearms and hand-held weaponry; spying; ice skating; jumping and flipping; swinging; avoiding being hit; martial arts and other forms of fighting; sporting events such as football, basketball, soccer, etc; or navigating within an application designed for CAD/CAM, modeling, animating, simulation, training, visualization or any other type of 3D interaction. The sensation of driving can be applied in several ways even within a specific game or application. For example, in an espionage-related action game, there is a need to simulate different types of driving when flying a plane onto a remote island, when piloting a jet-ski toward a compound, when driving a motorcycle hijacked from a guard, and when piloting a stolen submarine back to home base. Additionally, the sensation of navigation can also be applied in several ways even within a specific game or application. For example, in a science-fiction war application, there is a need to simulate different types of navigation when piloting space craft, when peering around corners in order to glimpse enemies, and when sighting those enemies through the scope of a sniper rifle.

Previously, the act of driving was simulated by pressing buttons and/or moving joysticks using video game controllers. Although the timing of movements involves learning and can give a basic sense of the task, the lack of haptic feedback and the limited control buttons and joysticks offer limits the realism and more complex learning that this operation can have with 3D force feedback interactions. These types of interactions focus almost solely on the timing of game controller interactions and often provide the User only visual feedback. Navigation is primarily implemented with a 2D mouse which is often awkward when it is used to control 3D navigation. The lack of 3D interactions and force feedback leave inadequate solutions to navigating.

A Character, vehicle, craft, camera, viewpoint, or any other method of movement can be implemented, controlled and moved using a Navigation Reference (NR). A NR is any concept used to control the movement or viewpoint of a User or a Character. A NR, for example, can be a car, truck, train, tank, jeep, ATV, flying carpet, airplane, space craft, cart, chariot, carriage, buggy, boat, jet-ski, motorcycle, hovercraft, land speeder, submersible, virtual camera, virtual craft, Character viewpoint, or User Viewpoint.

NR's can be controlled through direct positional changes, velocity or acceleration position changes, direct angular (i.e. direction) changes, or velocity or acceleration angular changes. For example a NR can move in the x, y, or z directions directly controlled by the User. A NR can also move in the x, y, or z directions through a velocity or acceleration to the NR, directly controlled by the User. Likewise, A NR's direction of movement or physical orientation can be controlled directly, or can be controlled by angular velocity. The following are specific examples.

Example: A Cursor can move right and left. These right-left movements can control the relative position (relative to any coordinate system, where the coordinate system is rotated in any direction) of a NR, scaled in any way including non-linearly. For example, a helicopter might directly move right or left as a Cursor moves right or left, in a 1 to 1 or scaled correspondence.

Example: A Cursor can move right and left. These right-left movements can control the relative velocity (relative to any coordinate system, where the coordinate system is rotated in any direction) of a NR, scaled in any way including non-linearly. For example, a helicopter might have a right or left velocity or acceleration as a Cursor moves right or left.

Example: A Cursor can move right and left. These right-left movements can control the relative orientation (relative to any coordinate system, where the coordinate system is rotated in any direction) of a NR, scaled in any way including non-linearly. For example, a helicopter might turn right or left (rotate around its y axis), as a Cursor moves right or left.

Example: A Cursor can move right and left. These right-left movements can control the relative angular velocity (relative to any coordinate system, where the coordinate system is rotated in any direction) of a NR, scaled in any way including non-linearly. For example, a helicopter might turn right or left (rotate around its y axis) at an angular velocity or acceleration determined by a Cursor that moves right or left.

Example: Similarly, up and down, and forwards and backwards movements of a Cursor can control a NR in the same way that right-left movements do. Movements by the Cursor do not necessarily have to be in orthogonal directions to control a NR. For example, the Cursor's relative position to an object, or the Cursor's position in Spherical or Cylindrical coordinates might control the NR.

Example: Movements of the NR can be relative to its own coordinate system (for example the right left movements of a plane can be described so that the plane always rotates around its own relative y axis), or the movements of the NR can be relative to any other coordinate system (such as a global or world coordinate system).

Example: Forces can be applied to the Cursor or User to make the navigation and driving more effective. For example, a spring can be applied to a Cursor when the Cursor is controlling the velocity of a NR.

Example: Position and orientation of a NR can be controlled by a 3 DOF Device, a 6 DOF Device, or any other number of DOF Device. Any DOF on a Device can control any DOF on the NR.

Example: A NR can move along a surface, with forces and interactions from the Cursor along any 2 axes controlling movement, where forces along the other axis control movements away from the surface.

Different individual methods of controlling a NR's position or orientation can be applied together to give a more effective overall method of controlling the NR. Below are examples of combinations of NR movements.

Example: Right-left Cursor movements can control the direction a car moves (i.e. control the steering), while forward backward Cursor movements control how fast it accelerates and brakes. Up down movements and forces can be applied to the car and the Cursor depending on interactions of the NR (the car) and the environment. For example, as a car goes off a jump, the Cursor might experience a force in the positive Y direction.

Example: Right-left Cursor movements can control the direction a space ship flies by rotating the space ship around its relative Y axis. The Cursor's forward-backward movements can control how fast the space ship accelerates or decelerates. The Cursor's up-down movements can control the rotation of the space ship around its relative X axis.

Example: A NR, in a 1 to 1 or scaled correspondence, can move in the X, Y, and Z directions and rotate about the X, Y, and Z axes as the Cursor moves in the X, Y, and Z directions and rotates about the X, Y, and Z axes.

Example: A NR can move in a 1 to 1 or scaled correspondence in the X and Z directions relative to the Cursor movements, but can move by acceleration or velocity changes in the Y direction based on the Cursor's Y movements.

Example: The view of the User or Character can always be centered on a point in space, and as the Cursor moves, the NR moves in a 1 to 1 or scaled correspondence, but maintains an orientation which keeps the point centered in the middle of the screen for a User or in the direct line of sight for a Character. The movements of the NR can also be controlled through velocity or acceleration, while maintaining an orientation keeping the center point in view. The movements of the NR can be constrained to a surface or a curve (whether controlled by direct position changes, or through acceleration and velocity changes), and forces can be applied to a Cursor to make the interaction more realistic. For example, if the NR is constrained to a sphere with respect to a center point, then the Cursor can also be constrained to a Sphere. The relative position of the Cursor to the center of its reference sphere can control the relative position of the NR to the center of its reference sphere. A Cursor can also have forces applied to it by an object that is not directly related to the constraints the NR has. For example, a Cursor can be inside a box (or can interact with any other object), and push against the walls of the box, which controls the velocities of a NR along a constrained surface.

Example: A Cursor can control the running of a Character (i.e., the Character is the NR). A Cursor can push against the sides of a box or against a spring in the X-Z plane to make the Character run on the ground. Pushing up can make the Character jump, and pushing down can make the Character duck, as examples.

Example: A Cursor can be positioned in space directly to where a NR should be teleported. The Cursor can also click and drag, to indicate a position to move to and a position to be looking at.

A Keyboard can be used to control a NR while a Haptic Device is used for another aspect of an application, such as using the arrow keys to move a Character or vehicle along the ground. The keyboard can be used to control a NR in combination with other descriptions of how a Cursor is used to control a N R.

A combination of User inputs can be used to control a NR. Each separate input can control a different aspect of the NR, or the different inputs can control the NR in the same or similar manner. A Device can be used to provide some or all of the control of a NR with forces presented to the User implemented with any of the force responses described in the Navigation section, or any other section of this document. Additional User inputs can be implemented as described in the Inputs description in the Tools section.

For example, a Device can be used to control the orientation of a NR by pressing left and right to rotate around the Y axis, up and down to rotate around the X axis, or forward and backward around the Z axis. Spring forces can be used along each axis to provide force feedback proportional to the strength a User pushes correlating to the rate of rotation. The position of the NR can then be controlled by pressing buttons on a handle, keyboard, or controller. Pressing one button can result in an acceleration and forward motion of the NR, while a different button can result in a deceleration and backward motion of the NR. Forces can be applied to the User through a Device when a button or any other type of input is applied. For example, a keyboard press might make a Character run forward. The running motion might create a force in the Z direction, representing the acceleration the User is feeling.

In the above example, additional buttons or inputs can control the orientation of the NR along with the orientation control capabilities of the Device. For example, a miniature joystick on a hand held controller can control the orientation of the NR affording the User the option to use either or both the joystick and the Device to control NR orientation.

As another example, a keyboard can be used to control the orientation of a NR. The 'W' key can rotate a NR up, 'S' might rotate down, and 'A' and 'D' might rotate left and right respectively. While controlling the orientation with the keyboard, a Device can be used to control the position of the NR. Pressing side to side against a spring force along the X axis might cause the NR to strafe side to side at a rate proportional to the applied spring force. Pressing forward along the Z axis can cause the NR to move forward at a rate proportional to how hard a User presses against a spring force. Similarly, pulling backward along the Z axis against a spring force can move the NR backwards.

Forces can be applied to a Cursor for interactions with a NR and a virtual environment. For example, forces can be applied to the Cursor when a NR hits a bump (such as a car going over a bump), or when something hits a NR (such as a car hitting another car).

A User's viewpoint or a Camera can be implemented such that a User has a good view of a NR while it is moved. Controls by a Cursor and forces to a Cursor can be made to be relative to a coordinate system that is defined by the User, defined by the NR, or defined globally as examples.

Rotations controlled by a Cursor can be implemented by the Cursor's interaction with an object. For example, a Cursor's relative position on a cylinder might control the position of a NR along a different cylinder, through some type of correspondence between the two cylinders. Likewise the interactions of a Cursor relative to any object can be mapped to the position of a NR on another object. Also the movements of a Cursor relative to an object can control the velocities, accelerations, or positions (including rotational velocities, accelerations, or positions) through some type of mapping from the interaction of the Cursor and the object. The Cursor can have forces applied to it by the object, and the forces can also be used to control the NR.

A mechanism for remembering specific positions and orientations of a NR can be implemented such that a memorized position and/or orientation can be returned to at a later time. A User or Character can move his or her head and change a viewpoint through interactions and controls separate from the control of a NR.

Shooting.

In video games and other computer applications that simulate shooting—such as launching a projectile using a propulsion Device—there is a need to allow the computer User to actually feel a representation of the shooting experience. This haptic experience of firing a Device can enable the User to more realistically control a virtual object or Character, can give a simulation a greater intensity or requirement of skill, and can make game-play more enjoyable. There are a number of applications, simulations, and games that simulate shooting including those that utilize cannons, rifles, pistols, lasers, crossbows, bows, machine guns, sling shots, automatic weapons, rocket launchers, Gatling guns, flame throwers, grenade launchers, shotguns, tear gas-canister weapons, bean bag guns, pellet guns, BB guns, RPG launchers, and any other Device that can launch a projectile.

Previously, shooting was simulated primarily in the visual realm: a Character or virtual object reacts graphically as though a shot was fired. This approach is limited in that it relies solely on visualization to achieve what is fundamentally an experiential and physical sensation. There have, however, been attempts at providing the User with force feedback in the form of controller vibration. These low-fidelity controller movements provide only the most rudimentary depiction of the actual firing. This vibration does not realistically simulate the forces of shooting a gun, and often the forces are along an axis of aiming (such as with a force feedback joystick), making the shooting more frustrating in ineffective ways. The realism is severely limited by a traditional controller's lack of 3D force feedback interactions. In many first person shooter games, aiming is accomplished through a reference on the screen of where the gun will shoot, rather than using the gun itself to aim, as is done in real life.

A Device with sufficient degrees of freedom can allow a user to aim a virtual gun primarily by moving right and left, and up and down (X and Y), and experience forces in the forward-backward direction (Z), as illustrated in FIG. 34. Although the primary force would be along the Z axis, forces can have an X and Y component as well. Although the primary aiming would come from X and Y movement, Z movement can influence aiming as well. Motion, rotation, and forces can be scaled in any of the dimensions to make aiming and shooting more realistic, or more or less difficult.

The force communicated by a Haptic Device can be determined so that the User's typical movement away from the target's aim realistically mimics the movement away from the target's aim in real life using the real life version of the weapon. For example, if a real life weapon typically kicks the aim up and to the right, the virtual gun can also kick the aim up and to the right.

A gun can be implemented as a 6 DOF gun. The gun can be lined up manually to aim. For example, the front and back sights can be lined up to aim, as is the case with many weapons. Degrees of freedom can be removed from the aiming, while largely keeping it similar to real life. For example, control from the rotation about the z axis can be removed. The z axis rotation of the gun can automatically be set to the correct rotation as the gun is moved. Similarly, movement along the z axis can be removed to make the guns movements more realistically approximate how a real life gun is shot.

The control from degrees of freedom can be lessened (i.e. the amount the gun moves relative to a Cursor or Device movement), to make the aiming realistic, while still maintaining the important aspects of 6 DOF shooting. For example, movement can primarily be in the x and y directions, with forces in the z direction. As the gun is moved it can be automatically rotated so that it is aimed straight ahead (as the User would expect the gun to shoot given the line of sight between the gun's sights and the User's point of view). This can be an implementation of aiming without any other rotational degrees of freedom (i.e. the aiming is based only on movement in the x and y directions). However, from those automatic rotations of the gun, based on position, the gun can rotate further based on the rotations of the Device or Cursor. These amounts can be scaled so that larger rotations of the Device or Cursor only make minor changes in the rotation and aim of the gun, but are big enough that the User needs to make sure the aim is correct to hit a target. This method can be an effective way of keeping the aiming from being too difficult (by handling the macro rotations and aiming automatically) while still allowing the User the need and ability to make sure the gun is oriented correctly.

As an example: In real life, when a pistol is held, it is typically held with the arm sticking straight out, such that the sights on the top of the pistol are lined up between the shooter's eye and a target. The shooter has to get the gun in the right position and orientation, so that the front and back sights and the shooter's eye are all in line with the target. As the shooter moves his arm or body around to put the gun in the right general position (macro-aiming), the gun rotates (i.e. it rotates with respect to a global set of axes). For example, when the shooter moves the gun slightly to the right by moving his arm, the gun rotates about the shooter's shoulder. If the shooter rotates his entire body, then the gun rotates about the shooter's body as it turns. This large scale rotation is typically easy for a person to do, and doesn't require much skill. Most people can easily orient an object in front of them and have it generally aimed in the right direction. However, after the gun is aimed in the correct general direction, it is more difficult to get the sights exactly on the target (micro-aiming). This is accomplished through smaller wrist movements, and requires the shooter to hold the gun as still as possible. In implementing a virtual version of shooting, then, ideally the User should be able to aim in a similar way to how it is done in real life, with the same types and amounts of difficulty. Because a Haptic Device is typically held to the side of a computer monitor, and not directly in line with the Users point of view to the monitor, macro-aiming can be more difficult. Smaller hand movements can have large aiming effects if implemented in a simple 1 to 1 manner (i.e. movements directly control the virtual gun's x, y, and z positions in a scaled way, and rotations directly control the virtual gun's x, y, and z orientations in a non-scaled way), and the User's smaller orientation movements, which would normally be used only for micro-aiming, are used for both macro-aiming and micro-aiming. To overcome this discrepancy in real life and virtual shooting, the maco-aiming rotations can be handled automatically as described above, such that the gun is generally oriented in the right direction as it is moved, while the micro-aiming of the gun is handled naturally by modifying aim based on the rotations of the Device or Cursor.

Force Effects can be applied to allow the User to feel a trigger being pulled back and clicked, at which point the forces change to the feel of the shot being fired. The firing of the weapon can be based on movement of the Device, therefore, rather than pushing a button.

Aiming can be accomplished by rotation about the shoulder when using a rifle or shotgun. The gun can have weight (i.e. a force pulling down), and can have momentum and inertia. The forces from shooting the gun can be proportional to the type of gun used. A shotgun, for example, can have more force than a pistol. The percentage increase in force of a shotgun over a pistol can be that of the real life percentage increase from a shotgun to a pistol to make the relative forces seem realistic (i.e. different gun forces can be scaled by the same amount).

Guns can work in combination with the methods described in this section, with modifications or characteristics specific to a weapon. A shotgun can feel a relatively large force. It can have a large number of bullets coming out, making the need for aiming less exact. Movements of the Device or Cursor can control rotations of the shotgun, reference about the User's virtual shoulder. A pistol can have a smaller force and be controlled at the Character's or User's arms reach. A machine gun can have repeated forces, representing each shot. The forces can also be at a rate different than the actual bullets coming out, which in some cases can make the shooting seem more realistic or allow a variation in game play and what a User feels to allow for a lower fidelity Device. A laser gun can have a force like other weapons, but it might have some vibration representing how hot it gets, for example.

A force can be applied in an opposite direction of a large force from a weapon, for a short time before the main part of the force is displayed to a User in order to make a blast seem larger. For example, if a User is shooting a bazooka in the Z direction, the main blast would be in the negative Z direction. The bazooka force can be implemented so that there is a small force in the Z direction and then a large force in the negative Z direction (i.e. it would pull the bazooka slightly, before giving a big push).

A gun can be shown in a fixed position on the screen, and it doesn't move in the x, y, or z directions (or only moves slightly), but rotates. Then the User can use an external reference, such as a cross-hair that moves as the Cursor or Device moves, to be able to aim at targets. Forces can still be applied to the gun, and the aiming reference can move based on the forces in the same ways that are described above for guns.

A point interaction control can be set around the primary sight of the gun, so that rotations are about that point. Examples of specific force functions are described in the Tools section above. A gun handle, a replica of a gun, or a gun itself can be attached to a Haptic Device. As an example, the front of a rifle can be attached to a Haptic Device with a suitable working volume or range of motion.

Archery.

A Haptic Device can be used to control a bow and arrow, or similar types of implements such as a slingshot. The description here will assume a bow and arrow; modifications for similar implements will be apparent to those skilled in the art. The bow string can be pulled back by the Cursor. The User can feel a spring force pulling the Cursor towards the resting position of the bow. The bow string does not have to be modeled in any particular way (or even as a string at all). It simply refers to the spring force felt by the User controlling the arrow. As the User pulls the bow string backward away from the bow's resting position, the bow string and arrow pull back. When the string is released the arrow shoots forward. Before the bow is pulled backwards, a force can be applied to the Cursor pulling it to the point at which the bow string should be grabbed.

The bow string can be grabbed by clicking a switch, or some other User indicated interaction (which can include correct positioning of the Cursor). A similar action by the User can indicate when the arrow is released. For example the bow string can be grabbed by clicking and dragging a switch, and then can be released by letting go of the switch.

The spring felt while pulling the bow string back can be a simple linear spring force of varying spring constants, or it can be a more complex spring force. For example, the spring force can be modeled such that it creates a feeling for a User representing a compound bow, where the force of the bowstring lessens when the bow string is pulled all the way back.

While a bow string is pulled back, the User can aim the bow and control where the arrow will go. This can be accomplished in a number of ways, such as the examples below.

Example: One method for aiming is to have the Haptic Device control the hand that is pulling the bow string back (in this example, that hand is the Cursor), and have the bow pivot around the Character's other hand holding the bow (or it can pivot around some other point in space). If the User moves the Cursor right, then the bow would rotate to the right and an arrow would therefore shoot to the left. Similarly, the Cursor can move up and down and control the trajectory of the arrow. If the Cursor moves down, the bow would rotate down, and the arrow would shoot higher into the air with a higher trajectory.

Example: Another method of aiming is to have the right-left and up-down movement of the Cursor control the bow itself, rather than the bow string. The bow would therefore rotate around a point behind the Cursor (i.e. a point with a greater Z value), such that if the Cursor moves right, the arrow would shoot more to the right. If the Cursor moves up, the arrow would shoot higher into the air.

Example: Another method of aiming is one where the Haptic Device movements control the orientation of the Character, and the aiming is based off of the Character. A movement to the right, for example, might rotate the Character to the right, and aiming of the arrow can be implemented such that it is always consistent relative to the Character.

Example: Various methods of aiming can be combined, such that movements along one axis can control aiming using one of the methods given, and movements along another axis can control aiming using another of the methods given. For example, as a bow string is pulled back, right-left movements might control the direction that a Character is aimed, and up down movements might control the up down trajectory of the bow and arrow in the Character's hands.

It is not necessary that the User's view line up with the direction the arrow is shot. For example, the arrow can be shot to the right or left of the screen. However, the User's view can be adjusted so that the arrow always flies straight ahead. The User's view can be adjusted in varying degrees along different axes. For example, on a shot that is to the right of a Character, and which has a high trajectory, the User's view can be adjusted so that the arrow appears to fly straight ahead in the computer monitor. The User's view might therefore be looking into the clouds to the right of the Character. Alternatively, on the same shot, the User might be looking to the right of the Character, but straight down a field, so that the arrow is being shot straight from a right-left perspective, but the arc of the arrow is more apparent. Alternatively, on the same shot, the User's view might be straight ahead relative to the Character, and the arrow might therefore shoot towards the top right corner of the computer screen.

The distance the arrow flies can be controlled by the User, by both the trajectory of the arrow, and how far back (i.e. how tight) the bow string is pulled. The speed of the arrow can also be controlled by how hard/far the User pulls the bow string back. The arrows trajectory can be simulated in any way including a simple calculation where the arrow flies straight, or a complex simulation where gravity, wind speed, air fluid dynamics, etc. all play a part in where the arrow lands.

Arrows can be automatically reloaded upon a command from the User, when the last arrow lands, or through some other indication. Arrows can also be directly placed onto the bow by a User. The arrow can be positioned, a nock can be attached to a bowstring, or any other aspect of simulating how a real arrow is placed on a real bow, can be simulated.

The forces that a User feels from pulling a bow can be decreased over time if a User holds the bow in a taught position for a long time. This can be done gradually so that the User does not notice. This gives the perception that the User is maintaining a constant force (while in fact the User is not), and can help to keep the motors within the Haptic Device from overheating. This effect can be used in any algorithm (i.e. in anything other than archery), where a Haptic Device has a strong force applied to it over a relatively long period of time.

A Bolo can be implemented by grabbing the bolo, swinging it around the Cursor, and then letting go. Whatever direction the bolo was traveling when it was let go, it the direction it will travel.

A Crossbow can be implemented like a regular trigger fired weapon. A cross bow can be loaded by grabbing the crossbow string or cross bow bolt and pulling it back to a locked position, while feeling the increasing tension of it being pulled back.

Jousting can be implemented by holding onto a jousting pole with the Cursor. The weight of the pole can be felt through the Cursor's interactions with the pole. Based on the Cursor's movements the jousting pole can be aimed at a target, such as an opposing rider or an enemy. The aiming and control of the jousting pole can be made more difficult based on forces applied to it from the running of a horse a User is sitting on. For example, the jousting pole aim might be controlled by movements of the Cursor in the X and Y axes, and the horses gallop might give a rhythmic force in the negative Y direction on the jousting pole, that a User would have to compensate for. Then, when the jousting pole smashes into something, the majority of the force would be along the Z axis.

Spellcasting.

In video games and other computer applications that simulate magical spellcasting, there is a need to allow the computer User to actually feel a representation of the conjuring experience. This haptic experience of spellcasting can enable the User to more realistically control a virtual object or Character, can give a simulation a greater intensity or requirement of skill, and can make game-play more enjoyable. There are a number of applications, simulations, and games that simulate spellcasting including those that utilize wands, familiars, powders, charms, incantations, books, scrolls, portions, symbols, utterances, sacrifices, hand movements, channeling, crystals, bones, cards, magic spheres, shapes, palm reading, possession, and any other objects, processes, or materials that can create magic results. Spells that can be simulated include weather control; summoning animals or other creatures; ice, fire, acid, and gas spells; shock or lightning spells; creating light; bringing darkness; healing; pain-causing; silencing; slowing; speeding-up; disintegration; telekinesis; levitate; fly; capture; charm; control; causing sleep; metamorphosis; causing death; unlocking; causing fear; regenerative spells; and any other magical result of an action. The sensation of casting a spell can be applied in several ways even within a specific game. For example, in a wizarding application, there is a need to simulate different types of spellcasting when healing, when levitating an enemy to render it helpless, when conjuring a tornado, and when summoning an animal companion.

Previously, the act of spellcasting was simulated by pressing buttons and/or moving joysticks using video game controllers. These types of interactions focus almost solely on the timing of game controller interactions and often provide the User only visual feedback. Although the timing of movements involves learning and can give a basic sense of the task, the lack of haptic feedback and the limited control buttons and joysticks offer limits the realism and more complex learning that this operation can have with 3D force feedback interactions.

Any of the methods, processes, actions or forces related to casting a spell can be applied to any other section of this document. An action used to create a spell can be used to produce an event unrelated to casting a spell. For example, casting a spell to shoot out an oscillating energy wave with a sinusoidal force response can be applied to shooting a grappling hook out of a gun in a different application with the same action and force response as the energy spell. In addition, any of the actions, methods, and forces described in other sections can be applied to casting a spell. For example, forces and actions described for shooting a gun can be applied to casting a projectile spell.

Casting a spell can comprise several processes or a combination of actions. The actions can include selecting or indicating a spell or spells to cast, performing an action to cast the spell, controlling the spell while casting, and the effect of the spell after casting. The actions mentioned above can be in any order, and any of the actions can be left out of a spellcasting process. Each of the above spellcasting stages can have, but are not required to have, associated forces that are presented to a User through a Device. The forces relating to a spell being cast can be created using any of the force methods described in this document, for example the use of Force Functions as described in the Tools section, and forces described in the Touching Objects section.

Forces can be added to any spellcasting capabilities of a Super Hero, Villain, Magician, Sorcerer, Mythological creature, god, or any other Character with spellcasting capabilities found in literature, existing video games, movies, or any other type of medium.

A User can interact with an Event Object EO as described above in the tools section to create, perform, indicate or control any spell, combination of spells, or any aspect associated with spellcasting. Each aspect or process of casting a spell can have a separate EO to interact with. For example, selection of a fireball spell can be accomplished by pressing through a wall of a haptic cube EO. The casting of the fireball can be accomplished interacting with a pattern EO by performing a circular motion pattern. A moving weight force to produce a shaking effect can be added to make the control of aiming the fireball more difficult. The final impact or result of the fireball can be felt by the User upon delivery and upon contact with a target with a force function to represent a rumbling, collision, or other intended force effect.

User inputs can be combined to control, alter, or otherwise change the results of any aspect of casting a spell. For example, interactions with an EO can be combined with external inputs from a peripheral Device through buttons, triggers, joysticks, or any other input. A User can complete patterns while simultaneously performing another type of input such as holding a button. For example, a circular pattern can caste a freeze spell, while a circular pattern while holding a button can cast a more powerful exploding freeze spell.

Patterns performed with respect to an EO can be related to or imply a resulting effect. For example, a zig-zag pattern can result in casting a lightning bolt spell, a circular patter for casting a snowball spell, or a more complex shape such as tracing the outline of a horse shape can turn an object into a horse. Examples of these are illustrated in FIG. 35.

Spells can be organized into tables, trees, or any other type of hierarchy as described above in the Tools section. Certain types of motions, movements, or patterns can be used to differentiate between families or types of spells. For example, all motions performed left to right can be used to create defensive spells, while motions performed right to left can be used to create offensive spells. Individual patterns can then be created such that they meet the requirements of a related group.

The type of motion of a Cursor, Character, Device, or object and the resulting patterns used to define, create, and control spells can be of any shape, type or form. Some examples of possible curves or patterns include linear, circular, square, elliptical, limited to a plane, patterns with varying depth such as a corkscrew motion, tracing shapes, and depth independent movements. Motion properties can be based on other criteria such as velocity, acceleration, time, force. A more detailed description of possible movements can be found above in the User inputs portion of the Tools section.

Any component of casting a spell can be performed while, and influenced by performing any other action or motion including interactions with other objects such as a BO, CLO, EO, or HO. For example, an enemy hold spell can be cast while running, but the act of running might make the spell more difficult to cast. Forces associated with the running action itself can make casting more difficult, or additional forces can be added to make the casting process, control, accuracy or any aspect to a spellcasting process more or less difficult. As an example of added forces, impulse, sinusoidal, or random forces can make an action more difficult, while spring forces can be used to pull a Cursor, Character, or object to a specified location or orientation to help make an action easier.

A User can interact with a Device or other type of input to choose, select, define, or otherwise determine a spell or combination of spells to cast. The act of selecting a task can have an associated force presented to the User by a Device, a graphical representation, auditory feedback, or any combination of feedback sensations.

A User can select a spell to cast by performing a specified input or combination of inputs with a peripheral input Device such as a mouse, keyboard, button, joystick, or any other input. For example, pressing the 'A' button on a keyboard can select a specific attack spell or a general category of spells, while pressing the 'D' button can select a specific defense spell, or category of defense spells. Once a spell is selected with an external input, the User can feel a force as an indicator that the spell has been selected. The force felt might be consistent across all spells, or might vary between spells. For example, if a User presses the spacebar on a keyboard to select a shield spell, a small impulse force can urge the Device toward the User as an indicator of the defensive nature of the spell.

A User can select a spell to cast from a list, tray, group of icons, grouping, or from any other graphical representation of a spell or group of spells by using a Device to control a Cursor or object to select the spell. Interaction with the spell selection tool can provide force feedback to a User. For example, a User can see a graphical User interface (GUI) consisting of ten different spellcasting icons, where each icon is a haptic button, or a button that can be controlled through some other User input. A User can press a Cursor against one of the icons to feel a spring resistance while pressing the button. Once the button has moved a far enough distance, or a large enough force has been applied, the spell is selected.

The number of known spells to a User can vary over time. The number of spells available or recognizable interactions with an EO can be related to the level, type, origin, strength, experience, repetition of a spell, or any other characteristics or properties of a Character of object. For example, a new Character might start out only capable of casting a single levitate spell. As the Character increases experience to higher levels or practices the initial levitate spell, new spells can be learned over time to add new capabilities or increase the capabilities of a spell.

A User can interact with a Device or other type of input to perform an act of casting a spell. Any of the forces and methods described above for interaction with spells with the use of an EO and for selecting a spell can be applied to casting a spell. Similarly, the descriptions for casting a spell can be applied to any other aspect of spellcasting.

Spells can be combined to produce additional effects, or restrictions can be imposed to prevent spells from being combined. For example, a circular pattern might create a protective fire ring, while a circular pattern followed by a motion along the Z axis might produce a protective fire ring that explodes to cause damage as well. A 'V' motion might signify a healing spell, and a User might try to combine the 'V' pattern with a circular pattern to produce a fire ring. In this situation, a restriction can be used to prevent either spell from activating if a heal spell cannot be combined with a fire spell.

Spells can be cast with full, partial, or no success as described above in the Tools section with regard to EO interaction. If a spell is cast incorrectly resulting in partial success, the resulting effect of the spell can affect the power, distance, range, accuracy, force response, or any other characteristic of the spell. For example, a square pattern can create a strong laser beam spell aimed directly at a target. If a User attempts to create a square, but one of the sides is curved, the laser beam can be reduced in power, provide a force with a lesser magnitude to the User, and alter the aim of the laser in the direction of, and proportional to the curved error portion of the square pattern.

The allowable error range for completing a spell can be altered to change the difficulty of casting the spell. For example, a spell might have a requirement to complete a pattern under a certain amount of time. The allowable amount of time can be increased to make casting easier, or decreased to make casting more difficult.

A User can move or manipulate objects as a means of casting a spell. This type of spellcasting interaction can involve arranging or moving objects such as blocks, disks, tarot cards, bones, rocks, dice, objects with magical properties, or any other physical objects. For example, a User can roll a pair of haptic dice, where the dice have weight when held and provide contact forces for collisions between the dice or with other objects. The resulting value, position, or orientation of the dice can result in a specific action, event, or spell to be cast. For example, rolling snake eyes, or two single ones with two dice can result in a nuclear explosion spell.

The start of a spell can be indicated by an event or input, or by completion of a pattern. A separate event, input, or action can cancel or stop a spell that has been started. For example, when the Device starts moving, an algorithm can compare the motion to look for a pattern. If the Device stops moving, or if the velocity of the Device remains under a threshold value for a period of time, the action of looking for a spell can be reset. Upon moving the Device again, the algorithm begins looking for a new recognizable pattern. Or, for example, an external input such as a button press can be used to indicate the start of a spell. If a spell has been started, and the button is pressed, the spell can reset to restart the spell or start a new spell.

A User can interact with a Device or other type of input to control a spell when it is cast. The User can have control over the speed, damage, force, direction, accuracy, range, or any other characteristic or property of the spell. Any of the forces and methods described above for interaction with spells can be applied to controlling a cast spell. Similarly, the concepts described for controlling a spell can be applied to any other aspect of spellcasting.

Forces can be used to aid, hinder, or indicate the control of a spell before, during, and after it has been cast. As an example, as a spell is being aimed at a target a constant force can be used to indicate the spell is ready to be cast. A force toward or away from the User, Cursor, or Character can indicate there is built up energy that must be released in the form of the effect of the cast spell. As another example, to aid a User when casting a spell toward a highlighted or selected target, spring forces or other forces can be used to pull the Cursor, Character, or object such that the resulting spell will be aligned with and hit the intended target.

Figure 36:
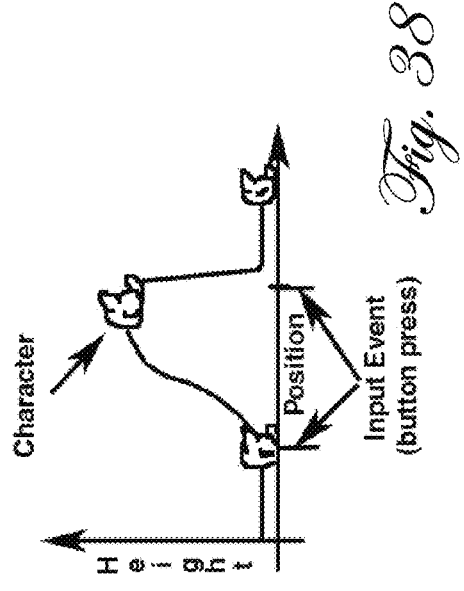
FIG. 36 is a schematic illustration of an implementation of a spell-casting interaction.

A separate action or input can be utilized to activate, propel, or otherwise control a spell after it has been cast. For example, a circular pattern can initiate the casting of a lightning spell. The User can then aim the spell followed by a movement of the Cursor in the −Z direction to control the propulsion of the lightning bolt, as illustrated in FIG. 36.

A spell can gain energy before it is cast. For example, when casting a lightning bolt spell, the time between when the spell is cast and the time at which the lightning bolt is propelled forward, any force felt by the User can be increased in magnitude and frequency as time increases. The increased forces can indicate an increase in the resulting power of the spell's impact or any other characteristic of the spell.

The velocity, acceleration, force, or any other motion property of a Device, Cursor, or Character can control the resulting characteristics of a spell that is cast. For example, when casting a healing spell with a haptic cube EO, increasing the force applied to the EO can enhance the resulting effect of the heal. Minimum thresholds can be used to control a spell. For example if too much force is applied or the Cursor moves too quickly the spell will not cast. One use for this method is to emphasize User control of a Device or Cursor to cast spells.

Forces felt by the User while controlling a spell can be related to spell or motion of the spell effect. For example, a spell that shoots out a slithering worm can result in a sinusoidal force applied to the Device to simulate the wiggling of the worm as it travels away from the Cursor or Character.

Graphical cues can be used to help guide or aim a spell. Graphical cues can include cross hairs, lines that travel from the point of origin to the intended target, a dot such as a laser scope, a highlighted target, or any other means of indicating to a User the destination, location, or impact area of a spell. For example, when casting a head shrinking spell with a wand, a wavy trail of mist can extend from the tip of the wand out into space relatively parallel to the shaft of the wand. A User can then move the wand to change the trajectory of the mist trail. The goal for the spell might be to move the wand such that the mist intercepts the head of another Character to activate and complete the head shrinking action.

Casting a spell can allow a User to have control of another object, Character, or Cursor. For example, a levitation spell can allow a User to pick up a boulder and feel the weight, texture, or any other properties associated with the item under control.

The motion of a Device or Cursor while casting a spell can control the direction of spell as it is cast. Limitations can then be put on the spell to change the difficulty of casting a spell at a desired target. For example, a constraint can be implemented such that no matter how the Device is oriented, or no matter what direction a spell is cast, it will always hit the desired target. On the other hand, a constraint can be implemented such that the orientation of the Device, and the target positioning (such as crosshairs) must be exactly on a target for the spell to hit the target.

A User can interact with a Device or other type of input to alter, change, or control the final effect of a spell after it is cast. A User might be able to see, feel, and hear the final impact or result of a spell. Any of the forces and methods described above for interaction with spells can be applied to feeling or altering the effect of a spell. Similarly, the concepts described for the effects of spells can be applied to any other aspect of spellcasting.

The magnitude of the forces related to any aspect of casting a spell can be related or proportional to the type of spell or the characteristics of a Character or object. For example a more powerful spell that produces more damage can result in higher magnitude forces presented to a User. In addition, as a Character advances in an application and becomes more powerful, the resulting forces felt by a User can be increased to reflect the additional power of the Character.

Specific types of forces or force functions can be associated with certain types of spells or families of spells. For example, all fire related spells can have a rumbling, vibration force to indicate the family to simulate a burning effect. The forces can be related or unrelated to the type of spell, family, or effect. A related force can be a vibration force for shocking or stun spells or a weight rotating around a Cursor for a whirlwind force effect. A force unrelated to the spell can be increased viscous Character motion resulting from casting heal spells.

A spell can be cast such that the effect remains on for an extended period of time or stays on until the spell is manually turned off. A force indicator can be used as an indicator to the User that such a spell is currently on. The force indicator can vary depending on the type, power, or any other characteristic of the active spell. For example, a self healing spell can be cast such that while the spell is activated, a small uplifting impulse force in the Y direction can be exerted every few seconds to indicate to the User that the spell active.

A Cursor, Character, or object can be hit or affected by a spell such that the User feels the result of the spell. The resulting force response can be equivalent, similar, or related to the sensations of being hit as described above. The following examples are intended to provide examples of the entire process of casting a spell with resulting forces. The examples are in no way limiting to the extent, capabilities, process, or force responses a User can experience when casting spells.

Figure 37:
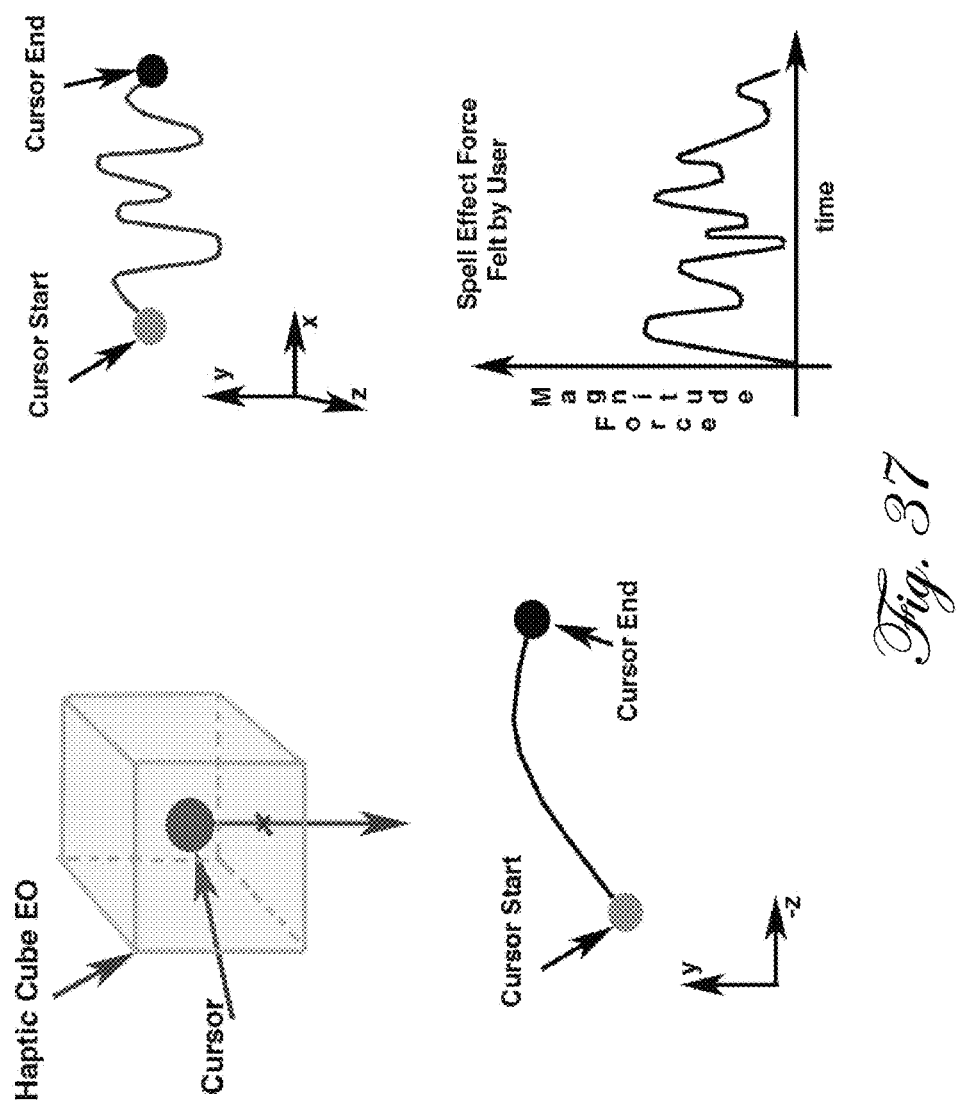
FIG. 37 is a schematic illustration of an implementation of a spell-casting interaction.

Example: A magician Character can choose to select an earthquake spell to attack a castle by first pressing through the bottom wall of a haptic cube EO to feel an impulse force pop when breaking through the wall to select an Earth spell category. With the Earth spell category selected, the User can create a left to right sinusoidal pattern with the Device to initiate a shaking earthquake spell. The User can then direct the earthquake to a desired location with an upward arching, or throwing motion that has a resistive weight force during the throwing motion. The User can control the direction of the throwing action by moving the Device in a desired direction, and the harder the User throws the spell, the further away from the Character the resulting earthquake destruction will occur. After throwing and controlling the landing location of the earthquake, a sinusoidal Force Function with varying magnitude and frequency can be used to simulate the shaking and rumbling of the earthquake, as illustrated in FIG. 37.

Figure 38:
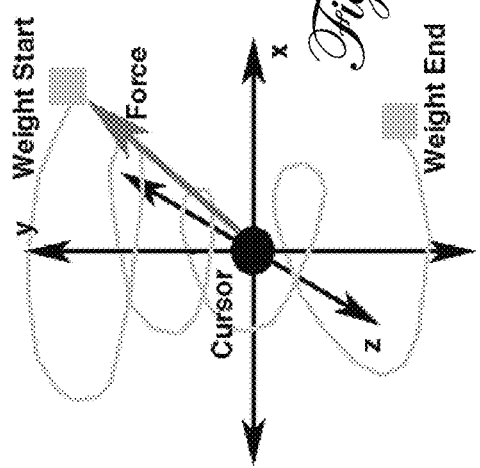
FIG. 38 is a schematic illustration of an implementation of a flying interaction.

Example: A Super Hero can cast a flying spell by pressing a button connected to a Device. Pressing the button selects the fly spell that is linked specifically to that button press. Upon pressing the button, the Character can jump into the air with resulting forces as described in the Jumping section, as illustrated in FIG. 38. Once in the air and flying, forces can be applied as described in the Flying section as well as wind forces as described above in the weather portion of the Being Hit section. To discontinue the flying motion, the User can press the same button used to start flying in order to stop flying.

Figure 39:
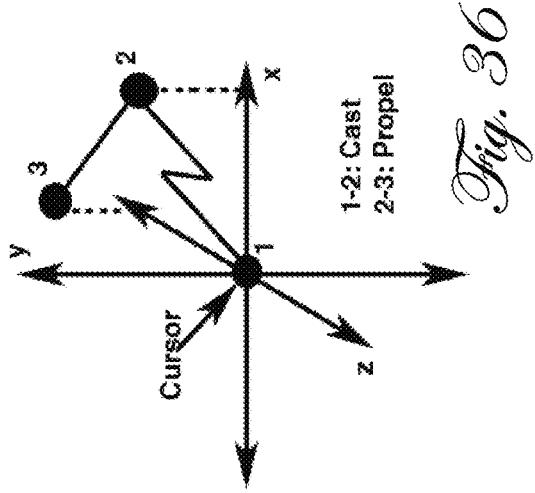
FIG. 39 is a schematic illustration of an implementation of a spell-casting interaction.

Example: A User can elect to have a leprechaun Character cast a defensive spell by pressing the 'D' key on a keyboard. After pressing the key, the User can create a circular pattern on the Y-Z plane followed by a circular pattern on the X-Z plane to cast a protective bubble shield around the Character. Upon starting the second circle on the X-Z plane, a viscous force can be added, and can increase in magnitude with the advancement of the circular motion, to resist the movement of the Cursor in completing the circle to simulate the building up of the resistive shield, as illustrated in FIG. 39. Upon completing the second circle to complete the bubble casting, a centering force as described in the modifier section can be used to provide an uplifting, and strengthened sensation of being in a newly protected state.

Throwing.

In video games and other computer applications that simulate throwing—such as propelling an object in an intended direction using a limb—there is a need to allow the computer User to actually feel a representation of the throwing process. This haptic experience of throwing can enable the User to more realistically control a virtual object or Character, can give a simulation a greater intensity or requirement of skill, and can make game-play more enjoyable. There are a number of applications, simulations, and games that simulate throwing, including overhand throwing (football, water polo, Quidditch, knife or axe throwing, javelin, darts, etc), sideways throwing (baseball, skipping stones, etc), underhand throwing (softball, egg toss, bowling, rugby, skeetball, horseshoes etc.), heaving (throwing a heavy boulder, log toss in celtic games, pushing another Character into the air, soccer throw-in, fish toss etc), overhand pushing (basketball, throwing something onto a roof, shotput, etc.), spinning and throwing (hammer throw, bolo, lasso, discus, etc), cross body throwing (frisbee, ring toss, etc), mechanical throwing (atlatl, lacrosse, fishing cast etc), dropping an object (tossing an object down to another person, jacks, etc), flipping an object off a finger (marbles, flipping a coin etc), and skilled tossing (juggling, baton twirling, etc).

Previously, the act of throwing was simulated by pressing buttons and/or moving joysticks using video game controllers. These types of interactions focus almost solely on the timing of game controller interactions and often provide the User only visual feedback. Although the timing of movements involves learning and can give a basic sense of the task, the lack of haptic feedback and the limited control buttons and joysticks offer limits the realism and more complex learning that this operation can have with 3D force feedback interactions.

An interface in many games must provide the user with a method of indicating discharge of an object, for example release of a thrown ball. Conventional game interfaces use buttons or switches—unrelated to usual methods of releasing objects and consequently not a very realistic interface effect. In the real world, objects are thrown by imparting sufficient momentum to them. A haptic interface can accommodate interaction that allows intuitive release.

One or more force membranes can be presented to the user, where a force membrane is a region of the haptic space accessible by the user that imposes a force opposing motion toward the membrane as the user approaches the membrane. For example, a membrane placed in the direction of the intended target can discourage the user from releasing the object accidentally, but can allow intentional release by application of sufficient force by the user to exceed the membrane's threshold. As another example, consider a user throwing a football. The user brings the haptic interaction device back (as if to cock the arm back to throw) past a membrane, then pushes it forward (feeling the weight and drag of the football haptically), and if the user pushes the football forward fast enough to give it the required momentum, the football is thrown. Motion of the object in a throwing direction can be accompanied by a combination of dynamics forces and viscosity to guide the users movement. These forces can make directing the object thrown much easier. The forces related to the membrane can drop abruptly when the object is thrown, or can be decreased over time, depending on the desired interface characteristics. As examples, such a release mechanism can be used to throw balls or other objects (e.g., by pushing the object forward through a force barrier disposed between the user location and the target), to drop objects (e.g., by pushing the object downward through a force barrier between the user location and the floor), and to discharge weapons or blows (e.g., by pushing a representation of a weapon or character portion through a force barrier between the weapon or character portion and the target).

Other triggers can be used to effect release of the object. As an example, a membrane can apply an increasing force, and the object released when the user-applied force reaches a certain relation to the membrane's force (e.g., equals the maximum force, or is double the present force). Release can also be triggered by gesture recognition: a hand moving forward rapidly, then quickly slowing, can indicate a desired throw.

The direction of the object can be determined in various ways, some of which are discussed in more detail elsewhere in this document. As examples: the position, at release, pre-release, or both, can be used to set direction; the object can be modeled as attached by a spring to the cursor, and the direction of throw determined from the relative positions. A visual indication can be combined with the haptic information to indicate status of the release; for example, an image of an arm about to throw can be displayed in connection with the image of the ball when the ball is ready to be thrown (pulled through the first membrane in the previous example). A haptic cue can also be used, for example a vibration in the device or perceptible bump in its motion.

Touching.

In video games and other computer applications that simulate touching an object there is a need to allow the computer User to actually feel the object, to give the User a truer sense of the object. This haptic experience of touching an object can enable the User to more realistically control a virtual object or Character, can give a simulation a greater intensity or requirement of skill, and can make game-play more realistic or enjoyable. There are a number of applications, simulations, and games that simulate touching, including petting; testing a surface integrity; massage; keyboarding; tapping; dialing; poking; tickling; caressing; feeling for a change in texture; wiping; polishing; cleaning; buffing; dusting; applying and removing wax; washing; drying; and any other use of touch. The sensation of touching can be experienced in several ways even within a specific game. For example, in a skateboarding game, there is a need for different types of gripping or holding when lifting the skateboard during an aerial maneuver, gripping a car bumper while being towed on a city street, and when grabbing a light post in order to swing around in a circle.

Holding can be considered as related to touching. There are a number of applications, simulations, and games that simulate holding or carrying an object, including football; basketball; volleyball; baseball; bowling; tennis; racquetball; bocce ball; lawn bowling; horseshoes; gymnastics events such as parallel bars, rings, rhythm gymnastics, and baton twirling; holding onto moving objects such as trains, cars, horses or other animals, buses; dragging items such as incapacitated bodies; buttoning; snapping; using tools such as a wrench, crowbar, hammer, or screwdriver; track and field events like discus, pole vault, or hammer throw; cooking tasks such as stirring, pouring, and shaking; using a whip, cape, or other rippling item; hooking a fish or the edge of a cliff using a barbed or suction Device; or any other depiction of holding an object.

Building can also be considered as related to touching. There are a number of applications, simulations, and games that require the ability to build or construct including the creation of physical structures like buildings, houses, dens, huts, stadiums, centers, monuments, churches, or temples; the creation of geographical landmarks such as mountains, hills, mesas, plains, peninsulas, islands, and glaciers; the creation of infrastructure such as roads, tracks, trails, pipeline, cable lines, and sidewalks; the creation of aesthetic landmarks such as fountains, façades, statues, parks, and sculptures; the creation of hand-made items such as sand castles or configurations of toy blocks or other shapes; the solving of puzzles that require building or stacking; the casting of spells or using non-physical means to assemble a magical or physical manifestation; large- or small-scale building; the assembly of minute pieces, parts, electronics, or machinery into an intact whole; or any other action that involves building. The sensation of building can be applied in several ways even within a specific game. For example, in a fantasy adventure game in which the User must build a military force, there is a need for different types of building when the barbarian of the party must stack crates in order to build a means of scaling a wall, when the wizard of the party must erect an enchanted wall to repel attackers, when the thief of the party must solve a puzzle that involves properly assembling scattered pieces into a functional whole, and when the User must create structures to house their developing army.

Sculpting can also be considered as related to touching. There are a number of applications, simulations, and games that simulate sculpting including those that utilize chisels, knives, drills, razors, clippers, jackhammers, oil rigs, lasers, high-pressure water cannons, scalpels, blades, back hoes, bulldozers, sandblasters, shovels, picks, axes, post-hole diggers, awls, hoes, hammers, ice cream scoops, scrapers, fine instruments like toothpicks, or body parts such as hands and fingers, and any other objects, processes, or materials that can remove material from objects or surfaces in order to achieve an intended design. Surfaces which can be sculpted include rock, marble, sand, dirt, stone, wood, plastic, toothmaterial, bone, ivory, metal, clay, mud, turf, grass, soil, flesh, hair, fur, or any other surface.

Painting can also be considered as related to touching. There are a number of applications, simulations, and games that simulate painting or writing including those that utilize pens, pencils, chisels, spray cans, splatter techniques such as throwing paint, paintbrushes, paint knives, sand painting, blades, rocks, charcoal, marking with alternative substances such as blood, negative marks in condensation or steam, pastels, oil paints, rollers, tattoo needles, crayons, markers, colored pencils, highlighters, watercolors, chalk, ink, calligraphy instruments, etching tools, scrapers, hand painting, finger painting or marking, and any other objects, processes, or materials that can create intentional marks on surfaces or objects. Surfaces on which the markings are made can include paper, parchment, scrolls, papyrus, books, magazines, brochures, leaflets, pamphlets, newsletters, newspapers, fliers, handouts, announcements, invitations, greeting cards, post cards, advertisements, letters, envelopes, blackboards, pavement, asphalt, skin, canvas, walls, streets, billboards, windows, floors, rocks, trees, wood, stone, metal, cardboard, plastic, dirt, sand, or any other surface.

Biting can also be considered as related to touching. There are a number of applications, simulations, and games that simulate the use of teeth or jaws including eating; using teeth as a tool to sever material; and those which require the User to control virtual animals or monsters such as vampires or werewolves.

Cutting can also be considered as related to touching. There are a number of applications, simulations, and games that simulate cutting including using a sword, axe, hand saw, chain saw, circular saw, table saw, band saw, jig saw, scythe, cleaver, knife, dagger, saber, scimitar, pike, spear, throwing star, sai, samurai sword, kitana blade, bowie knife, hunting knife, jackknife, switchblade, butterfly knife, arrow, paper cutter, clippers, borer, scissors, loppers, lawnmower, weedwhacker, awl, bladed boomerang, throwing knife, hatchet, laser or cutting beam, light saber, fingernails, teeth, claws, horns, spikes, prongs, barbs, needle, scalpel, razor, battle axe, magical or summoned blades, long sword, broad sword, short sword, two-handed sword, foil, crossbow bolt, bayonet, or the use of any blade, puncturing projectile, or sharp edge with or without serrations. These simulations might include fighting or combat games; adventure games; survival horror games; sports games; cooking, medical, and construction simulations; action games; fantasy games; role-playing games; first- or third-person titles.

Previously, touching interactions were simulated primarily in the visual realm: A Character or virtual object reacts graphically as though it is touching or being touched. This approach is limited in that it relies solely on visualization to achieve what is fundamentally an experiential and physical sensation. The realism is severely limited by a traditional controller's lack of 3D force feedback interactions.

A Haptic Device can be used to control a Character's or User's hands, a generic Cursor, or anything else that gives a User a sense of touch. When a Device is used to control a Character's hands (or some part of a Character that has a limited reach) the Device's movements can be constrained by forces to match the constraints that the Cursor or Character has. For example, if a Device is moved forwards to control a hand that moves forwards, when the hand is at the limit of its reach, forces can be applied to the Device to keep it from moving further forward. The Device can control the interactions in the ways that are described herein for controlling a Cursor.

Objects can be touched with a Cursor. Objects can have variable stiffnesses, textures, dynamics, surface representations, etc. The graphical and sound representations of the Cursor do not have to be the same as the haptic representation of the Cursor, in terms of scale, size, direction, position, velocity, or any other aspect that defines the Cursor. The graphical representation of a Cursor or object can change with respect to the haptic representation of the Cursor or object to make a task easier for a User.

When the User is controlling a Cursor to touch an object, the haptic representation of the Cursor or the object can be bigger than the graphic representation making it easier to touch the object, but making is seem visually consistent or different to the User. For example, a spherical Cursor might have a graphic radius of 5 inches, and a haptic radius of 5 inches. Alternatively, the same Cursor within the same environment might have a graphic radius of 5 inches and a haptic radius of 10 inches, effectively making it easier to touch virtual objects. Other aspects of the graphical representations can also be adjusted to make objects look like they are touching at the right time. For example, the relatively positions of two objects can be adjusted to that there graphic representations are touching when their haptic representations are touching.

Various representations of a surface can be implemented including any mathematical representation of a surface or solid. While touching an object that is moving, the change in forces that occur from the object's movement can be felt so that the User feels that the object is moving. For example, if a User is touching a block on the right side, and the block moves to the right, then the force would increase and would push the Cursor.

Touching can actively interact with a dynamic object and affect its dynamic simulation, or can passively interact with a dynamic object and not influence how it moves. For example, a Cursor might pick a ball up with a spring and swing the ball around letting the User feel the weight, inertia, momentum, etc. of the ball. Alternatively, an object might move in a prerecorded movement, and the Cursor might feel its movement without being able to affect that movement. The Cursor does not have to be shown when it is touching an object. A Cursor can be attached to an object to feel its movement.

Videos can be used with a Haptic Device to give a User a feeling of touch within a non-rendered graphical environment. The movement of a video, where the objects in the video are not modeled, can be felt by a Cursor that touches an object that moves in a way that corresponds to the video. For example, in a movie or video of a ball moving, a point can be modeled to move in space in a way that resembles how it looks to move in the movie or video. The Cursor can then be attached to that point. Movements of the Cursor might then affect how a video is played, such as the speed of the video, which clip in a series of clips is played, or how the camera view of the video (i.e. real time pans) is adjusted. The speed of a video, for example, can be adjusted between a minimum and maximum rate based on the interactions of the Cursor.

Virtual objects can be combined with videos so that they appear to be in the same environment. A Z depth (i.e. a representation of depth) of video objects and boundaries of those objects can be determined so that virtual objects can appear to be in front of or behind virtual objects that are rendered. A movement or interaction with a virtual object might trigger a specific following interaction with a video clip. For example, if a User picks up a virtual modeled object starting an action, then a video clip can then be played showing the result of beginning that action. A User can pick up an object to put it away. The object can start as a virtual object actively interacted with shown within a video background. When the object is picked up, then the video view can change to a passive view of the object being put away on a shelf, and the User would feel the object being put away.

A virtual object can be picked up and can adjust how a video is shown. For example a virtual bottle of liquid can be poured on a video object. The liquid can be modeled to appear to move over the video object, and can make it look different. If the liquid, for example is paint, then the video object can change color.

A virtual object can be made to look to go inside a video object. For example, if a plug is inserted into a wall, where the plug is a virtual object, and the wall is a video object, the plug can be rendered so that any part of it that is within the wall is not shown, creating the illusion of being inserted into the wall.

A surface of a video object can be represented by a matching surface of an invisible haptic object. The Cursor can touch the haptic representation of the video object. The graphic representation of the Cursor can be adjusted in size, scale, and position, to look like it is touching the video image of the object as the haptic versions of the objects touch. If the object moves in the video, the haptic representation of the object can be animated to match the video's movement.

Interactions between the haptic representation of an object and a Cursor can modify the video representations of the object. For example, if the Cursor deforms the haptic representation of a video object, then the video can be modified so that it looks like it is being deformed.

A User can control a virtual hand or arm that appears to come into the screen, creating a view of the virtual arms and hands similar to our real life view of our real life arms and hands. The Device's movements can control the hands within the limits of where these virtual hands can move. As the virtual hand touches something, or feels a force, those forces are presented to the User through the Device.

While touching objects, forces can be applied to a Cursor to help indicate to a User what to do. For example, if there is a desired type of place to touch something (for selecting, positioning, or some other type of interaction) the Cursor might feel a force pulling it to the right spot, a haptic snap-to point. The Cursor can also be pulled to a starting location for an interaction that makes the interaction easier or better within a Device's workspace.

Textures on a surface can be implemented in a number of ways. Examples are described below. Textures can be implemented when moving across a surface or when moving inside an object.

Example: Surface textures can be implemented by determining the tangential direction of movement across a surface and applying forces along or against that tangential direction of movement.

Example: Friction can be created based on a standard stick-slip representation of friction, where the Cursor has a coefficient of friction resisting movement while moving, and a coefficient of friction resisting movement while stationary. These coefficients of friction can control the amount of resistance to movement. The resistance to movement can be implemented by creating a damping force (i.e. a force that is proportional to movement speed) that might or might not have a maximum force. The amount of friction can be modified by how hard a Cursor pushes against an object.

Example: Friction can be implemented by a simulation of one type of material against another type of material.

Example: Textures can be implemented by creating variations of a surface representing the texture. The surface representation for haptics does not have to be the same representation used by the graphics. For example, a cobblestone texture can be implemented by created a model of cobblestones on a surface. A Sandpaper texture can be created by creating a model of tiny bits of sand on a surface. Alternatively, the forces on a surface can be randomized and created as a Cursor moves across a surface. For example, sandpaper can also be implemented by creating variations in forces against the movement of the Cursor across the surface of an object. The Cursor feeling the same spot twice would not feel the exact same texture, but the User would feel sandpaper in both cases.

Example: Textures can be created by varying the force against or with the direction of movement based on a calculated height of a surface. For example, a bumpy surface can be implemented on a XZ plane, with forces only in the X and Z directions. Alternatively, forces can be created by adjusting the Y forces on an XZ plane based on a calculated height of a surface. The height of a surface can be calculated directly from a model of the surface, or from a random process in which the height changes based on movement.

Example: Textures can be created by utilizing a Texture Object (TO). A TO can connect to the Cursor with a spring, or through some other type of connection mechanism. A TO can interact with a surface in any of the ways described above for creating textures. Forces applied to the Cursor would then be applied through the connection between the TO and the Cursor. A TO can be a representation of a stick touching a surface, where the stick bends a certain amount based on the interactions with the surface. A TO can comprise a weight attached to the Cursor. The forces utilized in creating a texture can be limited to the component of the vector from the Cursor to the TO that is tangential to the surface of the object.

Example: A TO can suddenly change position with respect to the Cursor to give various effects in textures. For example as a Cursor pulls a weight through an object, the TO can repeated disappear and reappear closer to the Cursor based on a force on a spring between the Cursor and the TO.

Example: A TO can vary properties based on the material properties, on or in, an object. For example, as a texture is being simulated, its mass might change, the spring constant connecting it to the Cursor might change, the effect of gravity on it might change, other outside forces might be applied to it, or any other property of it can be changed.

Example: The relative movements of a TO and an object can be used to create a texture. This is true whether the relative movement is from the Cursor's movement, the object's movement, or both, or neither (i.e. the feel of the texture comes only from the movement of the TO, and not the Cursor or the object).

Manipulating.

Objects can be held and interacted with, and can be manipulated. In all of the following descriptions of manipulating, some of the aspects of manipulating can be implemented through User control, some can happen automatically, or any combination of the two. Where it is not specifically called out, simulations or interactions with objects used in examples can be computer simulations. Many descriptions of specific types of manipulations are described, but any type of manipulation done in real life can be implemented with a Haptic Device by modeling the forces involved in the manipulation, and applying those forces to the Device and User through the interactions with the objects involved and a Cursor.

After an object is touched or selected, a User can determine that the object should be held. This can be accomplished automatically (for example, an object can be automatically grabbed, when it is touched) or the object can be held or grabbed based on a User input such as a button press, a switch press, a voice input, a gesture that is recognized, or some other type of User input. When an object is held, it can have dynamics properties such as weight, inertia, momentum, or any other physical property. It can be implemented as a weight, and a User can feel the weight and reaction forces as it is moved.

Objects that are held can have interactions with the environment. For example, a heavy object might need to be dragged across a virtual ground if it is too heavy to be picked up by the Character. In this case, as in real life, the User can feel the weight of the object, but that weight can be less than if the object was not touching the ground. As it is dragged across the ground, forces can be applied to the Cursor or object representing the friction or resistance of the object as it moves across the ground, bumps into things, or snags or gets caught on other virtual objects.

Objects that are held can also have forces applied to them (or directly to the Cursor) based on other virtual objects that interact with the object that is held. For example, a User might feed a virtual animal. As an apple is picked up the User might feel the weight of the apple, then, when a virtual horse bites the apple, the User can feel the apple being pulled and pushed, and the weight can be adjusted to reflect the material removed by the bite.

Objects can be rotated while they are held. To rotate an object, a User can rotate the handle of the Device, or can modify the position of the Device so that the rotation of the object occurs based on a change in position of the Cursor.

Objects that are held can have other haptic characteristics, such as those described below.

A User can hold an object that is spinning and feel the resulting forces. For example, a virtual gyroscope can create directional forces that the User would feel.

A User can feel the acceleration of an object being held. For example, if a User holds a virtual firehose, the User might feel the force pushing back from the direction that firehose is spraying based on how much water is coming out, how close another virtual object is that is being sprayed, how tightly the hose is being held, how much pressure there is in the spraying, or other aspects of the simulation of the water being sprayed.

If an object has its own forces, based on its representation, the User can feel them. For example, if a User is holding a popcorn popper, the User can feel the popcorn popping within it. Each individual force of a popcorn popping can be relayed to the User, or the forces can be represented through some other representation (such as a random approximation of forces that a popcorn popper would create).

The forces that a User feels can have any form or representation which can represent any action or event. For example, a User might hold a virtual wand to cast spells. The User can feel any type of force through the wand, which can represent any type of spell.

The User can feel interactions of a virtual held object with another object that hits the object. For example, a User might feel the weight of a baseball bat, and a path constraint of how it can move. Then when the bat hits a baseball, that feeling can be felt by the User through a force applied to the bat or applied directly to the Cursor. If a User is holding onto a matador cape, and a virtual bull runs through the cape, the User would feel the pull of the cape against the Cursor as the bull pulls on the cape. The User might also feel the force adjusted if the cape were to rip, the feeling of the cape being pulled out of the Character's hands, the cape getting caught in the bull's horns and being pulled harder, or any other interaction with the object being held.

A User might hold onto an object that is controlling the Character's movements. For example, the Character might grab onto the bumper of a moving car. Then, the User would feel the pull of the bumper relative to the movement of the Character. The feeling of pull can also be combined with other interactions such as maintaining balance.

A User can feel an object interact with another object that is caught by the object. For example the User can hold a net and catch a fish. The User can feel the forces of the fish flopping within the net either directly through forces applied to the Cursor, or through forces applied to the net through the fish's actions (and therefore applied to the Cursor, through its interaction with the net).

A User can control a held object to interact with an environment. For example, A User can hold onto a fishing pole and swing it forward to cast a line out into a lake. Then a User might feel a tugging force representing a fish nibbling at the hook. The User might pull on the fishing pole to hook the fish, and then feel the weight of the fish along the line added to the weight of the pole as the fish is reeled in.

While an object is held, it can be shaken. A User can feel the changing inertia of an object that is moved back and forth at different rates. A virtual object might have liquid inside it that can be felt by a User through a force representation that varies based on how the liquid moves within the object.

A User might feel an object slipping in his hands. For example, if a User is pulling on a virtual rope, then the User might feel a force as the rope is pulled. Then the User can feel a lesser force if the rope slips through his hands until the rope is grabbed tighter, at which point the rope stops sliding and the User feels a larger force again. The User might also feel force variations representing the texture of an object that is sliding through his hands.

An object that is held can be swung as well. The User can feel the weight of an object, and feel the force of the object change based on the relative positions of the Cursor (to which the object is attached) and the object.

A User can button an object or multiple objects. The User can feel and manipulate the button, the hole the button goes in, or both. As the User moves one of the objects used in buttoning, he can feel the interaction between the button and hole, and the feeling of it moving through the hole. The User can feel when a button is buttoned, and is tightly held in the hole. The User might need to manipulate the button to a specific orientation to be able to move the button into the hole. The User would also be able to feel the cloth of the button pulling on the objects that are held as the button is buttoned. The same type of interaction can be used for snapping two objects together.

A User can open or close objects. For example, a User might pull on a door by grabbing the door handle and rotating it. This can be accomplished by clicking the switch on the handle and rotating the handle of a Device, or by moving the handle of a Device. The User can then pull on the door and feel the movement of the Cursor constrained about the axis of rotation that the door moves around. If the User were to close the door, the User can feel that same movement around the axis of rotation around the door, the additional resistance to movement as the door is about to close, and a click (a sudden change in the force displayed to the User) when the door snaps into place. If a User were to open a virtual lid, the User might grab the lid and pull on it. Then when the force on the lid away from the container were large enough, the User can feel the lid snap away from the container. If a User were to open a virtual chest, the User can feel the weight of the lid in addition to the constraint of the its movement around the axis defined by the hinges of the chest as the lid is pulled open. If the User were to open a virtual soda can, the User can grab the metal opener at the top, pull upwards against it, and feel a click as the metal opener opened the can. Any type of opening action can be done by a User by approximating the forces the real life opening action would entail.

A User can peel an object. For example, a User can peel a banana. The User can grab the top of the banana, pull until a threshold force is reached, at which point the peel can start moving. Then the User can pull the peel downwards, feeling resistance to the peeling action. The User can grab other parts of the peel and pull them down in a similar way.

A User can pour from a virtual object. The User can grab a container, and feel the weight of the container and the contents (whether liquid, solid, or gas). For example, a User can pour a pitcher of lemonade. The User can pick up the pitcher and would feel the weight of the pitcher and the lemonade. The User can also feel the weight of the lemonade shift as the lemonade would move within the container if it is sloshed around or tipped. As the lemonade tips, the User can feel a shift in the center of mass of the liquid, and can also feel less weight as lemonade was poured out.

A User can pry using a virtual object that is held or manipulated. A User can hold onto the object that is prying. He can either position the object or it can be positioned automatically. As the User pushes or pulls on the object, it can move or modify another object depending on the direction of pushing and the lengths of a lever arm representation of the physics of the prying. For example, the User might be able to move a heavy object easily through the User of a lever, that could not be able to be moved without the lever. The length of the lever and the pivot point around which it is rotated can adjust the simulation.

An object can be rolled. For example, a User can push on an object and roll it along the ground. As the User rolls the object, the forces applied to the object from the Cursor can make it move. The User can attach the Cursor to a point on the object to push on it and make it move, in which case the momentum of the object, and its movement along its axis of rotation can be felt by the Cursor, and can pull the Cursor while that point on the object is held. The Cursor can also slide along the surface of the object as it is rolled, feeling both the force pushing the object forward, and the texture of the surface as it slides past the Cursor. Objects can be made to roll faster with more force or more pushing, or can be slowed down and stopped. An object that is not smooth that rolls can have movement that is not smooth, which can be felt by the User through the Cursor's interactions with the object.

A User can push and pull on objects. The force on the object can make it move, roll, slide, tip, fall, lift, or move in any other way. The interactions between the object and its environment can be felt by the Cursor through its interactions with the object. An object that is held or manipulated can be used to stir. For example, a straw can be used to stir a drink. The motion of the fluid and the forces between the straw and the fluid can be modeled. The User can then manipulate the straw to stir the fluid.

An object can be twisted, turned, or rotated. This can be accomplished in many ways. The User can grab a point on the object and rotate it around some type of constraint. For example, an object can be constrained to rotate about a point or about a line that can have any relation to the object. The User can rotate the object by moving the Device, or by rotating the Device or a combination of the two.

A User can hold onto and use tools on other objects. A User can hold onto a wrench handle, and rotate the handle while turning a bolt. The resistance to the rotation can vary depending on how tight the bolt it. A User can hold onto a hammer and smash it into another object such as a nail. As the hammer smashes into the nail, the nail can move slightly with each hit, as the nail is pounded into the wood. The weight of the hammer can be felt, along with a force to the Cursor as the nail is struck (the rapid deceleration of movement).

A User can hold onto an object, and use it to whip another object. For example a User might hold onto a whip, and feel the weight of the whip along with the forces applied to the Cursor based on a simulation of the whip's movement. The User can feel a sudden change in force when the whip snaps at the end of a movement.

An object or Cursor can be used to carve or cut another object. As an object is manipulated or held (or by using the Cursor directly), it can be pushed against another object to cut, chop, dice, saw, slice, stab, sculpt, dig into, or otherwise modify it. For example, a knife might be used to carve wood. As the knife pushes against the wood, it can cut into it. The forces displayed to a User can approximate the action involved. A knife carving slivers of wood off can feel initial resistance based on the direction of the blade against the wood, and a slipping feeling as wood is carved off. A knife blade cutting directly into the wood, and sliding back and forth can have resistance to the sliding, and can resist movement into the wood.

Objects that are cut can be modified in various ways. An object might lose material based on a mathematical representation of where material exists (such as a volumetric representation), it might be split or cut (such as the cutting of a polygonal mesh or the simulation of a material in a Finite Element Analysis simulation), material might be deformed or moved (such as a simulation of pushing against clay), or pieces or sections of the material might be removed. These types of interactions can occur regardless of the mathematical representation of the material.

If a User cuts wood with a saw, for example, the User can feel a rough feeling while sliding back and forth, and a slow movement down into the wood with each stroke of the saw. The rough feeling can be implemented through a simulation of the saw blade against the wood, or by simply implementing a rough texture proportional to the speed of the saw and/or the pressure of the saw being pushed against the wood. This same type of interaction can be used to carve turkey, but the amount of movement into the material (in this case, turkey meat) per slice would be more, and the slicing would feel smoother.

The feeling of an axe chopping into wood can be implemented by holding onto the axe and feeling its weight, then swinging it into the wood. The movement and inertia of the axe can be suddenly stopped, and the axe (and therefore Cursor holding the axe) be stuck. With a strong enough force away from the wood, the axe can suddenly release.

Slicing or cutting through softer materials can be implemented through a viscous resistance to movement. For example, a knife cutting through cake can be implemented by allowing the blade to move through the cake, and resisting movement through a viscous force applied to the knife or Cursor.

Scissors can be implemented by putting resistance against the direction of cutting movement, while the Cursor control the movement of the scissors opening and closing. More resistance can be applied to the scissors closing and moving while cutting thicker or tougher materials.

Dicing can be felt by holding onto an object that repeatedly cuts into a material sitting on top of a tougher surface. For example, a User might feel a force preventing the Cursor from moving down into celery until the knife hits a cutting board, which feels solid. The User can repeatedly move the knife up and down cutting into the celery, repeatedly striking the cutting board as well.

Stabbing can be implemented when a virtual object is thrust into another virtual object. The stabbing object can be held, and can be pushed into the stabbed object. The Cursor can move into it with constant pressure, in a damped way (where the speed of the movement adjusts the amount of force), or in another type of variable way, such as with an object that has a tough exterior but a soft interior. The amount of force can also be adjusted by the sharpness of the blade and the surface and material properties of the object. For example, to stab and cut a pumpkin with a knife, a User can start by holding onto the knife. As the User touches the tip of the blade to the surface, the knife (and often the Cursor as well) will be stuck and only able to move along the line of the stabbing (this would be true with a needle insertion as well, for example). As the knife initially pushes into the pumpkin, the Cursor will have to push fairly hard. As the knife gets through the exterior surface, it can then slip and move more easily into the pumpkin.

Constraints can be used when modifying an object. For example, as a blade moves into a material, it might only be able to move and cut in the same direction it started, or there might only be a possibility for minor changes in direction as the cutting instrument moves into the material. An object that stabs into another object might be constrained to move along the path that it started moving into the object. Constraints might also be incorporated to make a cutting simulation easier to implement or easier for a User to perform a cutting action. For example, a simulation of a surgery might only allow a User to cut along a specific part of a virtual patient's body. This can be indicated visually with a line, or can be indicated visually with a cover over the patient that the User can not cut into, and which has a different feel when the cutting instrument touches it.

A User can also hold onto a drill and feel it drill into a surface. The drilling can be triggered by pushing a button or through some other type of User input. Then, as a User touches the tip of the drill against a surface, he can drill the material by putting pressure against the material. Drilling might only occur along a line (such as a drill moving into wood) in which case forces along the path of movement can increase or decrease drilling rate, and other directions of movement can be resisted. Drilling might also be able to occur in various directions, such as with a dental drill. In this case the drill might drill at different speed along different axes, and the forces needed for drilling might be different along different axes.

A User can modify a surface by applying force to it. An object can be implemented through any type of surface of volume representation, or any other mathematical representation of the object. The surface of the object can then be modified by interactions between it and the Cursor or with a tool the User is holding. The surface can be modified by pushing or pulling against it, or through other interactions with the Cursor or tool and forces applied to the Cursor, tool, or object. The surface can be modified by removing material, displacing material, or cutting into material. For example, a polygonal representation of a surface might deform. A volumetric representation of an object might have materials removed or added. A spline based representation of a surface might have the parameters defining the surface adjust based on interactions with the Cursor or tool. An element based model might adjust the position of relative elements or add or remove them based on interactions with the Cursor or tool. For example, elements of sand might be represented in a digging simulation. A shovel can dig into the sand, feeling a textured and viscous resistance to entry into the sand. The elements model of the sand would deform the sand, and allow pieces of sand to push against other pieces of sand creating an overall deformation. A user can use the shovel can remove sand and dig a pit.

Standard methods used in CAD/CAM, animation, modeling, etc can be implemented utilizing haptics. Haptics can be used in existing methods of computer modeling, adding touch to standard operations of creating a virtual object by allowing the user to feel forces when selecting, dragging, moving, or otherwise modifying CAD objects.

Objects can be manipulated with respect to themselves. For example, the arm of a doll can be moved into a different orientation. Keyframes in an animation can be set by moving a rigged Character. Parts of an object or Character can be constrained in how they move through inverse kinematics, general constraints on movement, or other mathematical descriptions of movement and deformation.

Virtual buttons, knobs, sliders, button panel, or any other type of User interface object can be implemented haptically. For example, a Cursor can push against a virtual button and feel it click in when it is activated. A knob can be turned either by movement of the Cursor around the knob's center of rotation or by rotation of the Cursor itself. Sliders can be grabbed and moved along their axes of movement, and can have resistance to movement or places at which the slider naturally stops or resists movement more than other places. In addition other types of objects can be implemented that are impossible to implement in real life. Buttons, for example, can be made to move in any direction when they are pushed. Sliders can move in 3D (along X, Y, and Z axes) without being physically connected to each other. Floating objects can be used as interaction objects, in virtual space even though they are not generally encountered in the real world. A sphere can be pushed against, and when pushed hard enough against, it can trigger an event. A floating or rotating cube can be touched, and either pushed against to create an event, or while it is touched a button or other outside interaction can trigger the object's event.

In order to touch objects, aspects of the Cursor's properties can be adjusted. For example, the Cursor's movement along the Z axis can be scaled so that it does not move as much, helping to minimize problems with depth perception. The movement of the Cursor (either its haptics position, graphics position, or both) can be adjusted to touch an object.

Objects can be selected in a number of ways. Selecting can trigger picking up an object, trigger a different type of interaction with the object, trigger an event related to the object, select it for some type of operation that will happen after it is selected, or for any other reason an object should be selected. Any of the described ways of selection can be combined with other inputs, such as a button press. In methods that might select multiple objects, the actual object selected can be chosen by any object criteria. For example, if a line is projected into the virtual environment, and the line passes through multiple objects, the object selected can be the object closest to the User, closest to the Cursor, the object that is a specified color, weight, or type, or any other type of criteria.

An object can be selected when it is touched, pushed against, moved, or a combination of touched and some other input such as a button push or any other type of User input. For example an object might be selected and grabbed by touching it and clicking a switch on a Device handle. An object can be selected by having a User control a line or vector direction into the virtual space, and detecting the collision of the line with the object. A Cursor can control another object attached to the Cursor such as a line or cylinder that can be checked for collisions with object. These objects might or might not create varying forces displayed to a User.

An object can be selected by touching a distorted Cursor. For example, a Cursor can be scaled to extend far along the Z axis, when determining whether it is touching an object. The distorted part of the Cursor that reaches into the Z axis might or might not create forces for the User. For example, the non-distorted part of the Cursor might create forces for the User when it touches objects, making them feel solid, while the distorted part of the Cursor that extends into the Z direction might make the objects feel viscous, and that distorted part of the Cursor can move through them.

Building. Objects can be used to build things. While a User is touching and holding objects, and moving them, they can be positioned relative to each other to build a structure or another object. Objects can be held as is described in the Holding Objects section. Object that hit other objects can be constrained, and a User can feel when an object touches another object.

Objects can be put together in various ways. They can be stacked on each other. They can be attached to each other using some type of material (glue, cement, etc). They can be attached to each other through a mechanism of interaction between the objects (snapping together, grooves that fit two objects together, magnets attached to the objects that attract them together, etc). Objects can be put together through a virtual representation of any real life means of building things.

Building can be implemented by holding objects and putting them together. Objects can automatically snap into place, or parts of objects can automatically join together when they are placed within a specified distance of each other. Joints in objects can automatically snap into place or can snap into place when a User pushed an object hard enough against another object. Objects can also snap into place upon some other type of User defined input such as a button press, a keyboard input, or any other type of User interaction.

Objects can create forces on other objects. Forces can be created by bounding regions representative of the objects, or through more detailed simulation such as full surface collision detection. Those forces can be applied directly to a Cursor to make it feel like an object that is being held is touching another object, or the forces from an object to another can be transmitted to the Cursor through the interface between the Cursor and the object that is held.

Objects can be rotated based on the rotation of the handle of the Device. This can be accomplished in such a way that the rotations are directly applied to the object, or in a way that the Device controls a Cursor that rotates, and the rotations of the Cursor and the point or area that the object is held adjust the rotations of the object being held.

Biting.

A User can control the jaw of a Character. The Jaw can be controlled by the movements of a weight. The weight might move along a hinge that is representative of the motion that a jaw makes. When the jaw bites into something or chews something, added resistance would be applied to the movement of the weight. Force Functions can be applied to the Cursor or the Weight based on what is being bitten or chewed.

The User can feel the forces that are applied to teeth or a jaw, without actually controlling the movement. For example, if a jaw bites into a nut that crunches, the User can feel a force representative of a crunch, wherever the Device and Cursor are located.

Biting and chewing can be accomplished by controlling two or more objects that interact with each other. The relative positions of the objects can control the relative positions of the upper and lower teeth. Forces created from the objects or the position or characteristics of the objects can be used to compute forces applied to a Cursor. Forces descriptive of something being bitten or chewed can be applied separately from the simulation of the objects' interactions. Forces descriptive of something being bitten or chewed can be computed through the interactions of the objects. Tasting can be displayed to a User through haptic effects, such as vibrations, viscosity, etc.

Painting.

Virtual objects can be painted. Three dimensional objects can be painted (similar to painting a ceramic object), or 2D surfaces can be painted (similar to painting a canvas). A User can manipulate some type of painting or drawing tool (painting object PO) with the Cursor (or using the Cursor directly). Material can come off of the PO, such as with chalk or a paint brush. The amount of material coming off the PO can vary with the amount of force being applied.

The size of the area that is covered by the PO can vary with pressure against the object being painted. Alternatively, the actual surface of an object relative to the PO, and how the PO can deform or be manipulated can control the area on the surface that is painted. For example, a brush can be modeled so that it deforms like a real life brush. A calligraphy pen can be implanted virtually so that the amount of ink being applied varies on the orientation of the pen to surface, like in real life.

The texture of a surface can vary for each PO. For example a ball point pen PO will feel smooth, while a brush PO will have more of a viscous feeling. The color of a PO can vary based on pressure. For example the effect of chalk can be implanted by slight varying the color based on pressure, giving the painted surface a layered look.

Any other aspect of painting can vary by pressure or the simulation of the interactions of the PO with the surface. These include how much a material is weighted with respect to other applied materials, the opacity of a material, the opacity or other characteristics of a layer (where there are multiple layers), the blending (or any other function of combining materials), the smoothing or sharpness of the applied material (or any other parameter of how a material is applied to a surface), the roughness of a texture, or the modification of any other parameter or property of how anything painted onto surface looks or feels. Painting can include the painting of haptic textures that can be felt and not seen.

Modifiers. Breathing. In video games and other computer applications that simulate breathing—normal or labored, due to exertion, pain, excitement, fatigue, or fear—there is a need to allow the computer User to actually feel the act of breathing. This haptic experience of respiration can enable the User to more realistically control a virtual object or Character, can give a simulation a greater intensity or requirement of skill, and can make game-play more enjoyable. There are a number of applications, simulations, and games that simulate breathing including snowboarding; skateboarding; skiing; water skiing; surfing; riding a bicycle, motorcycle, or other wheeled Device; piloting a boat, jet ski, or other water craft; piloting a plane, jet-pack, helicopter, hang glider, broom or other flying or winged Device; riding on a horse and other creatures and animals; walking, running, or otherwise moving on foot; skydiving or falling; climbing; balancing on a log in water or on a platform balanced on a point; gymnastics events such as balance beam, pommel horse, floor exercise, parallel bars, rings vault, rhythm gymnastics, and baton twirling; dancing; balancing a ball or a stick; juggling; acrobatics; tight rope walking; lifting and holding heavy or hard to balance objects; roller skating or roller blading; ice skating; jumping and flipping; swinging; avoiding being hit; martial arts and other forms of fighting; or any other depiction of breathing or a change in respiration due to specific game-related events. The sensation of respiration can be experienced in several ways even within a specific game. For example, in a SWAT team law enforcement simulation, there is a need for different types of breathing when at rest, when sprinting to the entry point, when eyeing a perpetrator through a sniper-rifle scope, when attempting to steady one's breathing after being injured, when feeling fear for the safety of hostages, and when fatigue sets in after a long standoff.

Previously, respiration was simulated primarily in the visual realm: a Character or virtual object reacts graphically as though they are inhaling and exhaling. The Character's torso rises and falls. Furthermore, in first person view, the screen-view vibrates, shakes, or otherwise moves rhythmically or erratically, depending on the type of breathing simulated. This approach is limited in that it relies solely on visualization to achieve what is fundamentally an experiential and physical sensation. The realism is severely limited by a traditional controller's lack of 3D force feedback interactions.

Similar force effects can be used to inform a User that a Character smells something. A force effect can be applied, and can change based on what is being smelled. For example, a Character can experience faster or deeper breathing effects when the Character is tracking a specific scent trail or when the Character smells an impending dangerous situation.

Breathing can be implemented by creating a rhythmic force applied to a Cursor. A breath in can create a force in one direction, and a breath out can create a force in generally the opposite direction. Breathing can be implemented by touching an object that is changing. For example, a Cursor can touch a sphere that grows in size for a breath in, and shrinks in size for a breath out. Forces for breathing can be determined based on the breathing of a Character or the movement of a Characters chest (or other parts of the body that move) or from the gases that flow through a Character's mouth. The rhythm or cycle of breathing can be faster when a Character is breathing hard. The magnitude of forces can also increase to simulate harder breathing.

Character State.

In video games and other computer applications that simulate feelings, emotions, a state of being, and other Character traits or modifiers such as being "in the zone" or "on fire", composure, excitement, love, lust, sensuality, being injured, being drunk, blindness, dizziness, nausea, exhaustion, drowsiness, fear, anger, frustration, hunger, being hot, being cold, and any other feeling or state of being, there is a need for a User to feel the result of these modified states. These modifiers can affect or can be triggered by the state of a Cursor, Character, or object in an application in terms of the environment, health, stamina, strength, endurance, speed, leadership, luck, charisma, composure, balance, confidence, defense, attack, stealth, control, or any other characteristic associated with Cursor's, Character's, or object's in an application.

A force function or combination of force functions can be used to simulate or represent the current modified state of a Cursor, Character, or object. Haptic forces can be used in combination with sound feedback and graphical cues to create a more realistic representation of the state of a Character, or how a Character is feeling. Modifiers can be utilized to act as an indicator about the state of a Character to a User, or to aid and hinder the motions, actions, responses, or other capabilities of a Cursor, Character, or object.

Modifiers can alter, affect, lead into, or change other modifiers. The state of a Cursor, Character, or object can lead to a sequence of events or combination of modifiers. For example, a Character can become cold, then tired and hungry, followed by frustration, fear, dizziness and finally exhaustion. A User can be required to take action in order to stop or remove a modifier or prevent the advancement or addition of new modifiers. For example, if a Character is hungry, a User might need to ensure the Character eats before dizziness or exhaustion set in. In this case, the act of eating can then be used to remove one modifier as well as prevent additional modified states.

Positive modifiers such as being "in the zone" or "on fire", composure, excitement, love, lust, and sensuality can alter the performance capabilities of a Cursor, Character, or object. Being in a positive state of being can increase power, speed, stamina, health, motion control, navigation, sight, or any other capability. For example, if a Character is excited, she might be able to run at an accelerated rate or jump higher while she remains excited.

Negative modifiers such as being injured, blindness, dizziness, nausea, exhaustion, drowsiness, fear, frustration, hunger, being hot, and being cold can hinder the performance capabilities of a Cursor, Character, or object. Being in a negative state of being can decrease power, speed, stamina, health, motion control, navigation, sight, or any other capability. For example, a hungry Character might not be able to run as fast, and might have slower (forces occur over a longer period of time) and weaker (reduced magnitude) force responses for all actions and motions.

Forces used for any action, contact, motion, or for any effect can be altered when a Cursor, Character, or object is in a modified state. One way to alter forces to indicate a positive modified state is to increase the magnitude of a force while at the same time it is possible to decrease the duration of the force effect. This change can produce sharper, quicker force sensations to alter the perception of a Character being quicker, stronger, more responsive, or otherwise in a positive state of being. On the other hand, one way to alter forces to indicate a negative modified state is to decrease the magnitude of a force while at the same time it is possible to increase the duration of the force effect. This change can produce duller, slower force sensations to alter the perception of a Character being slower, lagging, tired, weak, less responsive, or otherwise in a negative state.

For example, if a skateboarder is "in the zone", each time he lands a jump, the impulse forces normally used for landing can be slightly increased in magnitude and can occur over a shorter period of time simulating that the skateboarder is landing moves harder and faster due to being "in the zone". For example, decreasing the magnitude of a plateau jumping force while increasing the duration of the force function can be used for an exhausted basketball player to represent slower, weaker jumping abilities due to being tired.

A concept of focusing or being centered can be utilized to represent different modified states. A centering force to simulate this sensation can be used to indicate composure, peace, focus, or any other calm or positive sensation. The centering force can pull a Cursor generally toward the center of an object or Character. A force in an upward direction can be added to the centering force to provide an uplifting or enlightening sensation.

A centering force can be implemented by rapidly increasing a vector force up and towards the User, Character or object to a certain threshold followed by a slow decline in the force as the centering sensation subsides. Graphical and sound cues can be added to this effect such as by having a Character take a deep breath to expand the chest during the uplifting centering with an associated sound effect for the event.

A centering force can pull a Cursor, or present a force to a User toward a Character with an increasing spring force. The magnitude of the spring force can ramp up to a maximum threshold value proportional or related the distance of the Cursor from the center of the Character or object. Upon approach to or upon reaching the center point, the spring force can decrease.

The act of adding a force to pull the Character toward the Cursor can be used as a method of centering the Cursor within a workspace as a form of initialization. For example, prior to each fight in a kung fu game, adding a centering force can mentally prepare the Character for battle by improving stamina and health as well as maximize the range of motion of the Cursor within the workspace by pulling it to a predetermined centered location.

Modifiers can directly affect the difficulty to complete a task, action or motion. One way to alter the difficulty is to adjust the error allowance for performing an action. For example, if a V pattern must be created to swing a sword, and the Character is in a hungry, and tired, the pattern might have to be exactly shaped like a V. If, on the other hand, the Character is well rested, energetic, and in an excited state, the error allowance can be widened such that a U shape or a V shape will result in a fully successful sword swing.

Impulse, bell curve, or plateau force functions, as shown above in the sections 12.9, 12.12, and 12.14, can be used in the direction of the Y axis, or in an upward direction relative to a Character or object to provide uplifting forces. Uplifting forces can be used to indicate a re-energize or burst of power or strength, excitement, or any other encouraging or positive feeling. For example, every time a pirate picks up a gold coin, he can receive an uplifting, re-energizing feeling simulated with the upward force response.

A heart beat of a Character can be simulated by presenting a User with forces that match or are consistent with the beating of the heart. For example, two consecutive impulse forces can be used to correspond with a thump-thump sound effect. The heart beat forces can be related or unrelated to forces related to breathing, and the direction of the heart beat forces can be in the same or different direction as any breathing forces. The magnitude of the heart beat forces can be related or proportional to the heart rate, or any existing modifiers.

The rate of a heart beat can be slowed down such that there is a longer time interval between consecutive heart beat forces. While slowing the heart beat, the magnitudes associated with the beats can be decreased. This can present a sensation of rest, calming down, composure, or any other peaceful or calming effect to a User.

The force rate and force magnitude of a heart beat can be increased to indicate love, lust, sensuality, excitement, heavier breathing, exertion, or for any other reason that can cause a heart to beat faster or harder. For example, slowly increasing the frequency and magnitude of impulse heart beat forces of a male Character as a woman approaches can signify a sense of nervousness or feeling of love.

A heart beat can also be used relative to a negatively modified state. For example, increased breathing, heart rate and associated heart beat force magnitudes can be increased due to fear, frustration, anger, or for any other reason that might increase a heart rate, such as when a Character is about to face a much stronger opponent in battle.

The motion of a Cursor, Character, or object can have an associated or an increased weight force as described in the Tools section, for producing drag, lag, or viscous feeling while moving. Adding a drag force can be used to slow motion, speed, power, or any other capability of a Cursor, Character, or object due to being tired, injured, afraid, dizzy, cold, hungry, or any other feeling or state of being. For example, a weight force can be added to a running Character, by providing a force opposite the direction of motion to create a sensation of feeling heavy, weak, or tired.

A modified state of a Cursor, Character, or object can cut, reduce, distort, alter, or otherwise change the graphics due to the current state of being. For example, if a Character is temporarily blinded because of intense fear, the graphical representation can go black during the temporary blindness, or the light can be reduced to darken, but not blacken out the graphics.

Force functions can be used simulate dizziness, nausea, being stunned, shocked, sick or in any other uneasy modifier. These feelings can produce turning, spinning, wobbling, bobbing, or other motion related forces and sensations. For example if a boxer gets hit in the face extremely hard, he might become dizzy. Rotational forces can be implemented by rotating a weight around the Cursor. The rate of force rotation can match or not match a graphical rotation, or circular motion of a Cursor, Character, or object.

Figure 40:
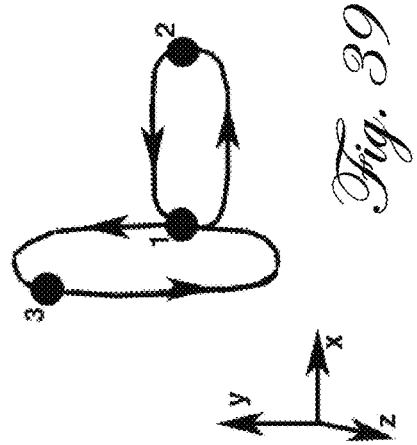
FIG. 40 is a schematic illustration of an implementation of forces to communicate a dizzy character state.

Modifiers can be implemented using a corkscrew type of force motion, where forces pull around Cursor or Character with a variation in the height. The height variation can go up and down at changing rates, as can the radius of spinning forces. For example, to simulate a Character being dizzy, a weight can provide rotational forces spinning around a Cursor on the X-Z plane, where the height of the weight moves periodically up and down adding a force in the Y direction. The combination of the rotation and vertical motion creates a corkscrew shaped force curve, as illustrated in FIG. 40.

The magnitude of any rotational or directional force can be changed or altered in controlled or random manner to provide an uneven, or wobbly, force sensation. For example, a circular force rotating around a Character on the X-Z plane might have a greater magnitude while crossing over the X axis as opposed to crossing the Z axis resulting in an elliptical, or wobbly feeling to the User. For example, if a Character is dizzy and attempts to walk, she might wobble side to side due to only one foot being on the ground at a time.

Figure 41:
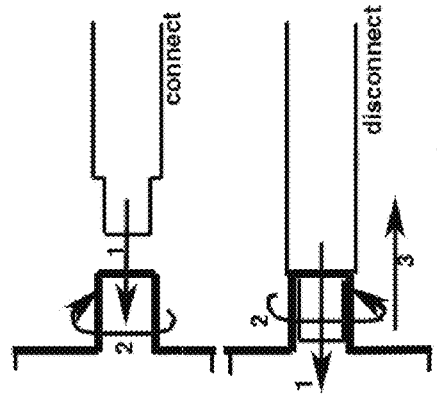
FIG. 41 is a schematic illustration of an implementation of forces to communicate a dizzy of off-balance character state.

A sinusoidal function, or function that crosses back and forth across and axis or reference line, can be used to create a bobbing, tipping, or off balance sensation, as illustrated in FIG. 41. For example, such forces can correspond to a bobbing head due to being exhausted, or a side to side motion resulting from being dizzy or off balance. The added forces can have an impact on an action, motion, or the interaction with any Object, such as a BO, and can be added to other forces related or unrelated to a currently modified state, such as being dizzy. The forces associated with type of sensation might or might not be directly related to Character movement, and are not constrained in any way. The forces can be applied along multiple axes, as well as rotated, scaled, skewed, added, or otherwise changed to provide a desired sensation or effect.

The frequency and magnitude of a force used to simulate a state of being can indicate the extent of a modified state. For example, increasing the frequency and magnitude of a force function can indicate increased damage, danger, or extended exposure to a negatively modified state. For example, if a hiker is caught in a snowstorm and becomes cold, vibration, step input, impulse, or other force functions can be used to create a shaking sensation to indicate he is cold. The longer the hiker is outside, the colder he becomes and therefore the shaking forces can increase in magnitude and occur more often as the hiker gets colder and colder. For example, fear can be simulated using shaking forces similar to the above example. As the level of fear increase forces can become strong and more frequent. As fear subsides, so can the force magnitude and frequency of the forces.

A controlled or random combination of step function inputs with transitions between the steps as described in the Force Function section can be used to simulate different effects. For example, this technique can simulate being affected or hit by weather, or a grumbling of a stomach when a Character becomes hungry.

Forces can be exerted on a User due to being frustrated, angry, mad, or due to any other modifier. Force functions, individual impulse forces or random forces can be added to make interaction, control, accuracy, or any other skill requirement more difficult when in a frustrated or angry state. For example, if an archer is angry, and tries to fire an arrow too quickly because he is frustrated, a small impulse force perpendicular to the motion of the arrow can be added at the moment the arrow is released. The result of this added force can make aiming and accuracy more difficult because the archer is angry.

Hardware.

Haptics Hardware is used both as an input from a User and to relay forces to a User. There are a number of unique applications, designs, and uses of haptic hardware. Often it is difficult to design a Haptic Device that has the same mechanical characteristics across all of its axes. Also, it is desirable in many applications to have forces that are stronger along one axis than another. A Haptic Device can be turned to its side, and the handle can be rotated so that a User can grab it while the Device is in its sideways orientation. Then the Cursor's coordinate system and the forces output to the Device have to adjusted, for example, they can be rotated the same amount, but in the opposite direction. This lets a User use an application with the Device turned sideways the same way as when the Device is turned forwards. For example, in a needle insertion simulator, the forces typically have to be stronger and have more fidelity along the Z axis. If a Device has stronger and higher fidelity forces along the X axis, then the Device can be turned sideways on a desk, and the handle of the Device can be rotated forwards. If the Device is turned approximately 90 degrees on the desk (i.e. about the Device's Y axis), then the coordinate system for the Cursor, and the forces returned, have to also be rotated approximately 90 degrees about the Y axis. The rotations of the Device and the corresponding rotations of the Cursor coordinate system and the output forces can be done in any orientation (i.e. the Device can be turned in any orientation to find the best use of its mechanical structure).

Figure 42:
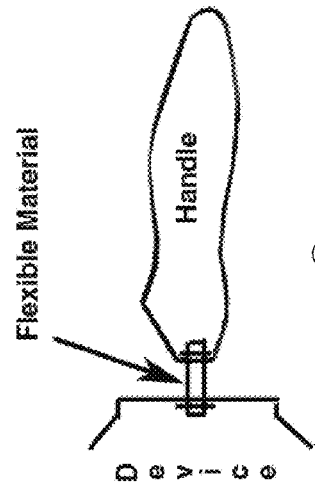
FIG. 42 is a schematic illustration of a handle-Device connection.

Handles or end effectors can be created with a connector that can be quickly detached and reattached to a Device. The same connector can be placed on different types of handles with a matching coupling connect on a Device that can connect to all the different handles. A handle-Device connector can be connected by pressing the connector halves together followed by a twisting motion that can result in the connector halves locking together. The connector can be removed by again pressing the halves together followed by a twisting motion, generally in the opposite direction of the connecting twist, to unlock the halves so they can be pulled apart, as illustrated in FIG. 42.

A connector can snap together by pressing the two connector halves together. The halves can snap together after a threshold applied force is reached. A spring loaded button, or other movable object can be pressed to release the halves. Pressing a button can create a mechanical movement inside the connector to unlock the connector, and allow the two halves of the connector to be pulled apart. Applying a threshold force in the opposite of different direction as the force used to snap the halves together can result in the halves snapping apart.

The electrical connections for any input components on the handle, such as buttons, can be made through connector pins inside the physical connector between the handle and the Device. Alternately, wires or a wireless signal can be used to communicate input signals from a handle and a Device, computer, or other electronic circuit.

A spring can be inserted inside the handle such that as the handle is rotated around an axis, the spring stretches or compresses to change the forces exerted on the User. A spring can provide force resistance along any axis or combination of axes. In addition, multiple springs can be used with various properties to provide various force feedback.

Shape memory alloy (SMA) can be used to provide additional DOF force feedback inside a Device handle. Any mechanical structure, such as a spring, can be made out of SMA, such that when a current is applied to the SMA, the properties of the structure and the resulting forces are altered creating a variable force structure. SMA can be wrapped or coiled around a cylindrical object that can rotate within another cylindrical object that is rigidly a part of the handle a User grasps. At least one of the ends of either cylinder can taper to create a tighter connection at the taper such that the internal cylinder might still rotate. The coils of the SMA can rest within grooves to prevent slippage, and maintain proper position. Current can be applied to the SMA such that the length of the SMA expands around the internal cylinder. The SMA can expand to the location of the taper and press between the two cylinders to add resistance to the rotational motion of the two cylinders. The internal cylinder can be attached to the Device through the connector to provide a rotational force resistance for the handle relative to the Device.

A small motor can be connected to, and placed in the handle to provide an additional DOF force feedback. The motor can be attached to, or control the position a wire, string, or cable. The wire can be wrapped around an object connected to the handle which is free to rotate around another object connected to the Device. The motor can be used to pull or tighten the wire, cable, or string to pull the two objects together to add friction resistance to rotating the handle. For example, a motor can be attached inside the handle on one of the surfaces. A plastic cylinder can protrude into the handle from the physical connection between the handle and the Device. A rubber flap or sleeve can be attached inside the handle opposite the motor, or in a different location as the motor such that the flap gently rests on the plastic cylinder. A wire can loop over the cylinder and rubber sleeve and attach to the motor. When the motor is activated, the wire pulls down on the rubber against the plastic cylinder to increase the friction resistance of rotating the handle.

A handle can be connected to, and freely rotate around a connector that directly attaches to a Device. A motor can be connected to either the connector or the handle such that the handle can still freely rotate about the connector. The motor can either directly connect the handle and the connector, or a wire or other type of cable can connect the handle and connector by wrapping around the motor or otherwise connecting to the motor. For example, the base of a motor can be attached to the connector between the Device and the handle. While the handle is attached and can rotate about the connector, two ends of a cable can be connected to the inside of the handle, with the cable wrapping around the post of the motor. Turning the handle without any current applied to the motor allows for free rotation of the motor post and the handle. Turning on or applying current to the motor can resist the rotation of the motor post resisting the rotation of the handle, thus producing a variable rotational DOF force feedback.

Figure 43:
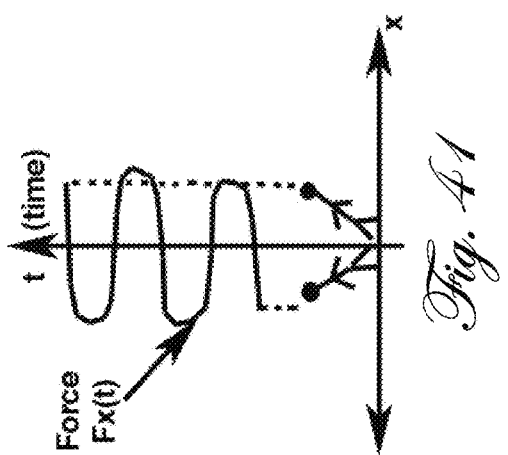
FIG. 43 is a schematic illustration of a handle.

A small motor can be placed inside the handle with a cable or wire that wraps around an object or mechanism that expands at one end when squeezed at the other end, as illustrated in FIG. 43. For example, this effect occurs when squeezing one end of an air balloon to force the other end to expand. The motor can squeeze one end of an object that is made out of plastic, rubber, metal, or any other material. The expanding and of the object can press against another object to add friction forces and resist rotational motion of the handle with respect to the Device.

Figure 44:
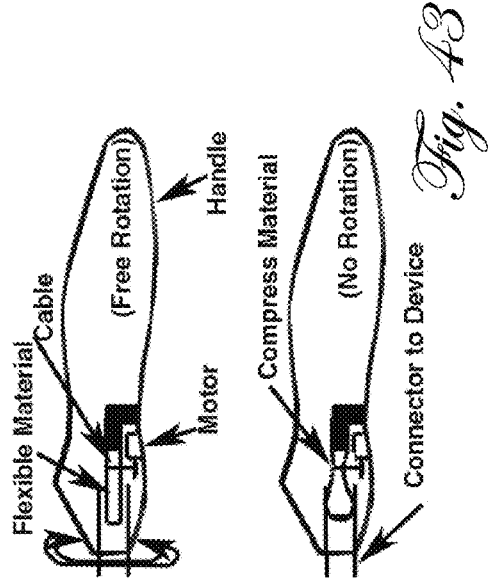
FIG. 44 is a schematic illustration of a handle.

The physical connection between a handle and a Device can be made out of a flexible material to allow motion of the handle in at least one degree of rotation, as illustrated in FIG. 44. The rotation can include full or partial rotation about any axis. Possible connection materials include wire, cable, plastic tubing, linear or non-linear springs, rubber, plastic cable, or any other flexible material.

A flexible material can be rigidly connected to a Device at one end, and a handle at the other end of the material. For example, a handle can be attached to a Device by using a quarter inch of 0.085" plastic cable to allow the handle to rotate in any direction. One end of a flexible material can be rigidly attached between a Device and a handle, such that the other end is connected through a cylinder or hole, allowing the non-rigidly attached end to rotate. Both sides of a physical connection can be allowed to rotate in a similar manner. For example, a plastic cable can be allowed to rotate by placing the cable through a hole in a plate, and attaching a crimp of some form on both sides of the plate. This allows the cable to rotate, but it cannot move linearly in the hole.

A small ball joint can be used to provide low friction motion of a handle relative to a Device in multiple degrees of rotation.

A screw, bolt, set screw, knob, lever or any other mechanical object can be moved, tightened, loosened, or otherwise controlled by a User to adjust the friction of an object that rotates or moves relative to another object. For example, the base of a ball joint can be attached to a plate on a Device with a bolt, and a handle can be attached to the freely rotating ball of the ball joint. The bolt can be tightened such that the end of the bolt presses against the rotating ball to increase the friction of moving the handle relative to the Device. A handle can be adjusted and an object tightened enough to prevent motion of the handle and lock the orientation of the handle to a desired position.

Figure 45:
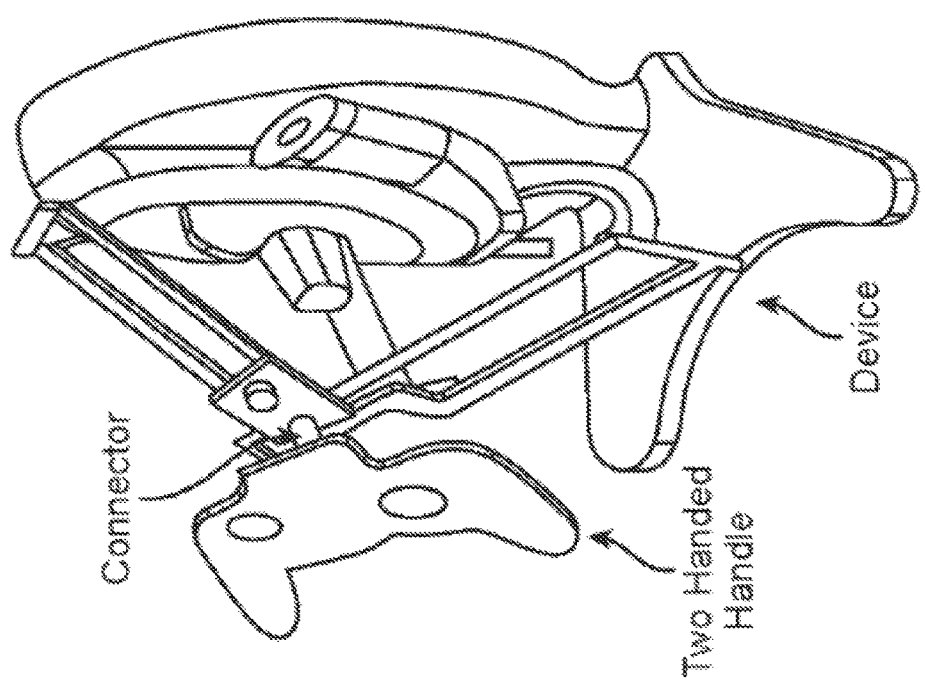
FIG. 45 is a schematic illustration of conventional input device mounted with a haptic device.

A Haptic Device handle can be designed to be held with two hands. A two handed handle can resemble existing handles or video game controllers, and can have any number or combination of inputs such as buttons and joysticks. A connector can be added to existing handles, controllers, joysticks, or other peripheral devices to allow connection to a Haptic Device. For example, a Haptic Device compatible quick connector can be attached to a Sony Playstation controller to allow direct attachment of the controller to a Haptic Device, as illustrated in FIG. 45.

Two separate handles can be used to interact with a program or application. One handle can be attached to a Haptic Device, while the other handle is free to hold in a free hand. The handle that is not mechanically attached to Device can connect to a Device, PC, console system, or any other type of hardware with wires or a cable, or by a wireless connection. For example, a second handle can attach to the base of a Device using a cable and connector similar to those found on existing video game console units.

Handles can be created with specific shapes and functions for different, individual, or certain types of applications such as sporting balls, racing wheels, pool cues, golf clubs, gloves, gun or other weapon, or any other item or tool that can be used in an application. A User can then feel forces by holding onto the handle from the associated application or algorithm in any of the methods described above in this document. Each handle can be constructed with the same or similar connecting method or quick connector designed to attach the handle to a Device. The size of the handles can be the same size as an equivalent real world object, or the handles can be scaled, rotated, altered, skewed, or otherwise modified to fit on a Device and work with an application.

For example, a handle can be made in the shape of a gun, where the tip of the gun connects onto a Device. Alternately, portions of the gun handle can be removed such that the handle consists of a gun grip and a trigger, leaving out all additional components of a real gun. A handle can add a force sensation otherwise not present with respect to a Device. For example, a miniature bow handle for shooting arrows can be created with a string that presents a spring force to a User while pulling on the string. Force feedback from the Device can add resistance by pulling the handle away from the string to provide a User with a more realistic sensation of pulling back a bow string.

A control panel or graphical User interface (GUI) can allow a User to configure the functions of a handle and a Device. For example, a GUI can allow a User to set the function for each individual button, adjust a craft or camera view sensitivity, invert the motion of a Device along an axis, or adjust any other property of the handle or Device. Similar types of control panels exist for non 3D peripheral devices such as mouse control, or a console video game controller's configuration options.

A handle can be designed such that it can be grasped in more than one orientation or hand position. For example, a stylus handle can be created such that it can be held primarily between the thumb and index finger similar to holding a pen. Buttons or inputs on the top of the handle can then be controlled using the index finger. The same design can allow a User to grasp the handle comfortably across the palm of the hand similar to a remote control. In this type of holding configuration, the inputs can be primarily controlled using the thumb.

Figure 46:
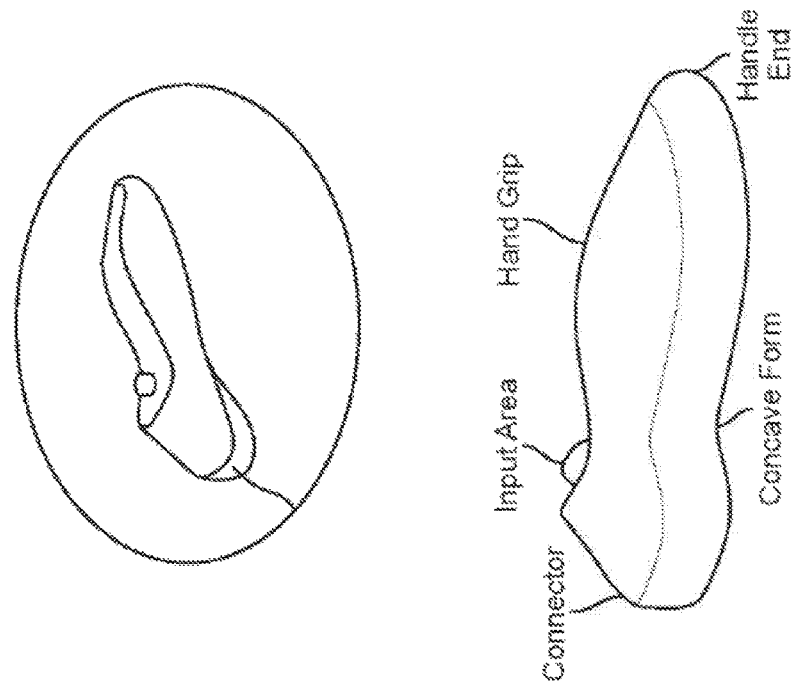
FIG. 46 is a schematic illustration of a handle.

A handle can be created such that one end of the handle has a connector end that can be used to attach the handle to a haptic Device. The handle can expand in size from the connection point to an input area for locating the primary input items such as buttons, switches and miniature joysticks. Additional inputs of any form or modality can be located at any location inside or on the handle. The overall size (or diameter) can then decrease moving away from the input area to create a concave form before again increasing in size to create the handle grip, as illustrated in FIG. 46. The handle end opposite the connector end can taper, narrow, expand, or be of any form to create a handle end. This type of handle can be used with a right or left handed grip, and can be comfortably grasped between the index finger and thumb, similar to a writing pen, such that the input area can be accessed using the pad of the index finger. The handle can also be held in the palm of the hand, similar to a television remote control, such that the input area can be accessed primarily using the pad of the thumb.

A handle or handle attachment can be designed such that part of the handle makes contact with an object or surface on which the handle can slide or move. A computer mouse can be attached to a Haptic Device such that movements of the mouse on a desk allow normal mouse function. Lifting the mouse off the desk can add extra degrees of motion not attainable by normal mouse function alone. In addition, the Haptic Device can present forces to a User through holding onto the mouse. Tracking of the movement of the mouse can be implemented solely through the tracking of the movement of the Device itself, through the tracking of the mouse itself, or through a combination of the two. For example, a high resolution mouse can be physically attached to the Device and used on a table like a regular mouse through the regular mouse USB connection, giving the high resolution tracking of the high resolution mouse but adding the ability for the User to feel forces through the Device. As another example, a Device can be implemented so that it does not have an ability to track its movements. By attaching a mouse (or any other type of hardware that can track position), the combination of the Device and the mouse can be used to give more sophisticated haptic interactions.

A Device can have any portion or all of its position tracking capabilities implemented in the handle. A Device can have any portion or all of its force feedback capabilities implemented in the handle. A tracking ball, encoder, optical sensor, or other tracking method can be used to track translational position of a handle attached to a Haptic Device while it is in contact with a surface such as a desk. A handle can contact a curved surface, for example, a surface that is shaped like a bowl. The handle can be moved on the curved surface similar to translation motion of a mouse, while the curvature of the surface allows the handle to move vertically while remaining in contact with a solid surface. A ball or any type of pointed or smooth tip can be added to a handle to act as a point of contact with a table or stationary object. For example, a smooth plastic ball tip can be added to the bottom of a joystick shaped handle to allow a User to rest the Device on the table and easily side the handle for unobstructed X-Z movement. The Device can be lifted off the table to add Y axis directional motion. Forces can be presented to a User in any direction allowable by the Device including forces to hold the handle against a desk to prevent vertical motion of the handle.

A hardware processing unit or PC card can be designed to handle the computation, servo rate, or any calculation associated with the haptic components of an application or algorithm. The resulting piece of hardware, or "Haptic Card", can be used in a similar manner as existing Graphics Cards, and Physics Cards.

Forces through a motor, spring, or other mechanical Device can be used to calibrate, position, or orient a Haptic Device. For example, a spring force increasing from zero up to a maximum threshold magnitude can pull a Device and an accompanying end effector to a desired point in space as a calibration technique. A physical spring can be used to pull a Device to a position before turning on the motors of the Device. This can be used to calibrate the position of the Device, and ensure the maximum possible workspace for the Device handle. A User can press a button, or other input a signal by other means, while an application is running to center, adjust, or calibrate a Device. This can be a technique to center the Device to maximize the Cursor workspace. For example, if a Device is not calibrated when an application starts and the User hits mechanical limits when attempting to move the handle, the User can move the handle to the center of the Device workspace, press a button, and re-center the Cursor workspace to match the manually centered Device workspace.

A handle or handle cover can be created out of low temperature thermoplastic, moldable synthetic rubber, or any other material that can be formed by hand with applied heat or pressure. The moldable material can allow a User to mold the grip of a handle to fit a specific hand shape, form, or texture. For example, a thermoplastic case on a handle can be heated in warm water and grasped by a User while warm. The thermoplastic will then mold to the shape of the User's grip, and remain in that form fitted shape as the thermoplastic is allowed to cool or dry.

A support structure can provide a resting location for a hand or arm while using a Haptic Device. The support can comprise a flat base platform that can rest on a table or floor. Alternatively, the base can be curved to rest across a User's leg or an arm of furniture such as a desk chair arm. An adjustable post can protrude from the base to allow rotation and height adjustment of a support. A cushioned pad, pillow, arm sleeve, or other object can be attached to the top of the post for a hand or arm to rest on. For example, a User can rest an arm in a plastic half-sleeve such that the sleeve supports the bottom half of the forearm. The support height can be adjusted and the sleeve can rotate as the User manipulates and moves the Device. This type of support can provide comfort, promote proper ergonomics, and reduce muscular load and fatigue on a User.

A conductive material, or any other material that can sense surface contact when being touched, can be placed on the grip of a handle to be used as an input, such as to indicate when a User is grasping the Device handle. The forces of a Device can be reduced or shut off if a User lets go of the Device as a precautionary measure to protect the User as well as the Device from damage. The conduction of the material can change as a User's hand becomes sweaty. The increased conduction can be detected to alter the forces, responses, or actions of the Device, or application.

Forces can be applied to a Device to help control, alter, or prevent a User's movements. Forces can be used to move a User's hand to a specific position within a workspace. One method to move a User's hand position is through the use of increasing spring forces directed along a vector from the current location of a Cursor to the desired location of the Cursor. Forces used to move or pull a User to a specified location can be controlled by a computer, game simulation, another computer through the Internet or other network, or by another person who might or might not be using another Haptic Device.

Different Force Functions can be used to help indicate to a User where or how to move a Device. Forces can include spring, weight, texture, or any of the forces described in the Force Function or Touching Objects sections. A constant spring force with increasing magnitude up to a maximum threshold can be used to pull a User to a desired position or orientation. Indicator forces such as tapping or popping impulse forces can be implemented to get a User's attention to move the Device to a certain location. Theses indicator forces can occur once, periodically, or continuously until the Device or Cursor is moved to a desired location. These forces, or any other Force Function, can be used to help prevent a User from resisting an intended motion, position, or force where the Device pushes, pulls, or otherwise is exerting a force on a User. Graphical, sound, or other sensory feedback can be used to help guide a User to move a Device, Cursor, Character, or object to a location. For example, a target location can graphically blink indicating a location to move a Cursor to. Or the volume of a sound indicator can increase in intensity when a Cursor, Character, or object is facing an intended direction.

Other Related Concepts.

The following ideas can be used in combination with force effects as described herein, and can be used to adjust force feedback. The overall force feedback communicated to a User can be adjusted responsive to the ideas in this section. For example, forces can be reduced or increased, the onset and decay of forces can be shortened or lengthened, and the effects arising from User actions or forces can be magnified or attenuated.

The powers, capabilities, or other characteristics of Characters, or other game objects used by Characters, can be combined with those of other Characters or objects. This combination can occur after a Character reaches a certain level in a game, upon completing a specific task or requirement, or with the use of an item, such as a magical scroll, or by any other application specified requirement.

For example, in a Massively Multiplayer Online (MMO) game, a User might have a level 49 Character with primarily defensive skill, and a level 49 Character with primarily offensive skills. When both Characters reach level 50, the User can elect to combine the two Characters in some way.

A combination of Characters can result in a single Character with the other Characters destroyed. A combination of Characters can result in one of the Characters becoming more powerful with the other becomes less powerful.

Multiple Characters can combine powers temporarily to increase the overall power or capabilities of the newly combined Character. For example, this can be useful to combine a team to prepare a fight against a very powerful opponent. When the fight is over, the Characters can be un-combined to return all the original powers and Capabilities to the individual Characters.

A Character can transfer, teach, or otherwise allow a different Character to be able to use individual powers or capabilities. Such a transfer can be temporary or permanent, and might have restrictions such as having a mentor Character be at a high enough level.

Characters can reach a maximum experience level, at which time the Character can be combined with another Character. The newly combined Character can be powered up to the maximum experience level before again combining with another Character. This process can repeat indefinitely, or limitations can be placed on the number of times Characters can be combined and upgraded, how powerful a Character can become, or the types of combinations allowed between Characters.

A MMO game can be configured such that large battles with hundreds or thousands of Characters within a context of a large battle can interact and fight together against an enemy or against each other. Each Character, or any number of the Characters, can be controlled by a player, with the remaining Characters to be controlled by a computer through AI or other means of Character control. One army can be controlled by players with the other army controlled by a computer, both armies can be controlled by players, or any combination can exist between player and AI/computer Characters.

Before playing a game or using an application, a User can take a survey or answer questions that can have an effect on the capabilities and characteristics of a Character, how the game or application is configured, or any other aspects to a Cursor, Character, object, environment, or application.

A User can take a survey or answer questions in order to better place the User in an environment with other players with similar personalities or interests. For example, the results of a personality survey can be used to place a new Character for a MMO game on a remote server computer that is used specifically for similar types of personalities. This can help ensure that the players on the server who interact with each other will have similar likes, interests, motives, and personalities.

A User can take a personality or other survey to answer questions such that the resulting answers can alter the capabilities or look of a Character, Cursor, or object. For example, an aggressive player who has a tendency to want to destroy things might be given enhanced attack powers or skills. This same type of player might be given a larger and more intimidating Character. A player that wishes to help others and be kind might be given enhanced defensive powers or skills. This type of player might be given a smaller, leaner looking Character.

Computer Program Listing.

The following computer program listings are included on a computer CD submitted with U.S. provisional application 60/681,007, "Computer Interface Methods and Apparatuses," filed May 13, 2005, and are incorporated by reference herein. The files are listed below, with the size of the file in bytes, and the file name. All the files are readable using text editors such as Notepad or Word in MS-Windows.

```
                         Volume Serial Number is 493C-E9C9

Directory of D:\
05/12/2005 11:42 AM    <DIR>          Balance
05/12/2005 11:42 AM    <DIR>          Balls
05/12/2005 11:42 AM    <DIR>          Baseball_Throw
05/12/2005 11:42 AM    <DIR>          Basketball
05/12/2005 11:42 AM    <DIR>          Darts
05/12/2005 11:42 AM    <DIR>          Golf
05/12/2005 11:42 AM    <DIR>          Pool
05/12/2005 11:42 AM    <DIR>          Snowboard
05/12/2005 11:42 AM    <DIR>          airpolo
05/12/2005 11:42 AM    <DIR>          catch
05/12/2005 11:42 AM    <DIR>          caterpillar
05/12/2005 11:42 AM    <DIR>          chain_spheres
05/12/2005 11:42 AM    <DIR>          multi_games
05/12/2005 11:42 AM    <DIR>          shoot
05/12/2005 11:42 AM    <DIR>          swingaman
05/12/2005 11:42 AM    <DIR>          sword
05/12/2005 11:42 AM    <DIR>          toy_car
               0 File(s)          0 bytes
Directory of d:\airpolo
05/12/2005 11:42 AM    <DIR>          .
05/12/2005 11:42 AM    <DIR>          ..
03/05/2005 05:37 PM              6,431 application.cpp
03/05/2005 05:37 PM              2,680 application.h
05/03/2005 12:59 PM             13,438 ball.cpp
05/03/2005 01:09 PM              2,537 ball.h
03/05/2005 05:37 PM              4,405 box_graphic.cpp
03/05/2005 05:37 PM              1,751 box_graphic.h
05/03/2005 12:59 PM              3,609 broomstick.cpp
05/03/2005 01:01 PM              1,655 broomstick.h
03/05/2005 05:37 PM              2,464 composite_object.cpp
03/05/2005 05:37 PM              2,014 composite_object.h
05/03/2005 01:01 PM              7,096 et_sound.cpp
05/03/2005 01:01 PM              1,555 et_sound.h
03/05/2005 05:49 PM              2,172 floor.cpp
03/05/2005 05:49 PM              1,113 floor.h
03/05/2005 05:49 PM              1,112 floor_expanse.cpp
03/05/2005 05:49 PM              1,138 floor_expanse.h
03/05/2005 05:49 PM              4,718 particles.cpp
03/05/2005 05:49 PM              1,628 particles.h
05/03/2005 12:55 PM             32,391 simulation.cpp
05/03/2005 12:55 PM              5,317 simulation.h
03/05/2005 05:50 PM              2,259 simulation_object.cpp
03/05/2005 05:50 PM              2,291 simulation_object.h
03/05/2005 05:50 PM              2,188 sky.cpp
03/05/2005 05:50 PM              1,160 sky.h
03/05/2005 05:51 PM              1,073 space.cpp
03/05/2005 05:51 PM              1,087 space.h
03/05/2005 05:51 PM              1,045 stadium.cpp
03/05/2005 05:51 PM              1,098 stadium.h
03/05/2005 05:51 PM              1,858 transient_force.cpp
03/05/2005 05:51 PM              1,379 transient_force.h
              30 File(s)        114,562 bytes
Directory of d:\balance
05/12/2005 11:42 AM    <DIR>          .
05/12/2005 11:42 AM    <DIR>          ..
01/31/2005 12:05 PM             44,917 Balance.cpp
01/31/2005 12:05 PM                159 Balance.h
               2 File(s)         45,076 bytes
Directory of d:\balls
05/12/2005 11:42 AM    <DIR>          .
05/12/2005 11:42 AM    <DIR>          ..
```

-continued

| Volume Serial Number is 493C-E9C9 |
|---|

```
01/31/2005 12:05 PM          44,354 balls.cpp
01/31/2005 12:05 PM             156 balls.h
              2 File(s)      44,510 bytes
Directory of d:\baseball_throw
05/12/2005 11:42 AM    <DIR>    .
05/12/2005 11:42 AM    <DIR>    ..
01/31/2005 12:05 PM          58,372 Baseball_Throw.cpp
01/31/2005 12:05 PM             165 Baseball_Throw.h
              2 File(s)      58,537 bytes
Directory of D:\basketball
05/12/2005 11:42 AM    <DIR>    .
05/12/2005 11:42 AM    <DIR>    ..
01/31/2005 12:06 PM             156 Basketball.h
01/31/2005 12:06 PM          61,789 basketball.cpp
              2 File(s)      61,945 bytes
Directory of D:\catch
05/12/2005 11:42 AM    <DIR>    .
05/12/2005 11:42 AM    <DIR>    ..
03/05/2005 05:04 PM          19,013 application.cpp
03/05/2005 05:04 PM           3,577 application.h
03/05/2005 05:04 PM           2,411 ball.cpp
03/05/2005 05:04 PM           1,545 ball.h
03/05/2005 05:05 PM         769,944 catchers_glove.cpp
03/05/2005 05:05 PM         367,099 fielders_glove.cpp
03/05/2005 05:05 PM           1,575 floor.cpp
03/05/2005 05:05 PM           1,083 floor.h
03/05/2005 05:05 PM          13,892 glove.cpp
03/05/2005 05:05 PM           3,369 glove.h
             10 File(s)   1,183,508 bytes
Directory of D:\caterpillar
05/12/2005 11:42 AM    <DIR>    .
05/12/2005 11:42 AM    <DIR>    ..
03/05/2005 05:05 PM           4,863 application.cpp
03/05/2005 05:05 PM           2,378 application.h
03/05/2005 05:05 PM           1,752 frame_rate_dialog.cpp
03/05/2005 05:05 PM           1,214 frame_rate_dialog.h
03/05/2005 05:06 PM           3,390 no_graphics_tool.cpp
03/05/2005 05:06 PM           1,019 no_graphics_tool.h
03/05/2005 05:06 PM           5,074 simple_object.cpp
03/05/2005 05:06 PM           4,805 simple_object.h
03/05/2005 05:06 PM          14,878 simulation.cpp
03/05/2005 05:06 PM           4,098 simulation.h
             10 File(s)      43,471 bytes
Directory of D:\chain_spheres
05/12/2005 11:42 AM    <DIR>    .
05/12/2005 11:42 AM    <DIR>    ..
03/05/2005 05:06 PM           4,863 application.cpp
03/05/2005 05:06 PM           2,378 application.h
03/05/2005 05:06 PM          10,865 simulation.cpp
03/05/2005 05:06 PM           3,761 simulation.h
              4 File(s)      21,867 bytes
Directory of d:\darts
05/12/2005 11:42 AM    <DIR>    .
05/12/2005 11:42 AM    <DIR>    ..
01/31/2005 12:07 PM          54,657 darts.cpp
01/31/2005 12:07 PM             156 darts.h
              2 File(s)      54,813 bytes
Directory of d:\golf
05/12/2005 11:42 AM    <DIR>    .
05/12/2005 11:42 AM    <DIR>    ..
01/31/2005 12:08 PM          63,876 golf.cpp
01/31/2005 12:08 PM             154 golf.h
              2 File(s)      64,030 bytes
Directory of D:\multi_games
05/12/2005 11:42 AM    <DIR>    .
05/12/2005 11:42 AM    <DIR>    ..
03/06/2005 01:47 AM          27,155 arrow.cpp
03/06/2005 01:47 AM           7,783 arrow.h
05/03/2005 01:03 PM          67,542 football.cpp
03/06/2005 01:47 AM           8,475 football.h
03/06/2005 01:47 AM           6,547 high_score_dialog.cpp
03/06/2005 01:47 AM           1,941 high_score_dialog.h
03/06/2005 01:59 AM           2,246 messagesTC.cpp
03/06/2005 01:59 AM             951 messagesTC.h
03/06/2005 01:59 AM          26,244 multi_sound.cpp
03/06/2005 01:59 AM           4,962 multi_sound.h
03/06/2005 01:59 AM          50,310 new_touch_city_application.cpp
```

-continued

| Volume Serial Number is 493C-E9C9 |
|---|

```
03/06/2005  01:59 AM          3,152 new_touch_city_application.h
03/06/2005  02:04 AM          6,224 plane.cpp
03/06/2005  02:04 AM          3,744 plane.h
03/06/2005  02:17 AM         44,029 sparks.cpp
03/06/2005  02:17 AM          6,213 sparks.h
03/06/2005  02:17 AM         18,938 sparks_target_box.cpp
03/06/2005  02:17 AM          1,180 sparks_target_box.h
03/06/2005  02:18 AM         16,230 target.cpp
03/06/2005  02:18 AM          5,885 target.h
03/06/2005  02:18 AM          3,685 teleport.cpp
03/06/2005  02:18 AM          2,147 teleport.h
03/06/2005  02:18 AM          1,369 user.cpp
03/06/2005  02:18 AM            655 user.h
03/06/2005  02:18 AM         51,641 walking_craft.cpp
03/06/2005  02:18 AM          7,384 walking_craft.h
03/06/2005  02:18 AM          3,872 wand_tool.cpp
03/06/2005  02:18 AM            661 wand_tool.h
              28 File(s)    381,165 bytes
 Directory of d:\pool
05/12/2005  11:42 AM    <DIR>          .
05/12/2005  11:42 AM    <DIR>          ..
01/31/2005  12:12 PM          5,619 flt_cm_pool_prefs.cpp
01/31/2005  12:12 PM            212 flt_cm_pool_prefs.h
01/31/2005  12:12 PM         86,570 pool.cpp
01/31/2005  12:12 PM            196 pool.h
               4 File(s)     92,597 bytes
 Directory of D:\shoot
05/12/2005  11:42 AM    <DIR>          .
05/12/2005  11:42 AM    <DIR>          ..
03/05/2005  05:52 PM         18,680 cannon.cpp
03/05/2005  05:52 PM          2,341 cannon.h
03/05/2005  05:52 PM          9,054 gun.cpp
03/05/2005  05:52 PM          3,500 gun.h
03/05/2005  05:52 PM         66,255 keyboard_craft.cpp
03/05/2005  05:52 PM          7,724 keyboard_craft.h
03/05/2005  05:52 PM         17,425 laser.cpp
03/05/2005  05:52 PM          2,351 laser.h
03/05/2005  05:52 PM         17,049 pistol.cpp
03/05/2005  05:52 PM          2,342 pistol.h
05/03/2005  01:10 PM         36,091 pistoltargets.cpp
03/05/2005  05:52 PM          4,420 pistoltargets.h
03/05/2005  05:52 PM         42,771 shoot.cpp
03/05/2005  05:52 PM         20,477 shotgun.cpp
03/05/2005  05:52 PM          2,353 shotgun.h
03/05/2005  05:53 PM         16,486 uzi.cpp
03/05/2005  05:53 PM          2,306 uzi.h
              17 File(s)    271,625 bytes
 Directory of d:\snowboard
05/12/2005  11:42 AM    <DIR>          .
05/12/2005  11:42 AM    <DIR>          ..
03/07/2005  05:17 PM            703 Snowboard.h
03/07/2005  05:17 PM         81,236 SnowboardBA.cpp
01/31/2005  12:13 PM         58,648 SnowboardTA.cpp
               3 File(s)    140,587 bytes
 Directory of D:\swingaman
05/12/2005  11:42 AM    <DIR>          .
05/12/2005  11:42 AM    <DIR>          ..
05/03/2005  01:04 PM         19,013 swingaman.cpp
03/05/2005  05:53 PM         31,917 web.cpp
03/05/2005  05:53 PM          2,233 web.h
               3 File(s)     55,163 bytes
 Directory of D:\sword
05/12/2005  11:42 AM    <DIR>          .
05/12/2005  11:42 AM    <DIR>          ..
03/05/2005  05:53 PM         13,351 application.cpp
03/05/2005  05:53 PM          3,401 application.h
03/05/2005  05:53 PM          3,126 collider.cpp
03/05/2005  05:53 PM          1,588 collider.h
03/05/2005  05:53 PM         20,152 control_sphere.cpp
03/05/2005  05:53 PM          2,254 control_sphere.h
03/05/2005  05:53 PM          5,929 cylinder_target.cpp
03/05/2005  05:53 PM          1,434 cylinder_target.h
03/05/2005  05:53 PM          7,624 key_navigation.cpp
03/05/2005  05:53 PM          7,482 navigation.cpp
03/05/2005  05:53 PM          2,152 navigation.h
03/05/2005  05:54 PM         20,555 sword_3dof.cpp
03/05/2005  05:54 PM          2,581 sword_3dof.h
```

-continued

| Volume Serial Number is 493C-E9C9 | |
|---|---|
| 03/05/2005 05:54 PM | 3,060 sword_base.cpp |
| 03/05/2005 05:54 PM | 1,816 sword_base.h |
| 03/05/2005 05:54 PM | 4,035 sword_craft.cpp |
| 03/05/2005 05:54 PM | 1,363 sword_craft.h |
| 03/05/2005 05:54 PM | 20,342 sword_keycontrol.cpp |
| 03/05/2005 05:54 PM | 2,466 sword_keycontrol.h |
| 03/05/2005 05:54 PM | 11,200 sword_unconstrained.cpp |
| 03/05/2005 05:54 PM | 1,399 sword_unconstrained.h |
| 03/05/2005 05:54 PM | 6,600 target.cpp |
| 03/05/2005 05:54 PM | 2,325 target.h |
| 03/05/2005 05:54 PM | 2,520 target_group.cpp |
| 03/05/2005 05:54 PM | 1,491 target_group.h |
| 03/05/2005 05:54 PM | 2,005 tree.cpp |
| 03/05/2005 05:54 PM | 1,068 tree.h |
| 27 File(s) | 153,319 bytes |
| Directory of D:\toy_car | |
| 05/12/2005 11:42 AM <DIR> | . |
| 05/12/2005 11:42 AM <DIR> | .. |
| 03/05/2005 05:55 PM | 27,308 simulation.cpp |
| 03/05/2005 05:55 PM | 5,372 simulation.h |
| 03/05/2005 05:55 PM | 2,259 simulation_object.cpp |
| 03/05/2005 05:55 PM | 2,230 simulation_object.h |
| 4 File(s) | 37,169 bytes |

The particular sizes and equipment discussed above are cited merely to illustrate particular embodiments of the invention. It is contemplated that the use of the invention can involve components having different sizes and characteristics. It is intended that the scope of the invention be defined by the claims appended hereto.

We claim:

1. A method of simulating breathing in a virtual environment, comprising, by a processor:
   displaying, on a display, a character being controlled by a user, wherein the character's chest moves to represent breathing, and wherein the movement of the character's chest changes to simulate a change in a breathing state caused by a virtual event experienced by the character;
   creating a rhythmic force comprising a resulting force having vector components in two or more dimensions in space to simulate two or more effects including a breathing effect, the resulting force including a combination of force functions associated with the two or more effects, wherein the combination of force functions includes a force function for the breathing effect that generates a force in one direction when the character is breathing in, in an opposite direction when the character is breathing out, and has a variable rhythm based on the breathing state of the character; and
   implementing the rhythmic force in a haptic device so that the haptic device applies the resulting force to simulate the two or more effects.

2. The method of claim 1, further comprising adjusting a magnitude of the rhythmic force to correspond to a rate at which the character is shown to be breathing.

3. The method of claim 1, wherein the displaying step further comprises displaying the character with a mouth, and displaying gases flowing into and out of the character's mouth to represent the breathing.

4. The method of claim 1, further comprising of simulating breathing by a change in size of an object, wherein the size of the object increases in size when breathing in and the size of the object decreases in size when breathing out.

* * * * *